United States Patent
Orita et al.

(10) Patent No.: US 12,287,919 B2
(45) Date of Patent: *Apr. 29, 2025

(54) TACTILE PRESENTATION DEVICE, TACTILE PRESENTATION TOUCH PANEL, AND TACTILE PRESENTATION TOUCH DISPLAY

(71) Applicant: Mitsubishi Electric Corporation, Tokyo (JP)

(72) Inventors: Tae Orita, Tokyo (JP); Takeshi Ono, Tokyo (JP); Takayuki Morioka, Tokyo (JP); Naoki Nakagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/031,353

(22) PCT Filed: Nov. 27, 2020

(86) PCT No.: PCT/JP2020/044160
§ 371 (c)(1),
(2) Date: Apr. 12, 2023

(87) PCT Pub. No.: WO2022/113251
PCT Pub. Date: Jun. 2, 2022

(65) Prior Publication Data
US 2023/0409117 A1    Dec. 21, 2023

(51) Int. Cl.
*G06F 3/01* (2006.01)
*G06F 3/0362* (2013.01)
*G06F 3/041* (2006.01)

(52) U.S. Cl.
CPC ............ *G06F 3/016* (2013.01); *G06F 3/0362* (2013.01); *G06F 3/0412* (2013.01); *G06F 3/0414* (2013.01); *G06F 2203/04105* (2013.01)

(58) Field of Classification Search
CPC .......... G06F 2203/04105; G06F 3/016; G06F 3/0362; G06F 3/0393; G06F 3/0416;
(Continued)

(56) References Cited

U.S. PATENT DOCUMENTS 11,269,470 B2    3/2022  Mori et al.
2001/0028345 A1  10/2001  Natsuyama et al.
(Continued)

FOREIGN PATENT DOCUMENTS

JP    2001-290601 A    10/2001
JP    2010-282665 A    12/2010
(Continued)

OTHER PUBLICATIONS

International Search Report and Written Opinion mailed on Dec. 28, 2020, received for PCT Application PCT/JP2020/044160, filed on Nov. 27, 2020, 11 pages including English Translation.

*Primary Examiner* — Insa Sadio
(74) *Attorney, Agent, or Firm* — XSENSUS LLP

(57) ABSTRACT

The present disclosure relates to a tactile presentation device presenting tactile to a user, and includes: a touch detection circuit detecting the user having contact with the tactile presentation knob and outputting positional information of the tactile presentation knob; a pressure detection circuit detecting an amount of pressing of the operation surface by the tactile presentation knob; a tactile control circuit determining a voltage signal generating friction force between the tactile presentation knob and the operation surface; and a pressure amount calculation circuit calculating a pressure amount based on the amount of pressing detected in the pressure detection circuit and adding the pressure amount to the pressing information, wherein generated is tactile caused by a change of the friction force between the tactile presen-
(Continued)

tation knob and the operation surface by the voltage signal determined by the tactile control circuit.

20 Claims, 46 Drawing Sheets

(58) Field of Classification Search
CPC .... G06F 3/04166; G06F 3/044; G06F 3/0443; G06F 3/0446; G06F 3/04847; G06F 3/0488
See application file for complete search history.

(56) References Cited

U.S. PATENT DOCUMENTS

| | | | |
|---|---|---|---|
| 2007/0229477 A1* | 10/2007 | Ludwig | G06F 3/0412 345/173 |
| 2011/0025455 A1* | 2/2011 | Whalen | G10H 1/0066 340/4.1 |
| 2015/0103024 A1 | 4/2015 | Haga et al. | |
| 2017/0269686 A1 | 9/2017 | Khoshkava et al. | |
| 2019/0107889 A1 | 4/2019 | Togashi | |
| 2021/0173486 A1 | 6/2021 | Ueda | |
| 2022/0374084 A1 | 11/2022 | Orita et al. | |
| 2023/0004225 A1 | 1/2023 | Orita et al. | |

FOREIGN PATENT DOCUMENTS

| | | |
|---|---|---|
| JP | 2015-97076 A | 5/2015 |
| JP | 2017-168104 A | 9/2017 |
| JP | 6342105 B1 | 6/2018 |
| JP | 2019-70956 A | 5/2019 |
| JP | 2019-121406 A | 7/2019 |
| JP | 6739692 B1 | 8/2020 |
| WO | 2019/008701 A1 | 1/2019 |
| WO | 2021/111577 A1 | 6/2021 |
| WO | 2021/140550 A1 | 7/2021 |

* cited by examiner

F I G. 2 0
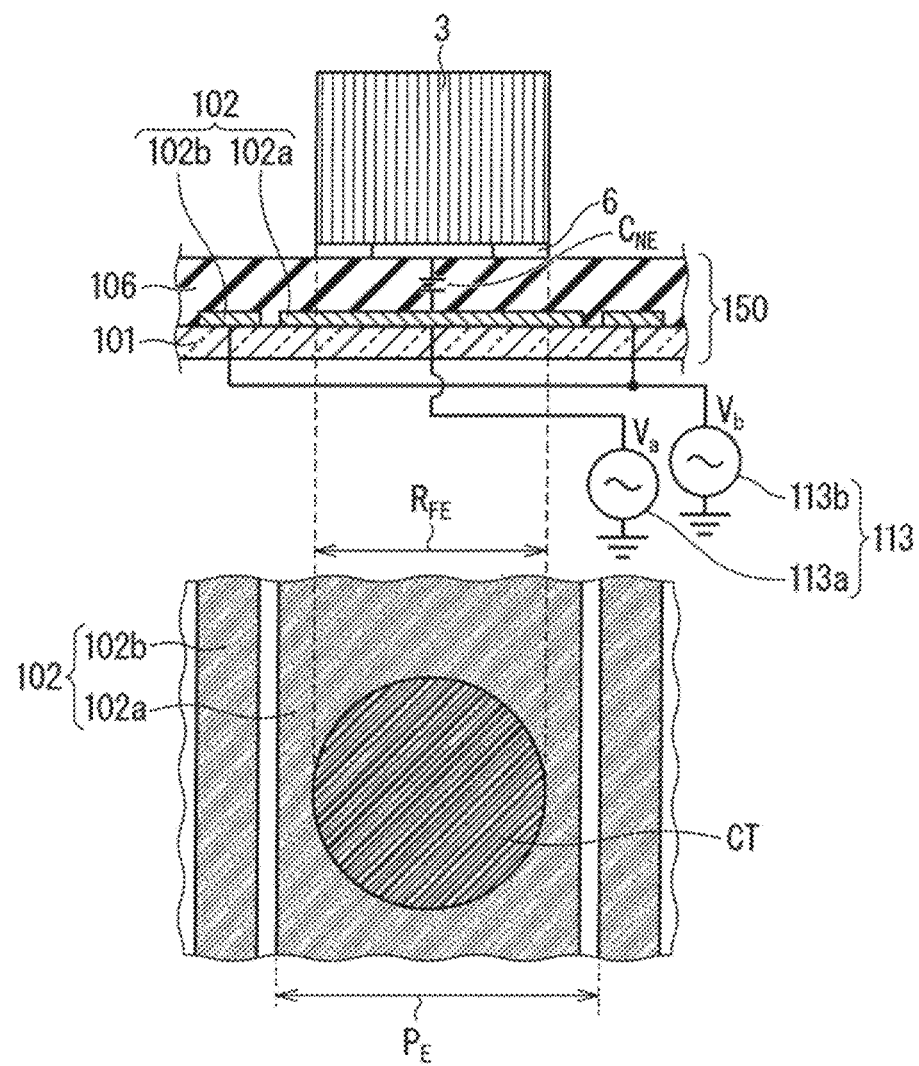

FIG. 41
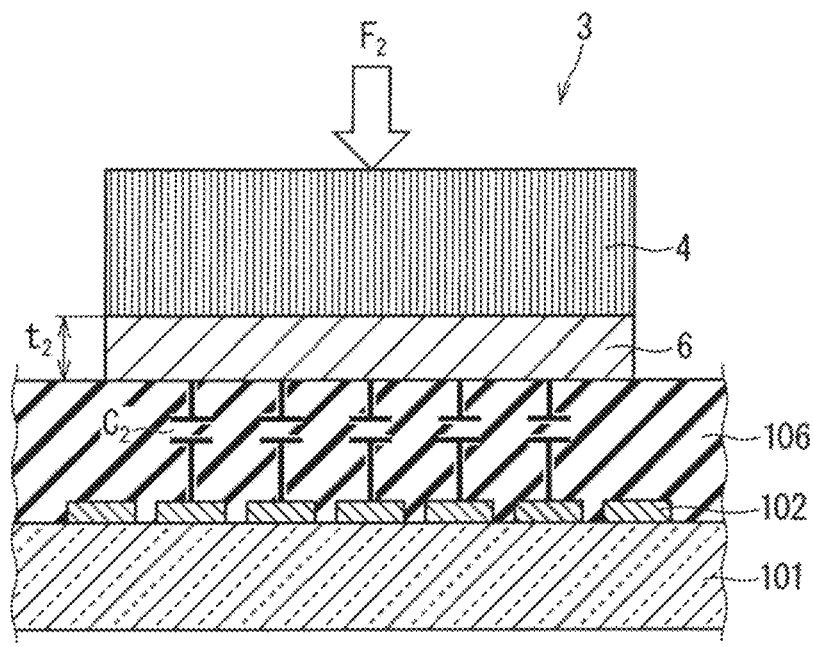
FIG. 42
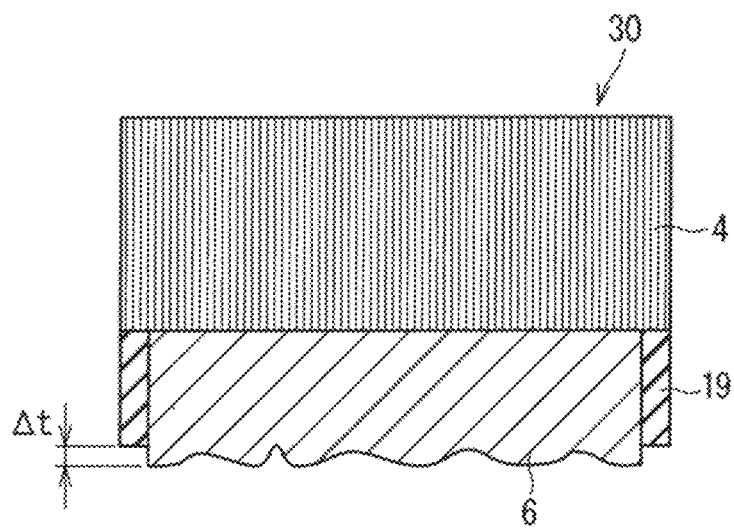
FIG. 43
| Δt [mm] | 0.09 | 0.17 | 0.26 | 0.34 | 0.43 | 0.52 |
|---|---|---|---|---|---|---|
| TACTILE STRENGTH | △ | △ | ○ | ◎ | ○ | △ |

TACTILE PRESENTATION DEVICE, TACTILE PRESENTATION TOUCH PANEL, AND TACTILE PRESENTATION TOUCH DISPLAY

CROSS-REFERENCE TO RELATED APPLICATION

The present application is based on PCT filing PCT/JP2020/044160, filed Nov. 27, 2020, the entire contents of which are incorporated herein by reference.

TECHNICAL FIELD

The present disclosure relates to a technique of presenting tactile to a user via a tactile presentation knob.

BACKGROUND ART

A touch panel is widely known as a device detecting a position indicated by an indicator such as a finger of a user or a pen (referred to as "touch position" in some cases hereinafter) on a touch screen and outputting it. A touch panel using an electrostatic capacitance system includes a projected capacitive touch panel (PCAP). The PCAP can detect a touch position even when a surface of a touch screen on a side of the user (referred to as "front side surface" in some cases hereinafter) is covered by a protection plate such as a glass plate having a thickness of several millimeters. The PCAP has advantages that it is excellent in toughness by reason that a protection plate can be disposed on a front side surface and it has a long life by reason that it does not include a movable portion, for example.

A touch screen of the PCAP includes a detection row direction wiring layer detecting a coordinate of a touch position in a row direction and a detection column direction wiring layer detecting a coordinate of a touch position in a column direction. In the description hereinafter, the detection row direction wiring layer and the detection column direction wiring layer are collectively referred to as "the detection wiring layer" in some cases.

A member on which the detection wiring layer is disposed is referred to as "a touch screen", and a device in which a detection circuit is connected to the touch screen is referred to as "a touch panel". Furthermore, a region in which a touch position can be detected in the touch screen is referred to as "a detectable area".

Included are a conductor element of a first series formed on a thin dielectric film and a conductor element of a second series formed on the conductor element of the first series with an insulative film therebetween as the detection wiring layer for detecting electrostatic capacitance (also simply referred to as "capacitance" in some cases hereinafter). The conductor elements do not have electrical contact with each other. When viewed from a normal direction of the front side surface, one of the conductor element of the first series and the conductor element of the second series is overlapped with the other one thereof in a plan view, however, they do not have electrical contact with each other, but three-dimensionally intersect with each other.

A coordinate of the touch position of the indicator is specified by detecting capacitance (referred to as "touch capacitance" in some cases hereinafter) generated between the indicator and the conductor element as the detection wiring by the detection circuit. The touch position between the conductor elements can be interpolated by a relative value of the detection capacitance of one or more conductor elements.

Recently, a touch panel as an operation panel including a switch, for example, has been used in various apparatuses in daily lives in place of a mechanical switch. However, the touch panel does not have a convex-concave portion as with the mechanical switch, but a hand feeling is even, thus a surface shape is not deformed by an operation. All operation processes from confirmation of a position of a switch to execution and completion of the operation needs to be performed depending on visual sensation, thus there is a problem in reliability in a touch operation performed in parallel to the other operation such as an audio operation during driving an automobile and operability for a visually challenged person.

For example, in an in-vehicle apparatus, a touch panel is widely used from a viewpoint of a design property, and the in-vehicle apparatus is hardly operated without seeing the touch panel during driving the automobile, thus a touch panel having a function of being operable without seeing the touch panel attracts attention from a viewpoint of securing safety. In a consumer apparatus, a touch panel as an operation panel has been used for various home electrical appliances and electrical apparatuses. Furthermore, an apparatus provided with a PCAP having a surface protected with a cover glass also increases from a viewpoint of a design property. However, the touch panel has a flat surface, thus a position of a switch cannot be confirmed with a hand feeling, thus has a problem that it hardly complies with universal design. In the case of the PCAP, a glass surface needs to be flat as the design property, thus hardly complies with the universal design such as processing of forming a convex-concave portion on the glass surface corresponding to the switch position, for example.

Examples of measures against the above problems include a method of notifying receipt and completion of the operation with a sound, however, an environment in which an audio function can be used is limited due to problems of privacy and noise, thus such a method does not achieve a function and versability equivalent to the mechanical switch. If a touch panel has a function of presenting a position of a switch and a function of feeding back the receipt and completion of the operation to a user with tactile, the operation without seeing the touch panel can be achieved, and the touch panel can comply with the universal design.

A mobile phone and a smartphone are provided with a tactile feedback function by vibration to compensate reliability of the operation and operability without depending on visual sensation in some cases. The feedback function by vibration in conjunction with the operation of the user has been rapidly familiar, and a demand for a higher tactile feedback is also expected to be increased.

A system of generating tactile is roughly divided into three systems of a vibration system, an ultrasonic system, and an electrical system. The vibration system has features that it can be compatible with the PCAP and is inexpensive, however, a vibrator is incompatible to be incorporated into a chassis so that a whole device is sufficiently vibrated, and an area cannot be increased due to a limitation of an output of the vibrator. In the ultrasonic system, tactile such as slippery feeling which cannot be generated in the other system can be generated, however, there are weak points that an ultrasonic system is incompatible to be incorporated into a chassis, and an area cannot be increased by reasons similar to those of the vibration system. The electrical system includes an electrostatic friction system generating tactile by electrostatic friction force and an electrical stimulation system directly providing a finger with electrical stimulation. These systems can generate tactile in an arbitrary position, and can achieve increase in an area and comply with a multi-touch system.

This system is described hereinafter. In the description hereinafter, a member in which a tactile electrode is disposed in a transparent insulating substrate is referred to as a "tactile representation screen", and a device in which a detection circuit is connected to the tactile presentation screen is referred to as a "tactile representation panel". A region where tactile can be represented in the tactile representation screen is referred to as a "tactile representable area".

With regard to a tactile output device for a rotation knob, in Patent Document 1, for example, a tactile output device includes an electrode, a dielectric material disposed on the electrode, and a controller inputting a signal to the electrode. The dielectric material has a convex-concave portion micro-patterned in a surface with which a user has contact. When the controller inputs the signal to the electrode, the convex portion of the micro-patterned dielectric material takes charge, electrostatic force is generated between the convex portion and a rotation knob, and tactile can be given to the user.

PRIOR ART DOCUMENTS

Patent Document(s)

Patent Document 1: Japanese Patent Application Laid-Open No. 2017-168104

SUMMARY

Problem to be Solved by the Invention

In Patent Document 1, pressing force of the rotation knob in a rotation operation performed by the user changes depending on a difference of a body type of the user and an angle of an arm and wrist in operating the rotation knob caused by a posture in the operation, thus there is a case where stable tactile cannot be obtained.

The present disclosure is to solve the problems described above, and an object of the present disclosure is to provide a tactile presentation panel capable of presenting tactile having constant clarity and tactile strength without being influenced by an angle of an arm and a wrist in an operation.

Means to Solve the Problem

A tactile presentation device according to the present disclosure is a tactile presentation device in which a tactile presentation knob is disposed on an operation surface to present tactile to a user via the tactile presentation knob, the tactile presentation device comprising: a touch detection circuit detecting the user having contact with the tactile presentation knob and detecting a position of the tactile presentation knob on the tactile presentation device to output the position as positional information; a pressure detection circuit detecting an amount of pressing of the operation surface performed by the user via the tactile presentation knob and outputting the amount of pressing as pressing information; a tactile control circuit determining a voltage signal generating friction force between the tactile presentation knob and the operation surface based on the positional information outputted from the touch detection circuit and the pressing information outputted from the pressure detection circuit; and a pressure amount calculation circuit calculating a pressure amount based on the amount of pressing detected in the pressure detection circuit and adding the pressure amount to the pressing information, wherein generated is tactile caused by a change of the friction force between the tactile presentation knob and the operation surface by the voltage signal determined by the tactile control circuit, and the pressure detection circuit detects the amount of pressing of the operation surface via the tactile presentation knob so that the friction force between the tactile presentation knob and the operation surface generated by the voltage signal becomes constant.

Effects of the Invention

According to the tactile presentation panel according to the present disclosure, a tactile presentation panel presenting tactile having constant clarity and tactile strength without being influenced by an angle of an arm and a wrist of a user in an operation can be obtained. A tactile presentation touch panel and a tactile presentation touch display including a tactile presentation panel can be obtained.

BRIEF DESCRIPTION OF DRAWINGS

FIG. 20 A schematic view for explaining electrostatic capacitance formed between a tactile electrode and a tactile presentation knob in a case where a pitch of the tactile electrode included in the tactile presentation panel in FIG. 2 is larger than a diameter of the tactile presentation knob.

FIG. 41 A schematic diagram illustrating an interface between the conductive elastic part and the display surface when the tactile presentation knob is operated at strong pressing force.

FIG. 42 A cross-sectional view illustrating a configuration of the tactile presentation knob according to the embodiment 1.

FIG. 43 A diagram illustrating a relationship of a difference between a height of a support part of the tactile presentation knob and a maximum height of the conductive elastic part according to the embodiment 1 and tactile strength.

DESCRIPTION OF EMBODIMENT(S)

Embodiment 1

<Tactile Presentation Touch Display>

Figure 1:
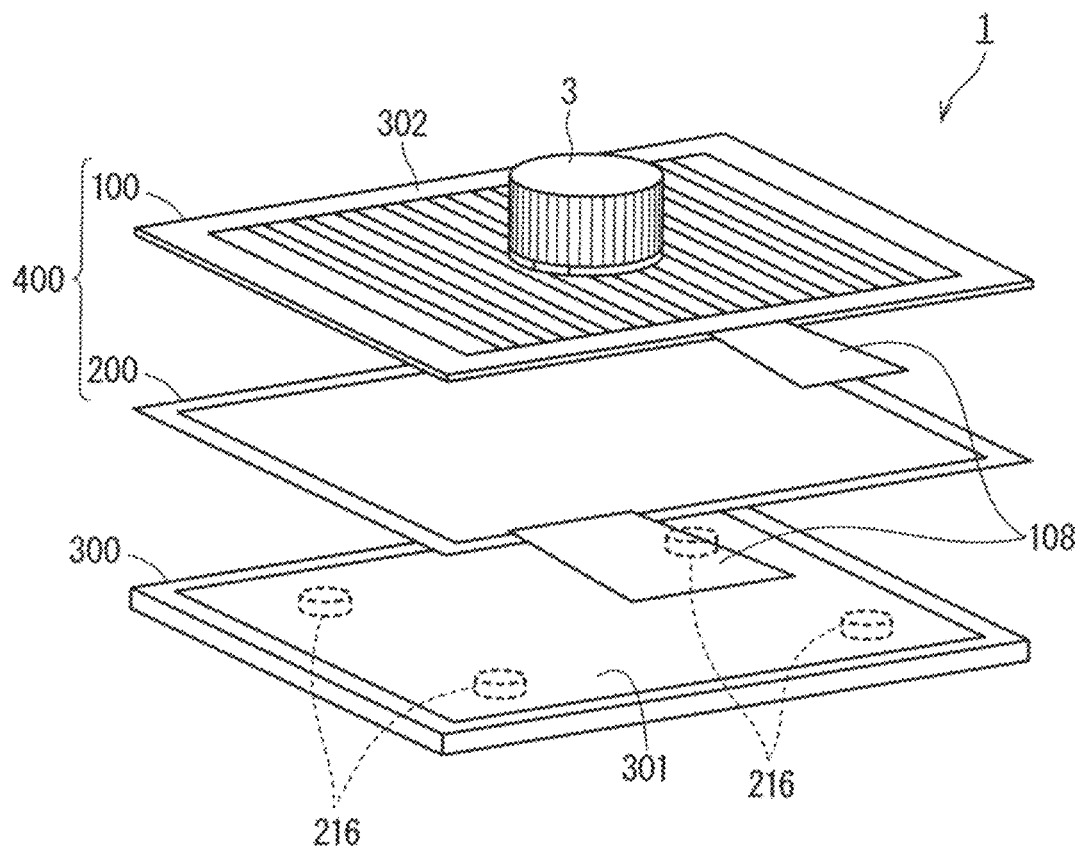
FIG. 1 An exploded perspective view schematically illustrating a configuration of a tactile presentation touch display according to an embodiment 1.
Figure 2:
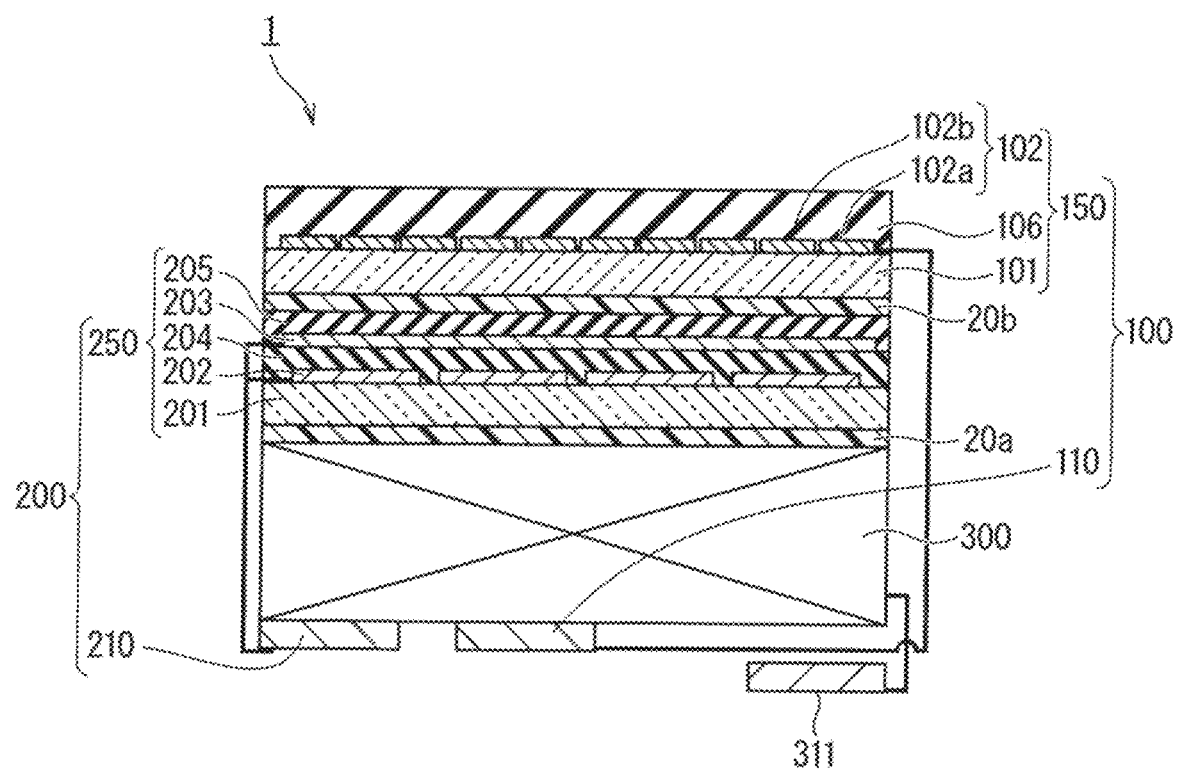
FIG. 2 A cross-sectional view schematically illustrating a configuration of the tactile presentation touch display in FIG. 1.

FIG. 1 is an exploded perspective view schematically illustrating a configuration of a tactile presentation device in which a tactile presentation knob 3 is placed on a tactile presentation touch display 1 to present tactile of an operational feeling and an operation amount according to the present embodiment 1. FIG. 2 is a cross-sectional view schematically illustrating a configuration of the tactile presentation touch display 1.

The tactile presentation touch display 1 includes a tactile presentation touch panel 400 and a display panel 300 to which the tactile presentation touch panel 400 is attached. The display panel 300 includes a pressure-sensitive sensor 216. The tactile presentation touch panel 400 includes a tactile presentation panel 100 and a touch panel 200. The tactile presentation panel 100 includes a tactile presentation screen 150 and a voltage supply circuit 110. The touch panel 200 includes a touch screen 250 and a touch detection circuit 210.

In the present embodiment 1, the tactile presentation screen 150 is disposed on a side facing a user (front side) of the tactile presentation touch display 1, and is fixed to a surface facing the user (front side surface) of the touch screen 250 by an adhesive member 20b. The touch screen 250 is fixed to a surface facing the user (front side surface) of the display panel 300 by an adhesive member 20a.

The tactile presentation screen 150 includes a transparent insulating substrate 101, a tactile electrode 102, and a dielectric layer 106. The tactile electrode 102 includes a plurality of first electrodes 102a and a plurality of second electrodes 102b alternately disposed on the transparent insulating substrate 101 at intervals. The dielectric layer 106 covers the plurality of first electrodes 102a and the plurality of second electrodes 102b. The tactile presentation screen 150 is electrically connected to the voltage supply circuit 110 by a flexible print circuit (FPC) 108. A liquid crystal drive circuit part 311 is provided on a back surface of the display panel 300.

The touch screen 250 includes a transparent substrate 201 having an insulation property, an excitation electrode 202, a detection electrode 203, an interlayer insulating layer 204, and an insulating layer 205. The touch screen 250 is electrically connected to the touch detection circuit 210 by the FPC 108. The touch detection circuit 210 detects a touched position on the transparent insulating substrate 101 of the tactile presentation screen 150. Accordingly, not only the tactile presentation but also the touch position detection can be achieved on the transparent insulating substrate 101. The touch detection circuit 210 includes a detection integrated circuit (IC) for detecting a change in the electrostatic capacitance by a touch and a microcomputer, for example. Details of a configuration of the touch screen 250 is described hereinafter with a specific example.

The display panel 300 includes two transparent insulating substrates facing each other and a display function layer sandwiched between the two transparent insulating substrates and having a display function. The display panel 300 is typically a liquid crystal panel. The display panel 300 may be an organic electro-luminescence (EL) panel, a micro light emitting diode (p, LED) panel, or an electronic paper panel. The touch panel 200 is typically a PCAP. When the pressure-sensitive sensor 216 has a touch position detection function, the touch panel 200 is not necessary. Any system is applicable to the pressure-sensitive sensor 216 as long as a pressure-sensitive sensor which can detect pressing force is applied, such as an electrostatic capacitance system detecting a deformation of a member constituting the tactile presentation touch display 1 by pressing force as a capacitance change or a piezoelectric system detecting a resistance change in a semiconductor distortion gauge.

<Outline of Tactile Presentation Panel>

Figure 3:
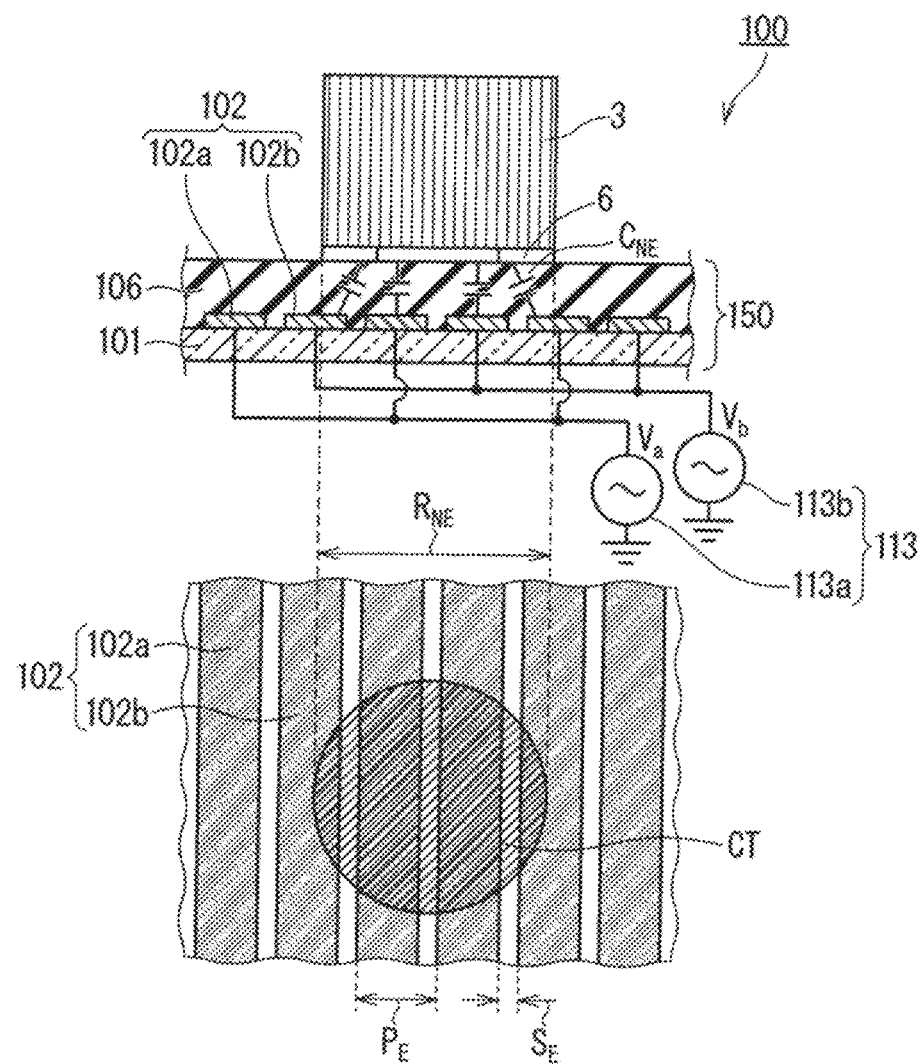
FIG. 3 A schematic view for explaining electrostatic capacitance formed between a tactile electrode included in a tactile presentation panel in FIG. 2 and a tactile presentation knob.
Figure 4:
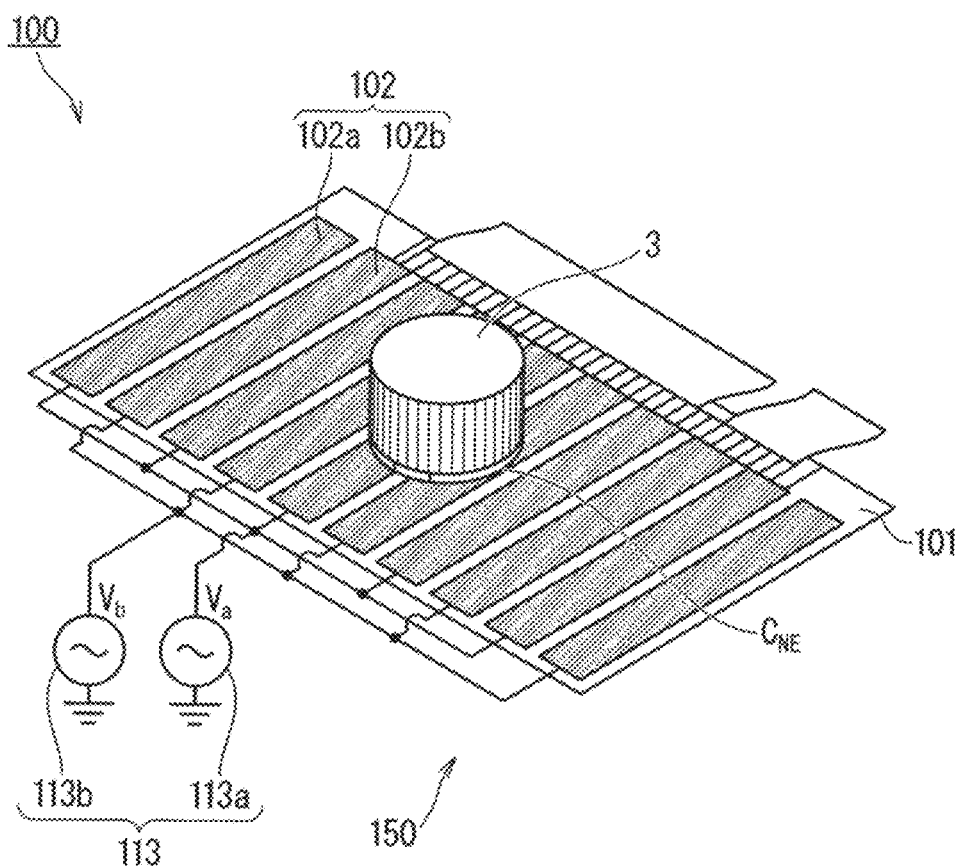
FIG. 4 A perspective view for explaining electrostatic capacitance formed between the tactile electrode included in the tactile presentation panel in FIG. 2 and the tactile presentation knob.

FIG. 3 is a diagram for schematically describing an electrostatic capacitance $C_{NE}$ formed between the tactile electrode 102 and the tactile presentation knob 3 included in the tactile presentation panel 100. FIG. 4 is a perspective view of FIG. 3. When the tactile presentation knob 3 has contact with a contact surface CT as a part of a front side surface of the tactile presentation screen 150, the electrostatic capacitance $C_{NE}$ is formed between the tactile presentation knob 3 on the contact surface CT and the tactile electrode 102 via the dielectric layer 106. In these diagrams, only a tactile presentation voltage generation circuit 113 included in the voltage supply circuit 110 (refer to FIG. 2) is illustrated to easily see the diagrams, and the other configuration included in the voltage supply circuit 110 is not illustrated. A more specific configuration of the voltage supply circuit 110 is describe hereinafter.

The tactile presentation voltage generation circuit 113 included in the voltage supply circuit 110 includes a first voltage generation circuit 113a and a second voltage generation circuit 113b. The first voltage generation circuit 113a applies a voltage signal $V_a$ (first voltage signal) to the first electrode 102a in the plurality of first electrodes 102a located on at least part of a region of the transparent insulating substrate 101, and in the present embodiment 1, the first voltage generation circuit 113a applies the voltage signal $V_a$ to all the first electrodes 102a located on at least part of the region of the transparent insulating substrate 101. The second voltage generation circuit 113b applies a voltage signal $V_b$ (second voltage signal) to the second electrode 102b in the plurality of second electrodes 102b located on at least part of a region of the transparent insulating substrate 101, and in the present embodiment 1, the second voltage generation circuit 113b applies the voltage signal $V_b$ to all the second electrodes 102b located on at least part of the region of the transparent insulating substrate 101.

Figure 5:
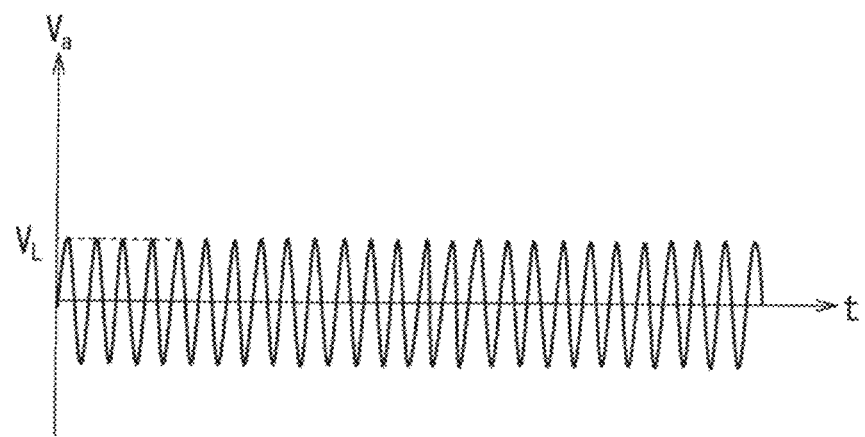
FIG. 5 A graph showing an example of a voltage signal of a first frequency applied to a first electrode in FIG. 2.
Figure 6:
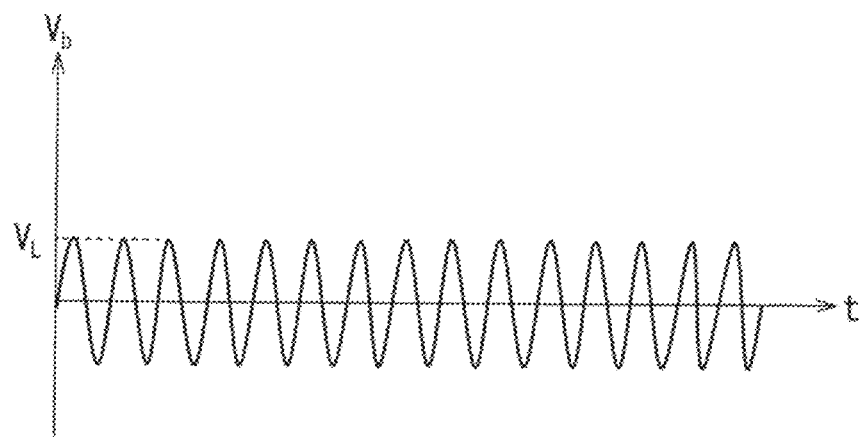
FIG. 6 A graph showing an example of a voltage signal of a second frequency applied to a second electrode in FIG. 2.

FIG. 5 and FIG. 6 are graphs each showing an example of the voltage signal $V_a$ and the voltage signal $V_b$. The voltage signal $V_a$ in the first voltage generation circuit 113a has a first frequency. The voltage signal $V_b$ in the second voltage generation circuit 113b has a second frequency different from the first frequency. An amplitude of the voltage signal $V_a$ and an amplitude of the voltage signal $V_b$ may be the same amplitude $V_L$. In the example in FIGS. 5 and 6, sine waves having different frequencies are used as the voltage signal $V_a$ and the voltage signal $V_b$. A pulse wave or a wave having the other shape may be used in place of the sine wave. The amplitude $V_L$ is preferably approximately several tens of V to generate sufficiently large tactile.

Figure 7:
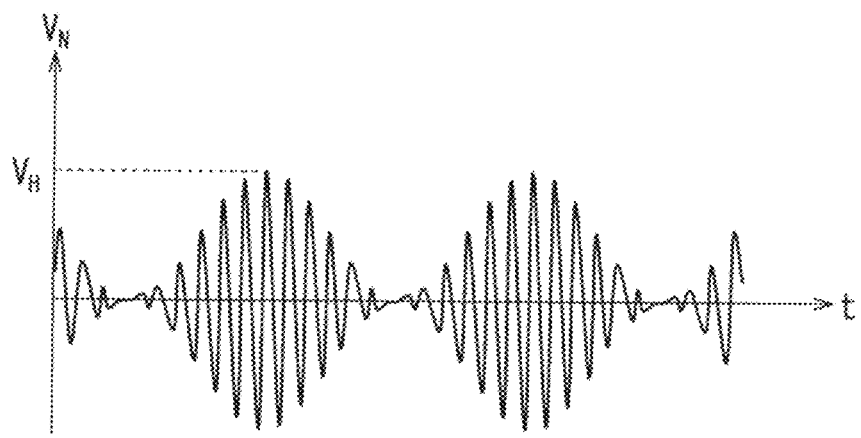
FIG. 7 A graph showing an amplitude-modulated signal generated by combining each voltage signal in FIG. 5 and FIG. 6.

FIG. 7 is a graph showing an amplitude-modulated signal $V_N$ generated by combining the voltage signal $V_a$ (refer to FIG. 5) and the voltage signal $V_b$ (refer to FIG. 6). The voltage signal $V_a$ is applied to the first electrode 102a, and the voltage signal $V_b$ is applied to the second electrode 102b. As a result, repeated are discharge and charge in accordance with the amplitude-modulated signal $V_N$ having a maximum amplitude $V_H$ twice as large as the amplitude V L in the region where the electrostatic capacitance $C_{NE}$ (refer to FIG. 4) is formed between the tactile presentation knob 3 and each of the first electrode 102a and the second electrode 102b. As a result, electrostatic force corresponding to the amplitude-modulated signal $V_N$ of the maximum amplitude $V_H$ is applied to the tactile presentation knob 3 having contact with the first electrode 102a and the second electrode 102b to extend over them via the dielectric layer 106. The amplitude-modulated signal $V_N$ has a beat frequency corresponding to a difference between the first frequency and the second frequency described above. Thus, when the tactile presentation knob 3 is rotated on the tactile presentation screen 150, friction force acting on the tactile presentation knob 3 is generated with the beat wave describe above. As a result, the tactile presentation knob 3 is vibrated by turning ON/OFF the electrostatic force generated by the beat wave in accordance with presence or absence of application of the voltage signal $V_a$ and the voltage signal $V_b$. The user senses the vibration of the tactile presentation knob 3 as tactile obtained from the tactile presentation screen 150. As described above, the tactile presentation screen 150 included in the tactile presentation panel 100 changes the friction force applied to the tactile presentation knob 3 by controlling the electrostatic force applied to the tactile presentation knob 3, thereby generating the tactile.

As described above, the amplitude-modulated signal $V_N$ having the voltage approximately twice as large as each of the inputted voltage signal $V_a$ (refer to FIG. 5) and voltage signal $V_b$ (refer to FIG. 6) which has been inputted. Accordingly, the amplitude-modulated signal $V_N$ necessary for desired friction force to act on the tactile presentation knob 3 can be generated by the voltage signal $V_a$ (refer to FIG. 5) and the voltage signal $V_b$ (refer to FIG. 6) each having voltage approximately half as large as the amplitude-modulated signal $V_N$. Thus, the equivalent electrostatic force can be generated with half the voltage compared with a case where an amplitude-modulated signal is directly inputted to the first electrode 102a and the second electrode 102b, and driving can be performed at low voltage.

A pulse signal may be used as the voltage signal $V_a$ and the voltage signal $V_b$. In such a case, the tactile presentation knob 3 is vibrated by turning ON/OFF the electrostatic force caused by differential voltage of the voltage signal $V_a$ and the voltage signal $V_b$ in accordance with presence or absence of application of the voltage signal V a and the voltage signal $V_b$ using a pulse waveform in an opposite phase of the same amplitude $V_L$.

In order to present sufficiently large tactile to the user, it is sufficient that the maximum amplitude $V_H$ is sufficiently large to correspond to the tactile, and the amplitude $V_L$ may have a small value compared with the maximum amplitude $V_H$. Thus, the amplitude $V_L$ needs not be large enough to generate sufficiently large tactile by the amplitude $V_L$ itself. When the amplitude $V_L$ is set in such a manner, the user hardly senses the tactile even when any frequency of the voltage signal $V_a$ and the voltage signal $V_b$ is selected in a state where only one of the first electrode 102a and the second electrode 102b has contact with the tactile presentation knob 3.

A pitch $P_E$ of the tactile electrode 102 is preferably smaller than a diameter $R_{NE}$ of the contact surface CT so that the tactile presentation knob 3 is easily located to extend over the first electrode 102a and the second electrode 102b. Details of this are described hereinafter.

<Touch Panel>

Figure 8:
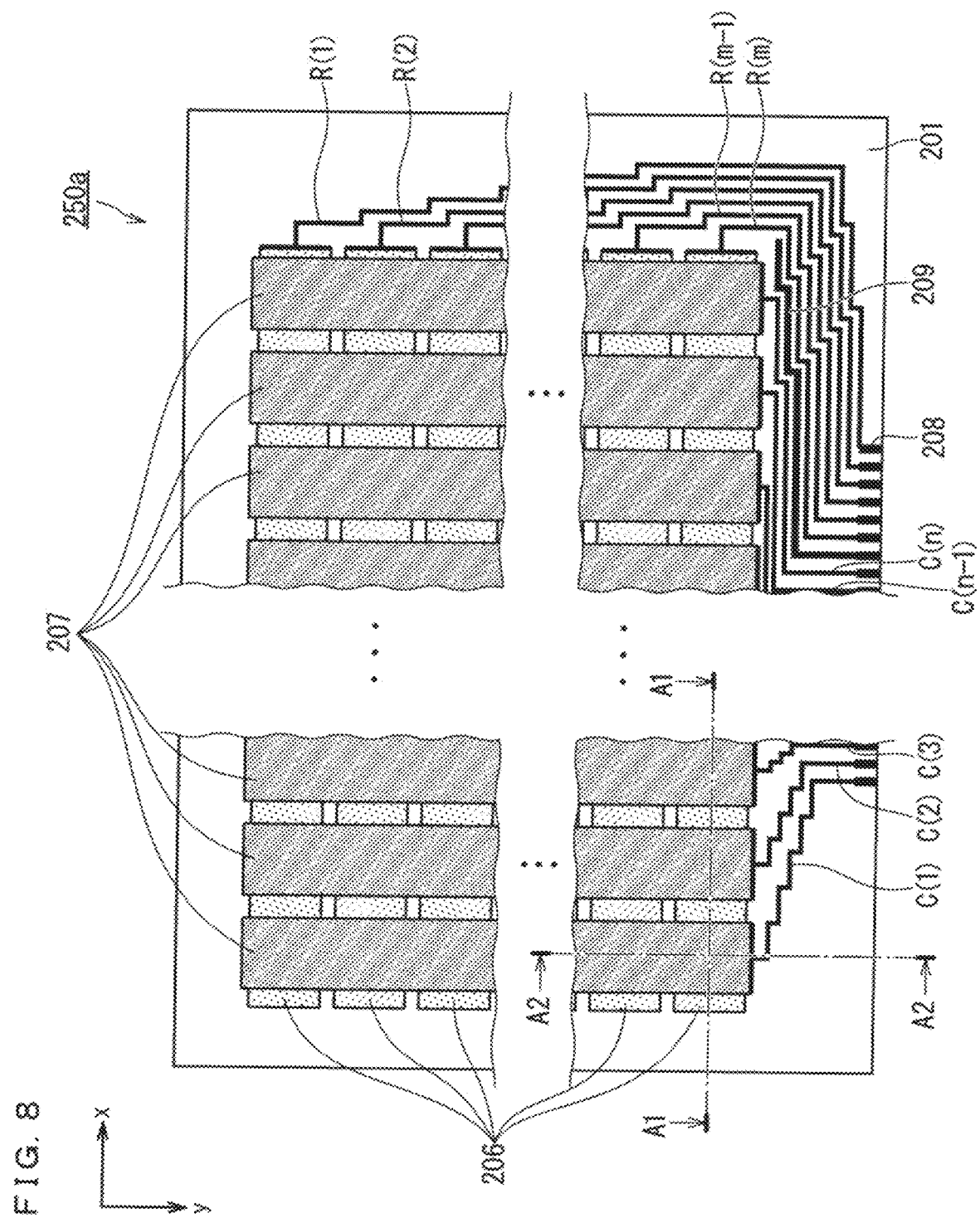
FIG. 8 A plan view illustrating an example of a touch screen in FIG. 2.
Figure 9:
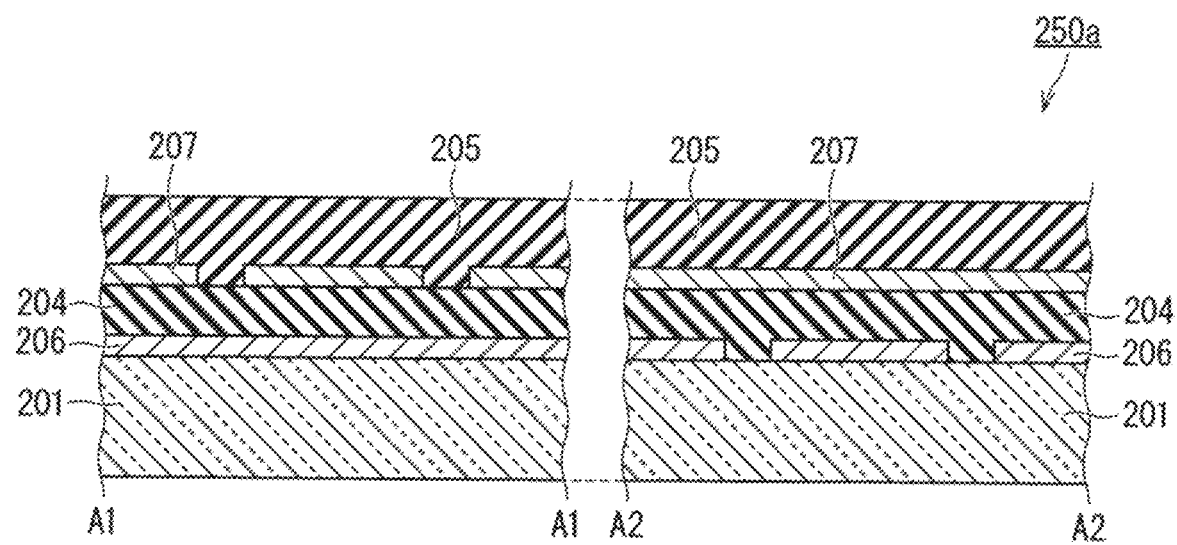
FIG. 9 A partial cross-sectional view along a line A1-A1 and a line A2-A2 in FIG. 8.

FIG. 8 is a plan view illustrating a touch screen 250a in an electrostatic capacitance system as an example of the touch screen 250 (refer to FIG. 2). FIG. 9 is a partial cross-sectional view along a line A1-A1 and a line A2-A2 in FIG. 8.

The touch screen 250a includes a plurality of row direction wiring layers 206 and a plurality of column direction wiring layers 207. Each of the row direction wiring layers 206 is made up of the plurality of excitation electrodes 202 electrically connected to each other (refer to FIG. 2), and each of the column direction wiring layers 207 is made up of the plurality of detection electrodes 203 electrically connected to each other (refer to FIG. 2). FIG. 8 and FIG. 9 illustrate the row direction wiring layers 206 and the column direction wiring layers 207 regardless of such a minute structure. The excitation electrode 202 (refer to FIG. 2) is made up of a single layer film or a multilayer film of metal or a multilayer structure including any of the single layer film and multilayer film and also using the other conductive material. Aluminum or silver, for example, having low resistance is preferable as the metal. The same applies to the detection electrode 203 (refer to FIG. 2). Wiring resistance can be reduced by using the metal as the wiring material. In the meanwhile, the metal wiring is opaque, thus can be visually recognized easily. It is sufficient that a thin wire structure is applied to the metal wiring to reduce visibility and increase transmissivity of the touch screen. The thin wire structure typically has a meshed pattern.

Each of the row direction wiring layers 206 extends along the row direction (x direction in FIG. 8), and each of the column direction wiring layers 207 extends along the column direction (y direction in FIG. 8). The plurality of row direction wiring layers 206 are arranged at intervals in the row direction, and the plurality of column direction wiring layers 207 are arranged at intervals in the column direction. As illustrated in FIG. 8, each of the row direction wiring layers 206 intersects with the plurality of column direction wiring layers 207, and each of the column direction wiring layers 207 intersects with the plurality of row direction wiring layers 206 in a plan view. The row direction wiring layer 206 and the column direction wiring layer 207 are insulated by the interlayer insulating layer 204.

The interlayer insulating layer 204 is made up of a single layer film of an organic insulating film, a single layer film of an inorganic insulating film, or a multiplayer film. The inorganic insulating film is excellent in increasing moisture resistance, and the organic insulating film is excellent in increasing flatness. Applied as the inorganic insulating film is a transparent silicon inorganic insulating film such as a silicon oxide film, a silicon nitride film, or a silicon oxynitride film or a transparent inorganic insulating film made up of a metal oxide such as alumina, for example. Applicable as a material of the organic insulating film is a high-polymer material having a main chain made up of a silicon oxide film, silicon nitride film, or a silicon oxynitride film and also having an organic material binding to a side chain thereof or a functional group or thermoset resin having a main chain made of carbon. Examples of the thermoset resin include acrylic resin, polyimide resin, epoxy resin, novolac resin, or olefin resin.

Each of the row direction wiring layers 206 of the touch screen 250a is connected to a touch screen terminal part 208 by lead-out wiring layers R(1) to R(m). Each of the column direction wiring layers 207 is connected to the touch screen terminal part 208 by lead-out wiring layers C(1) to C(n). The touch screen terminal part 208 is provided on an end portion of the substrate 201.

The lead-out wiring layers R(1) to R(m) are disposed on an outer side of a detectable area, and extend to corresponding electrodes in an order of increasing distance from a center of arrangement of the touch screen terminal part 208 to obtain substantially a shortest distance. The lead-out wiring layers R(1) to R(m) are arranged as densely as possible while ensuring insulation therebetween. The same applies to the lead-out wiring layers C(1) to C(n). According to such an arrangement, an area on the outer side of the detectable area in the substrate 201 can be reduced.

A shield wiring layer 209 may be provided between a group of the lead-out wiring layers R(1) to R(m) and a group of the lead-out wiring layers C(1) to C(n). Accordingly, suppressed is occurrence of noise in the other one of the groups due to an influence from one of the groups. An influence of electromagnetic noise occurring in the display panel 300 (refer to FIG. 2) on the lead-out wiring layer can be reduced. The shield wiring layer 209 may be formed at the same time as the row direction wiring layer 206 or the column direction wiring layer 207 by the same material.

The insulating layer 205 is provided on the substrate 201 so that the touch screen terminal part 208 is exposed, and covers the row direction wiring layer 206, the column direction wiring layer 207, and the interlayer insulating layer 204. The insulating layer 205 can be formed by a material similar to that of the interlayer insulating layer 204. When the display panel 300 is a liquid crystal panel, an upper side polarization plate on which an anti-glare treatment for a liquid crystal panel is performed may be attached to a part of the insulating layer 205 through which light for display passes.

Figure 10:
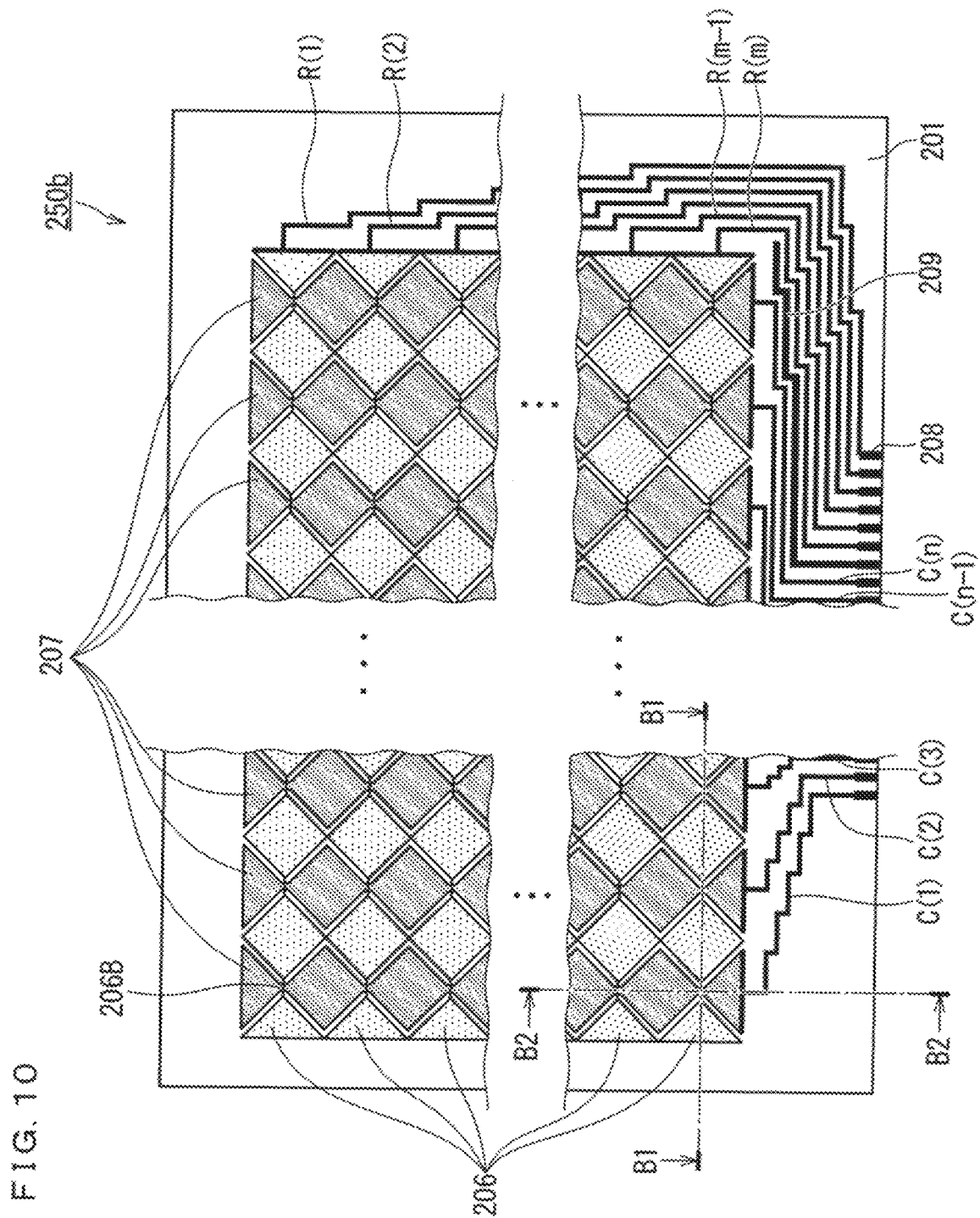
FIG. 10 A plan view illustrating an example of the touch screen in FIG. 2.
Figure 11:
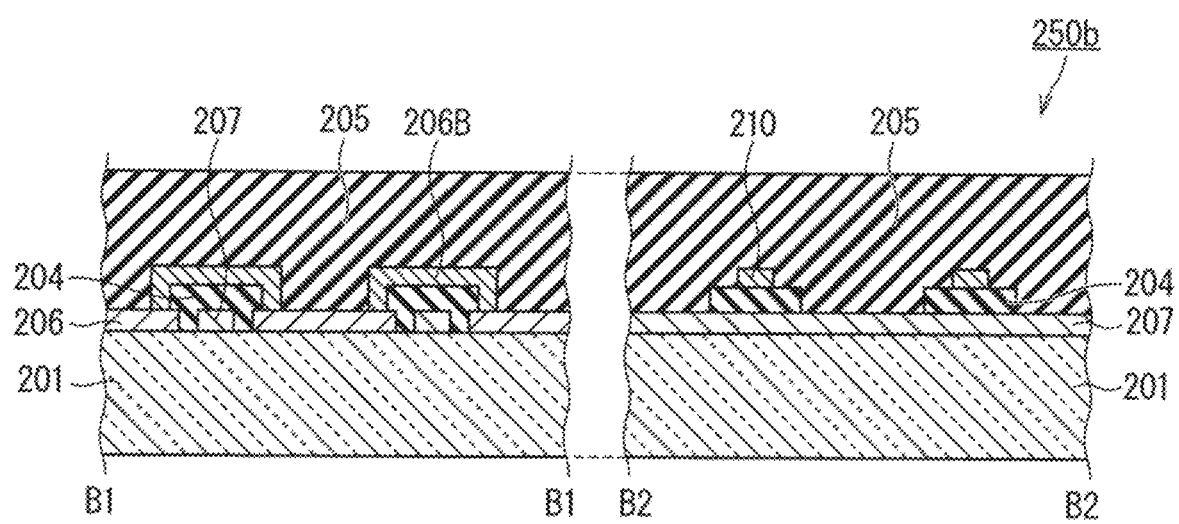
FIG. 11 A partial cross-sectional view along a line B1-B1 and a line B2-B2 in FIG. 10.

FIG. 10 is a plan view illustrating a touch screen 250b in an electrostatic capacitance system as an example of the touch screen 250 (refer to FIG. 2). FIG. 11 is a partial cross-sectional view along a line B1-B1 and a line B2-B2 in FIG. 10. In the example in FIG. 10 and FIG. 11, a so-called diamond structure is adopted.

The row direction wiring layer 206 and the column direction wiring layer 207 are disposed in the same layer. Each of the column direction wiring layers 207 includes an electrode having a shape made up of a plurality of diamond shapes connected to each other as the detection electrode 203. The row direction wiring layer 206 includes an electrode having a shape made up of a plurality of diamond shapes located away from each other as the excitation electrode 202 and a bridge 206B electrically connecting the electrodes each having the diamond shape adjacent to each other. The interlayer insulating layer 204 is disposed to insulate the bridge 206B and the column direction wiring layer 207. A bridge structure may be applied to the column direction wiring layer instead of the row direction wiring layer. Electrical resistance of the wiring layer tends to be high by forming the bridge, thus the bridge structure is preferably applied to one of the column direction wiring layer and the row direction wiring layer having a shorter length than the other one.

A transparent conductive film made of indium tin oxide (ITO), for example, is used as a material of the row direction wiring layer 206 and the column direction wiring layer 207. ITO has translucency, thus there is a low possibility that the wiring layer is visually recognized by the user. The transparent conductive film made of ITO, for example, has relatively high electrical resistance, thus is appropriate for a small touch screen which does not have a problem of wiring resistance. The transparent conductive film made of ITO, for example, has a feature that a wiring is easily disconnected from the other metal wiring by corrosion, thus moisture resistance and a waterproof property need to be considered to prevent the corrosion.

Described above is a case where the structure of the touch screen and the structure of the display panel are independent from each other, however, these structures may be inseparably integrated with each other. For example, in a case of a so-called on-cell touch panel, a touch screen is directly formed on a substrate (typically a color filter substrate) of the display panel 300 without using the substrate 201. In a case of a so-called in-cell touch panel, a touch screen is formed between two transparent insulating substrates (not shown) included in the display panel 300.

Figure 12:
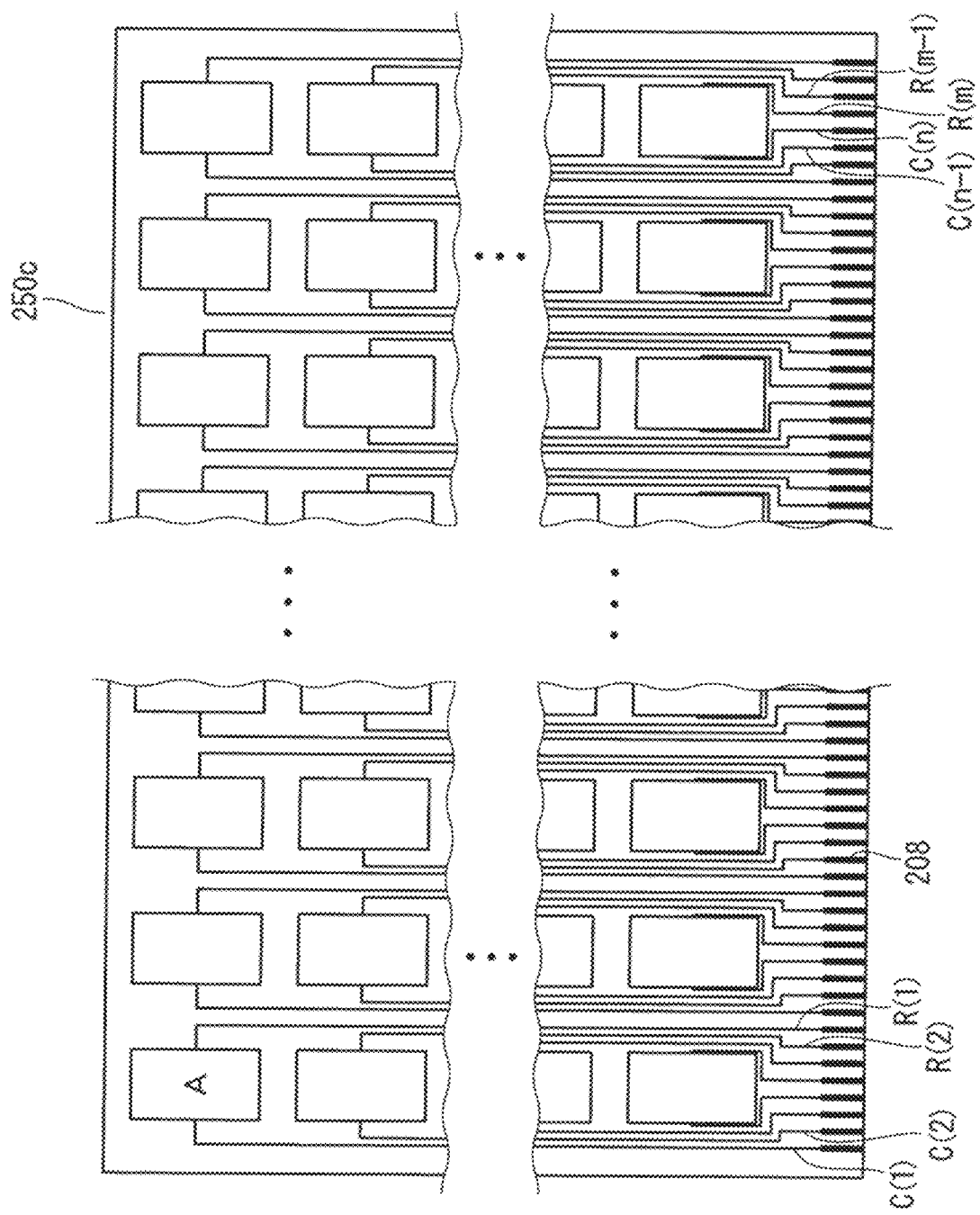
FIG. 12 A plan view schematically illustrating a configuration of a touch panel having a segment structure according to the embodiment 1.
Figure 13:
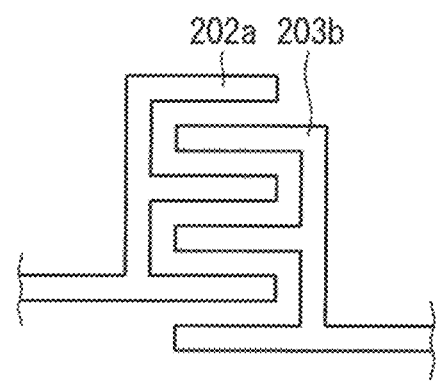
FIG. 13 A plan view schematically illustrating an example of a shape of a detection electrode and an excitation electrode of the touch panel having the segment structure according to the embodiment 1.
Figure 14:
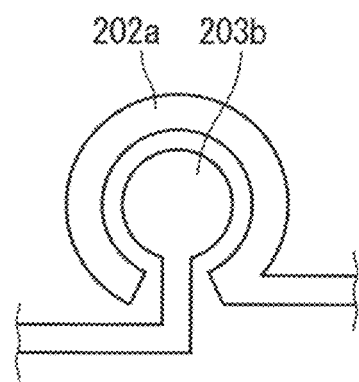
FIG. 14 A plan view schematically illustrating an example of a shape of the detection electrode and the excitation electrode of the touch panel having the segment structure according to the embodiment 1.

The touch screen described above has the detection structure made up of the row direction wiring layer 206 and the column direction wiring layer 207, however, the structure of the touch screen is not limited thereto. For example, FIG. 12 is a plan view schematically illustrating a configuration of a touch screen 250c having a detection structure in which a segment made up of a detection electrode and an excitation electrode is arranged in a matrix. FIG. 13 and FIG. 14 illustrate an example of a pattern shape of an excitation electrode 202a and a detection electrode 203b disposed in a segment of an area A in FIG. 12. Used is the touch screen 250c having a segment structure that a segment made up of the excitation electrode 202a and the detection electrode 203b as one set illustrated in FIG. 13 and FIG. 14 is arranged in a matrix and independently driven. The touch panel can also double as the tactile presentation panel 100a and the touch panel 200 by switching a switch in a drive circuit.

<Pressure-Sensitive Sensor>

The pressure-sensitive sensor 216 illustrated in FIG. 1 is described. The pressure-sensitive sensor 216 generally has a system of detecting pressure applied to a diaphragm made up of semiconductor silicon (Si) as a deformation of a film, an electrostatic capacitance system of detecting a deformation of the display panel or the touch panel occurring in accordance with the pressing force by a change of the electrostatic capacitance, and a resistance system of detecting a resistance change of a metal wire by distortion in accordance with the pressing force, for example.

In the case of the electrostatic capacitance system, the pressure-sensitive sensor 216 is disposed in four symmetric positions on a diagonal line on a surface of the display panel 300 on a side opposite to the display surface, for example. In this case, when an operation surface of the tactile presentation touch display 1 is pressed with the tactile presentation knob 3, the tactile presentation touch display 1 is deflected in a direction on a side of a surface opposite to the operation surface by the pressing force, or minutely moved in a direction of the surface opposite to the operation surface. The pressure-sensitive sensor 216 detects a capacitance change occurring when an interval between capacitance detection electrodes disposed in the pressure-sensitive sensor 216 is reduced, thereby detecting the pressing force. Each capacitance detection electrode in the pressure-sensitive sensor 216 is disposed at an optional interval in parallel to the operation surface of the tactile presentation touch display 1.

Also in the case other than the electrostatic capacitance system, a change in a shape of any of members constituting the tactile presentation touch display 1 by the pressing force is detected to detect the pressing force.

The pressure-sensitive sensor 216 is disposed on a lower side (a side opposite to the display surface) of the display panel 300 in FIG. 1, however, the configuration is not limited thereto. It is sufficient that the pressure-sensitive sensor 216 is disposed in a position where repeatability of a relationship between the change in the shape and the pressing force is fine, the change in the shape by the pressing force is large, and sensitivity of the pressure-sensitive sensor 216 is highest in the structure of the tactile presentation touch display 1.

When the pressure-sensitive sensor 216 is disposed so that a pressing position can be calculated by a balance of a detection value of the pressure-sensitive sensor 216, the pressure-sensitive sensor 216 can detect not only the pressing force but only the touch position, thus can commonly used as the touch panel 200. Detection of the touch position performed by the pressure-sensitive sensor 216 is described hereinafter.

<Tactile Presentation Panel>

Figure 15:
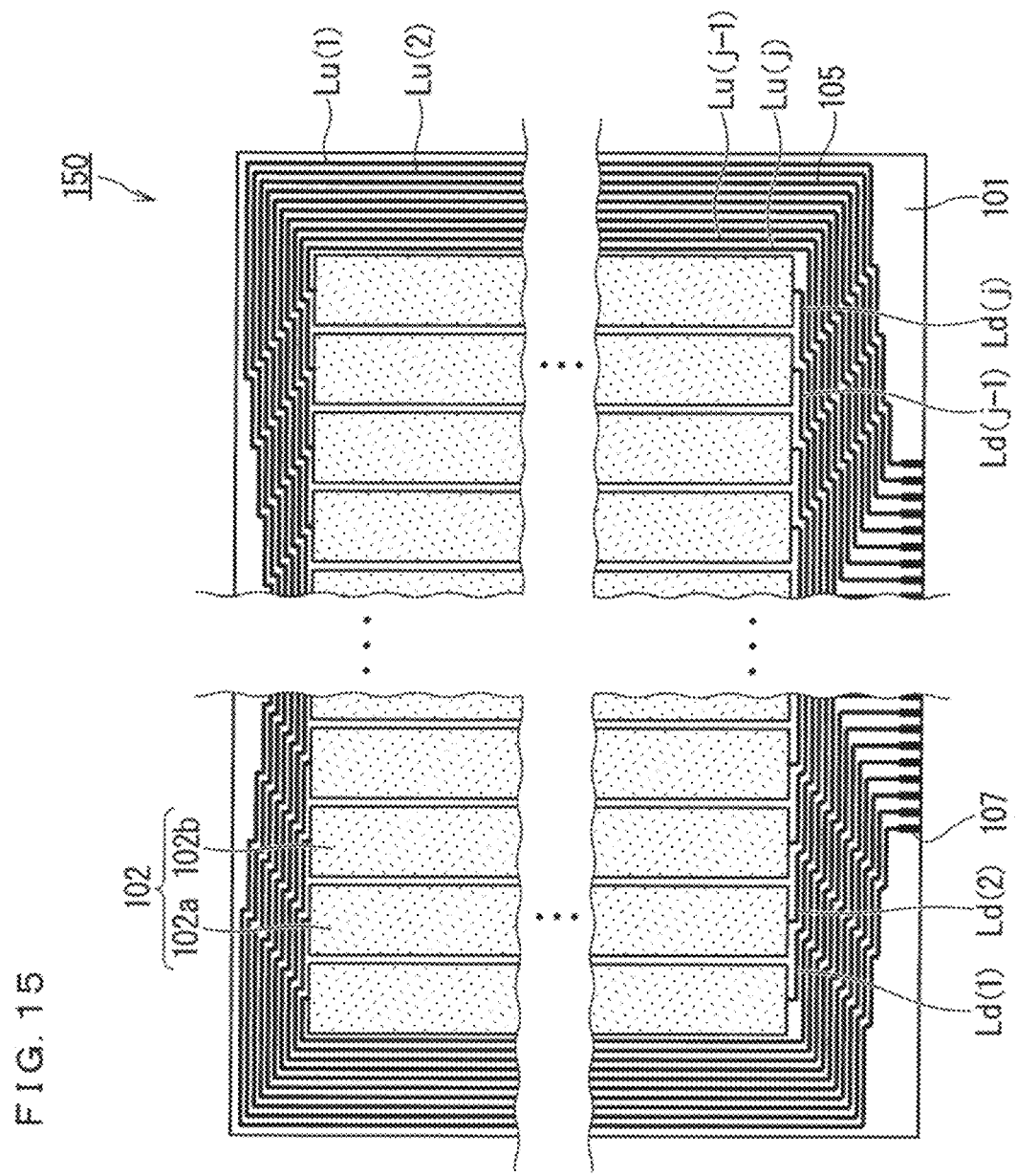
FIG. 15 A plan view schematically illustrating a configuration of a tactile presentation screen in FIG. 2.
Figure 16:
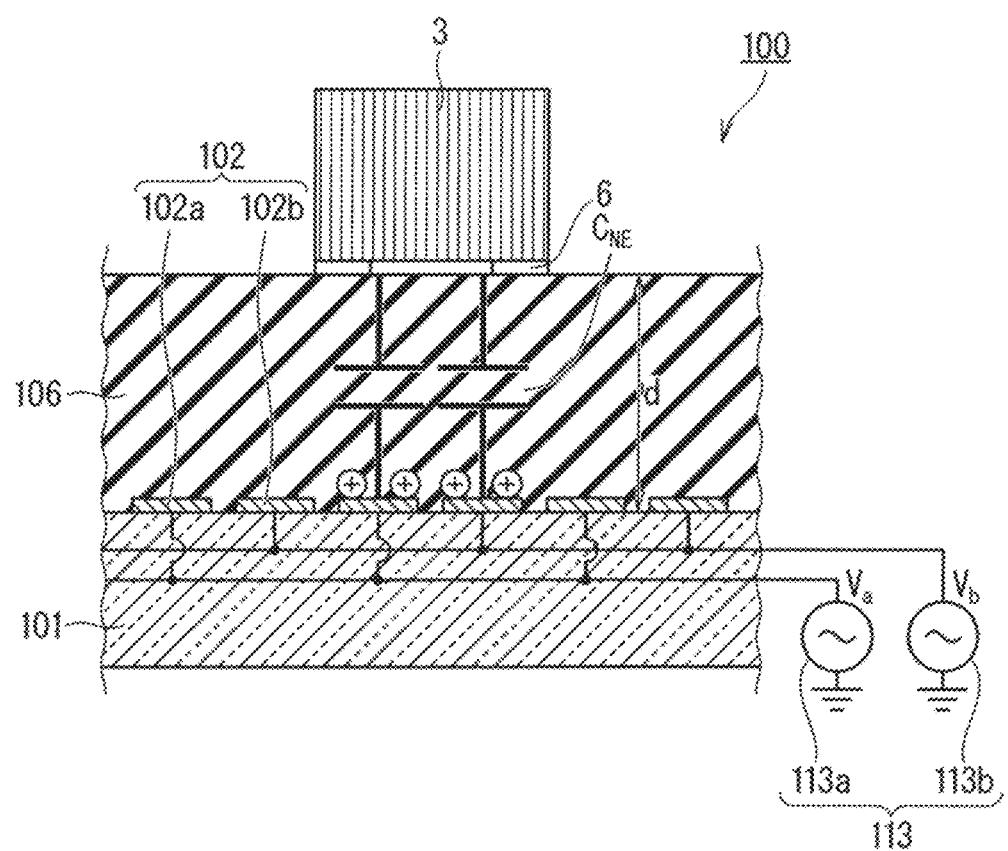
FIG. 16 A schematic view for explaining electrostatic capacitance formed between a tactile electrode included in the tactile presentation panel in FIG. 2 and an indicator.

FIG. 15 is a plan view schematically illustrating a configuration of the tactile presentation screen 150. FIG. 16 is a schematic view for explaining formation of the electrostatic capacitance $C_{NE}$ between the tactile electrode 102 and the tactile presentation knob 3.

As described above, the tactile presentation screen 150 includes the transparent insulating substrate 101, the tactile electrode 102, and the dielectric layer 106. Furthermore, a tactile presentation panel terminal part 107 is provided on an end portion of the transparent insulating substrate 101, and a plurality of lead-out wiring layers 105 are disposed on the transparent insulating substrate. The dielectric layer 106 is provided so that the tactile presentation panel terminal part 107 is exposed. The tactile electrode 102 is connected to the tactile presentation panel terminal part 107 via the lead-out wiring layer 105. The voltage supply circuit 110 (refer to FIG. 2) is connected to the tactile presentation panel terminal part 107 via the FPC 108 (refer to FIG. 1). Details of the lead-out wiring layer 105 are described hereinafter.

Each of the tactile electrodes 102 extends along an extension direction (vertical direction in FIG. 15). The plurality of tactile electrodes 102 are arranged at intervals along an arrangement direction (lateral direction in FIG. 15). In the example in FIG. 15, the transparent insulating substrate 101 has a rectangular shape with a long side and a short side. Accordingly, the tactile presentation screen 150 also has a long side and a short side in accordance with the transparent insulating substrate 101. In the example in FIG. 12, the arrangement direction is directed along the long side. When a horizontal direction of the tactile presentation screen 150 for an observer is directed along the long side, the arrangement direction is directed along the horizontal direction.

Figure 17:
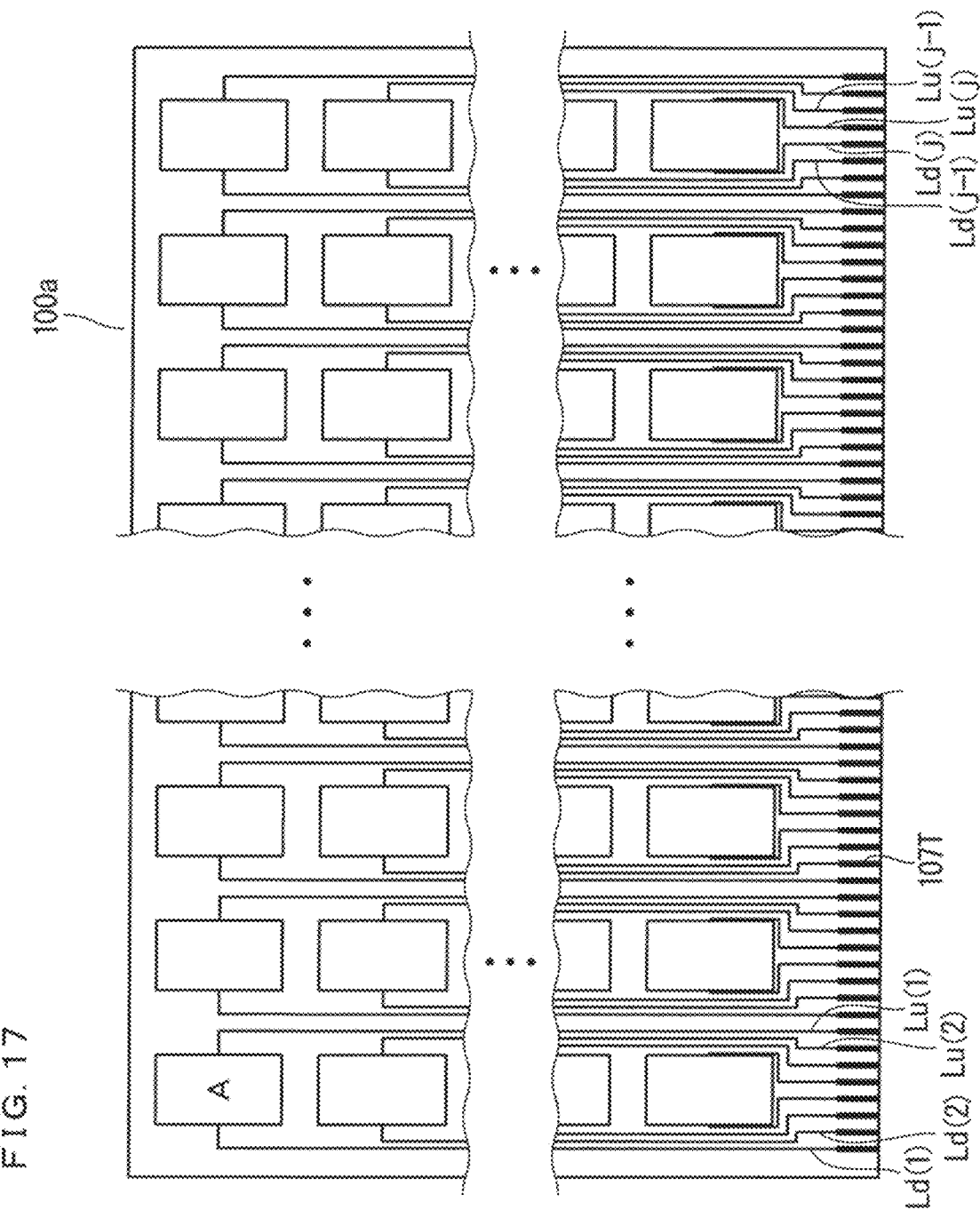
FIG. 17 A plan view schematically illustrating a configuration of a tactile presentation panel having a segment structure according to the embodiment 1.
Figure 18:
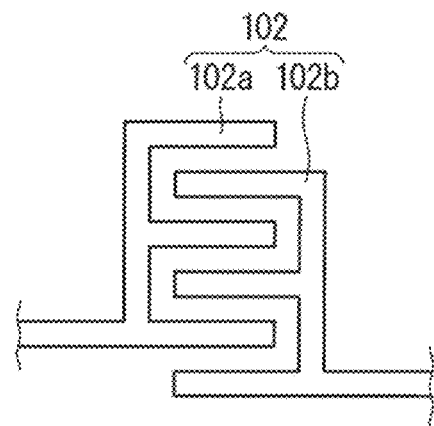
FIG. 18 A plan view schematically illustrating an example of a shape of a tactile electrode of the tactile presentation panel having the segment structure according to the embodiment 1.
Figure 19:
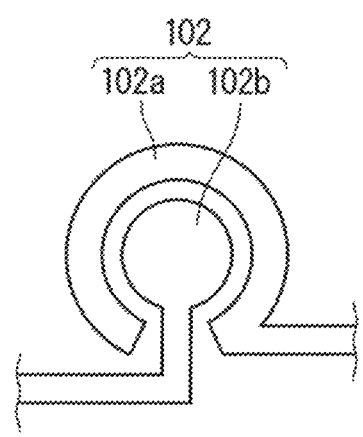
FIG. 19 A plan view schematically illustrating an example of a shape of the tactile electrode of the tactile presentation panel having the segment structure according to the embodiment 1.

Described above is the example that the tactile electrode 102 extends in a direction of extension to be arranged along the arrangement direction in the tactile presentation screen 150, however, the structure of the tactile electrode 102 is not limited thereto. Also applicable is a structure that a plurality of segments are disposed in a matrix as with a tactile presentation panel 100a illustrated in FIG. 17, for example. FIG. 18 and FIG. 19 illustrate an example of a pattern shape of the tactile electrode 102 disposed in a segment of an area A in FIG. 17. The shape of the tactile electrode 102 is not limited to that in FIG. 18 and FIG. 19, however, any structure is applicable as long as mutual capacitance in the same area is larger than that of the electrode between different areas in a structure that the first electrode 102a and the second electrode 102b are adjacent to each other. Specifically, it is sufficient that a distance from the first electrode 102a to the second electrode 102b in the same area is smaller than that in the different area. Accordingly, an influence of the capacitance formed between the detection electrode 203 and the tactile electrode 102 of the touch panel 200 on a touch detection accuracy can be suppressed, thus the wiring resistance of the tactile electrode 102 can be further reduced, and tactile strength (tactual sense) can be further improved.

Stronger tactile can be presented as the electrostatic capacitance $C_{NE}$ formed between the tactile electrode 102 and the tactile presentation knob 3 increases. From this viewpoint, an area of the tactile electrode 102 is preferably large. When a size of the area of the tactile electrode 102 takes priority, it is difficult to achieve a configuration that the tactile electrode 102 is hardly visually recognized by applying the minute structure to the tactile electrode 102. The tactile electrode 102 may be formed by the transparent conductive film so that the tactile electrode 102 is hardly visually recognized while the area of the tactile electrode 102 is increased. ITO is a typical material of the transparent conductive film. The transparent conductive film made of ITO, for example, has relatively high electrical resistance compared with metal, thus is appropriate for a small touch screen which does not have a problem of wiring resistance. When the transparent conductive film needs to be applied to a large touch screen having a problem of wiring resistance, a thickness of the ITO film is increased or a content rate of a dopant is increased to reduce resistivity. In this case, optical absorptance of ITO is changed and the touch screen may seem to have a color, thus a color tone of a display may need to be adjusted in some cases. The transparent conductive film made of ITO, for example, has a feature that a wiring is easily disconnected from the other metal wiring by corrosion, thus when the wiring resistance is reduced by a lamination structure of the electrode with the other metal, moisture resistance and a waterproof property need to be considered to prevent the corrosion.

Instead of using the transparent conductive film described above, the tactile electrode 102 may be a single layer film or a multilayer film made of metal or an electrode having a multilayer structure including any of the single layer film and multilayer film and also using the other conductive material (also referred to as "the metal film-containing electrode" hereinafter). Aluminum or silver, for example, having low resistance is preferable as the metal. Wiring resistance can be reduced by using the metal film-containing electrode. In the meanwhile, the metal film is opaque, thus can be visually recognized easily. Accordingly, it is sufficient that a thin wire structure is applied to the metal film-containing electrode so that the metal film is hardly visually recognized. The thin wire structure typically has a meshed pattern.

The dielectric layer 106 is made up of a single layer film of an organic insulating film, a single layer film of an inorganic insulating film, or a multiplayer film. In a case of the multilayer film, it is applicable that different types of organic insulating film are laminated, different types of inorganic insulating films are laminated, or an organic insulating film and an inorganic insulating film are laminated. The inorganic insulating film has high non-moisture permeability, high hardness, and high abrasion resistance. The tactile presentation knob 3 is rotated on the dielectric layer 106, thus the dielectric layer 106 needs to have high abrasion resistance. The organic insulating film is preferable to obtain high flatness, but has low hardness and low abrasion resistance. Thus, it is preferable to form the inorganic insulating film on the organic insulating film to obtain both high flatness and high abrasion resistance. Applied as the inorganic insulating film is a transparent silicon inorganic insulating film such as a silicon oxide film, a silicon nitride film, or a silicon oxynitride film or a transparent inorganic insulating film made up of a metal oxide such as alumina, for example. Applicable as a material of the organic insulating film is a high-polymer material having a main chain made up of a silicon oxide film, silicon nitride film, or a silicon oxynitride film and also having an organic material binding to a side chain thereof or a functional group or thermoset resin having a main chain made of carbon. Examples of the thermoset resin include acrylic resin, polyimide resin, epoxy resin, novolac resin, or olefin resin.

The electrostatic capacitance $C_{NE}$ is expressed by the following Expression (1).

$$C_{NE}=Q/V=\varepsilon S/d \qquad (1)$$

Herein, Q indicates an amount of charge stored in each of the conductive elastic part 6 and the tactile electrode 102, V indicates voltage between the tactile presentation knob 3 and the tactile electrode 102, ε indicates a dielectric constant of the dielectric layer 106, S indicates a contact area between the conductive elastic part 6 and the tactile electrode 102 via the dielectric layer 106, and d indicates a thickness of the dielectric layer 106. The electrostatic capacitance $C_{NE}$ is proportional to the dielectric constant c, and is inversely proportional to the film thickness d.

According to the above Expression (1), the dielectric constant c is preferably high to increase the electrostatic capacitance $C_{NE}$. Specifically, the dielectric layer 106 preferably include a film having a relative permittivity of 10 or more (also referred to as "high dielectric constant insulating film"). In the high dielectric constant insulating film, a state where positive and negative charge is shifted in a material by an electrical field applied from an outer portion occurs (this is generally referred to as a dielectric polarization). In the dielectric polarization, charge occurring by polarization (generally referred to as polarization charge) is maintained when the voltage is retained. When the voltage is reduced, the polarization charge is reduced, and dielectric polarization is reduced, and when applied voltage is zero voltage, the dielectric polarization is also dissipated. A direction of the dielectric polarization can be changed by an electrical field. The high dielectric constant insulating film may be used as a single layer, or may also be used as a multilayer film by being laminated with the other low dielectric constant inorganic insulating film or low dielectric constant organic insulating film or the other high dielectric constant insulating film. A refraction index generally gets higher as the dielectric constant increases, thus a lamination structure made up of a high refraction index film and a low refraction index film is obtained by laminating the high dielectric constant insulating film and the low dielectric constant insulating film. The dielectric layer 106 may also function as an antireflection film by this lamination structure.

According to the above Expression (1), the thickness d is preferably small to increase the electrostatic capacitance $C_{NE}$. The high dielectric constant insulating film and the organic insulating film are laminated, thus the film thickness of the organic insulating film can be reduced while ensuring a sufficient insulation property. Accordingly, the thickness d of the dielectric layer 106 can be reduced.

When the tactile electrode is assumed to have a matrix structure (that is to say, a structure having an X electrode and a Y electrode intersecting with each other), a level difference, that is to say, a convex-concave portion occurs in an intersection part of the X electrode and the Y electrode (for example, refer to Japanese Patent Application Laid-Open No. 2015-097076). This convex-concave portion is flattened when the insulating layer covering the convex-concave portion has a large thickness, however, there is a limitation on the thickness of the insulating layer to prevent excessive reduction in the electrostatic capacitance $C_{NE}$. Thus, a convex-concave portion may occur in the front side surface of the tactile presentation screen. A texture feeling of this convex-concave portion is combined with a texture feeling caused by the electrostatic force from the tactile electrode, the intended texture feeling is hardly given to the user. When the organic insulating film having an effect of flattening the surface shape is used as the dielectric layer 106, the occurrence of the convex-concave portion described above is prevented, however, a certain level of large thickness is necessary for flattening, thus reduction in the electrostatic capacitance $C_{NE}$ is unpreventable.

In the meanwhile, according to the present embodiment 1, the tactile electrode 102 does not include the intersection part, thus a size of the convex-concave portion is reduced to be approximately the thickness of the tactile electrode 102. Accordingly, the thickness of the organic film having the flattening effect can be reduced, or the high dielectric constant insulating film having a low flattening effect can be applied. Accordingly, the electrostatic capacitance $C_{NE}$ can be larger than that of the case in the matrix structure. The contact surface between the tactile presentation screen 150 and the tactile presentation knob 3 does not have the convex-concave portion so much, thus the tactile caused by the convex-concave portion in the surface is not given to the tactile presentation knob 3 when the signal voltage is not applied, and the tactile of the tactile presentation knob 3 is more clarified when the signal voltage is applied.

Even in a case of the same electrostatic capacitance $C_{NE}$, when the tactile presentation knob 3 is easily slipped on the dielectric layer 106, the user easily senses a change of the electrostatic force between the tactile presentation knob 3 and the tactile electrode 102 as a change of the friction force. Accordingly, larger tactile can be given to the user. Sticking force between the dielectric layer 106 and the tactile presentation knob 3 needs to be suppressed to easily slip the tactile presentation knob 3 on the dielectric layer 106. In order to achieve such a configuration, a film having higher water repellency than an inner portion of the dielectric layer 106 may be provided on an outermost surface of the dielectric layer 106, a contact surface of the conductive elastic part 6 having contact with the dielectric layer 106, or both of them.

<Pitch of Electrode>

Figure 21:
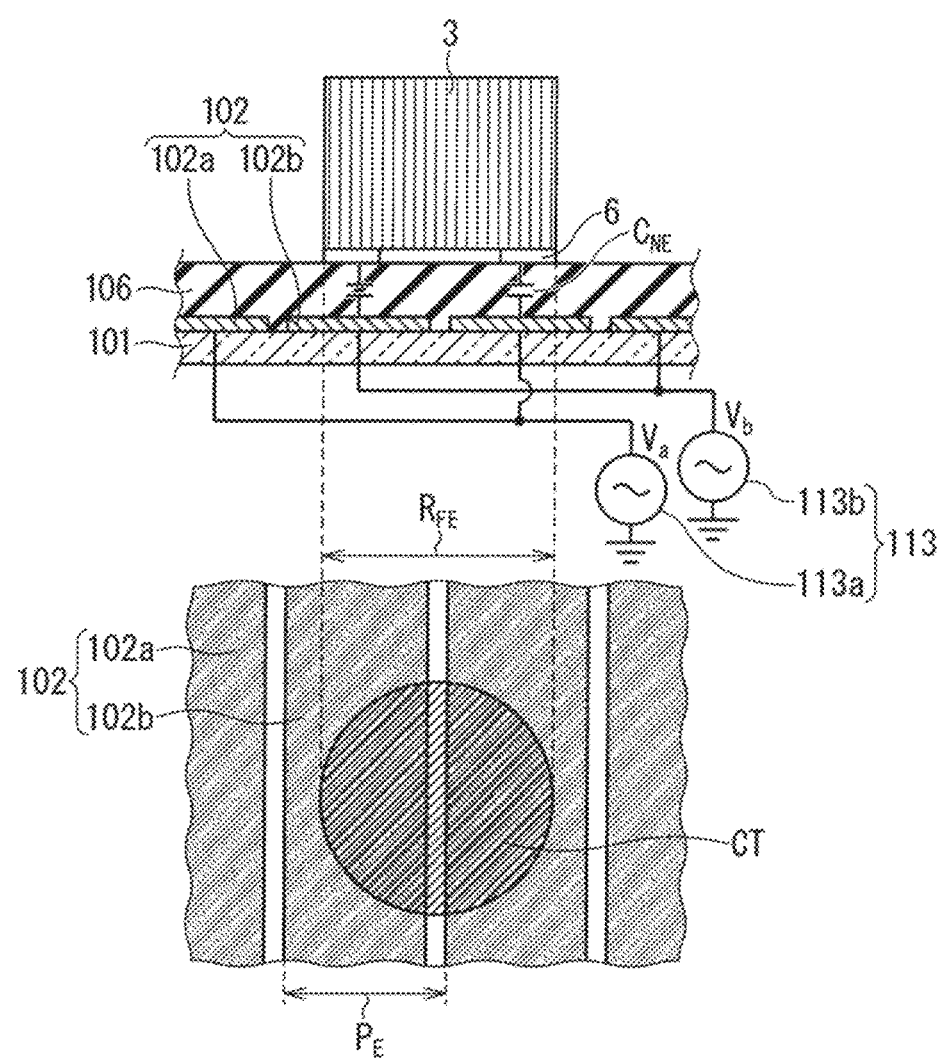
FIG. 21 A schematic view for explaining electrostatic capacitance formed between a tactile electrode and a tactile presentation knob in a case where a pitch of the tactile electrode included in the tactile presentation panel in FIG. 2 is smaller than a diameter of the tactile presentation knob.

FIG. 20 is a schematic view explaining the electrostatic capacitance $C_{NE}$ formed between the tactile electrode 102 and the tactile presentation knob 3 in a case where a pitch $P_E$ of the tactile electrode 102 is larger than a diameter REE of the tactile presentation knob 3. FIG. 21 is a schematic view explaining the electrostatic capacitance $C_{NE}$ formed between the tactile electrode 102 and the tactile presentation knob 3 in a case where the pitch $P_E$ of the tactile electrode 102 is smaller than the diameter RFE.

Figure 22:
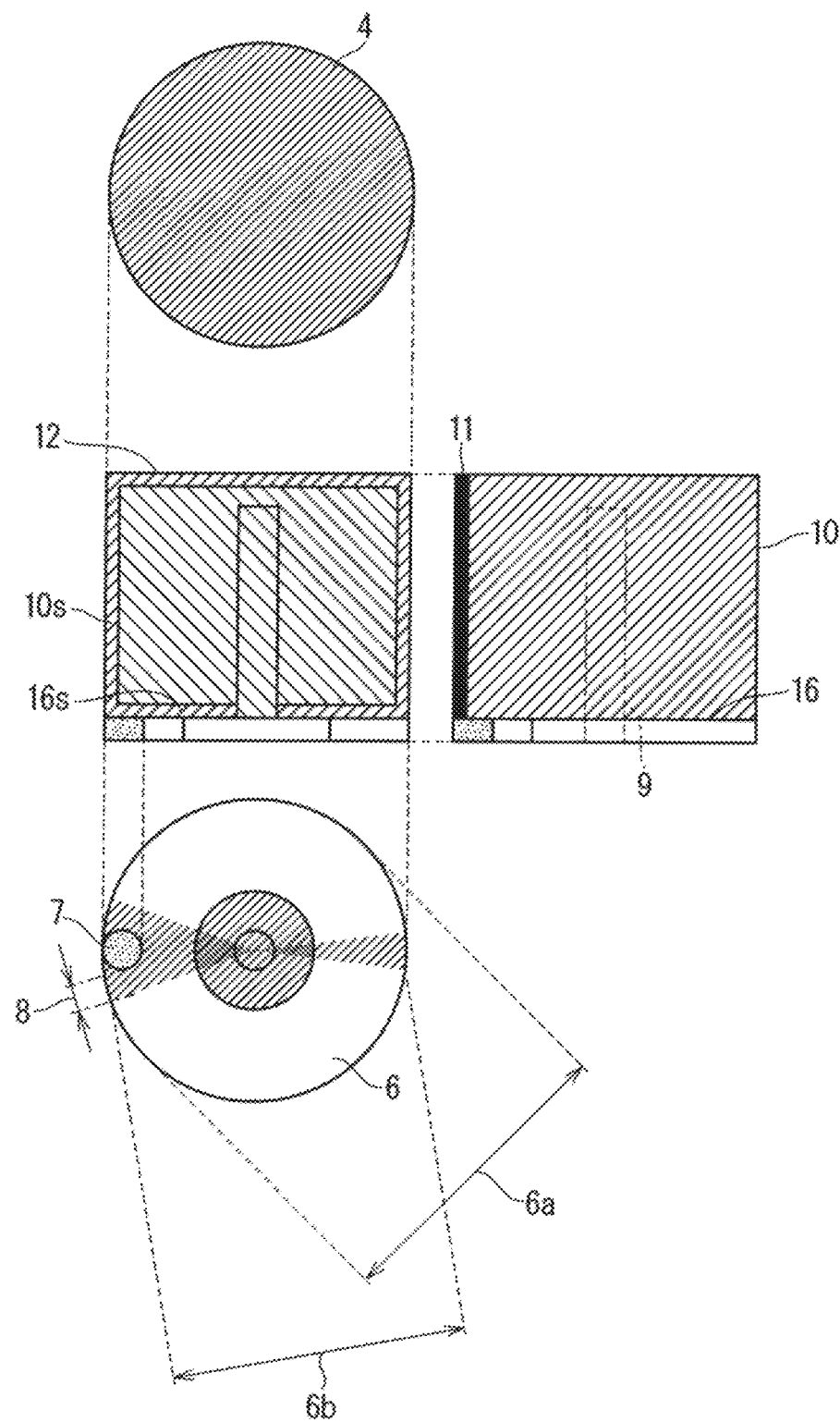
FIG. 22 A schematic view illustrating a configuration of a rotation part of the tactile presentation knob according to the embodiment 1.

In the present embodiment 1, as described above, the voltage signal $V_a$ (refer to FIG. 5) and the voltage signal $V_b$ (refer to FIG. 6) having the different frequency are applied to the first electrode 102a and the second electrode 102b adjacent to each other, respectively, to generate the electrostatic force corresponding to the amplitude-modulated signal $V_N$ (refer to FIG. 7). Accordingly, the friction force between the dielectric layer 106 and the tactile presentation knob 3 is changed in accordance with the beat frequency of the amplitude-modulated signal $V_N$, and the user senses this change as the tactile. In a state illustrated in FIG. 20, only the voltage signal $V_a$ acts on the tactile presentation knob 3, and the voltage signal $V_b$ does not act thereon, thus the amplitude-modulated signal $V_N$ is not generated, and the tactile is not generated. In the meanwhile, when the tactile presentation knob 3 is located on an upper side of a boundary between the first electrode 102a and the second electrode 102b, the tactile is generated. Accordingly, in the configuration in FIG. 20, a position where the tactile is generated and a position where the tactile is not generated occur depending on a position of the tactile presentation knob 3. In the meanwhile, in a state illustrated in FIG. 21, both the voltage signal $V_a$ and the voltage signal $V_b$ act on the tactile presentation knob 3 regardless of the position of the tactile presentation knob 3, thus the amplitude-modulated signal $V_N$ is generated. Accordingly, in the configuration in FIG. 21, the tactile can be sensed regardless of the position of the tactile presentation knob 3, thus the position of the tactile presentation knob 3 can be optionally set. That is to say, when the conductive elastic part 6 is divided as illustrated in FIG. 22 described hereinafter, for example, a width 6b of the conductive elastic part 6 is preferably larger than the pitch $P_E$ of the tactile electrode 102 so that the tactile presentation knob 3 is easily located to extend over the first electrode 102a and the second electrode 102b. When the conductive elastic part 6 is not divided into some pieces, an outer diameter 6a of the conductive elastic part 6 is preferably larger than the pitch $P_E$ of the tactile electrode 102.

<Structure of Tactile Presentation Knob>

Figure 23:
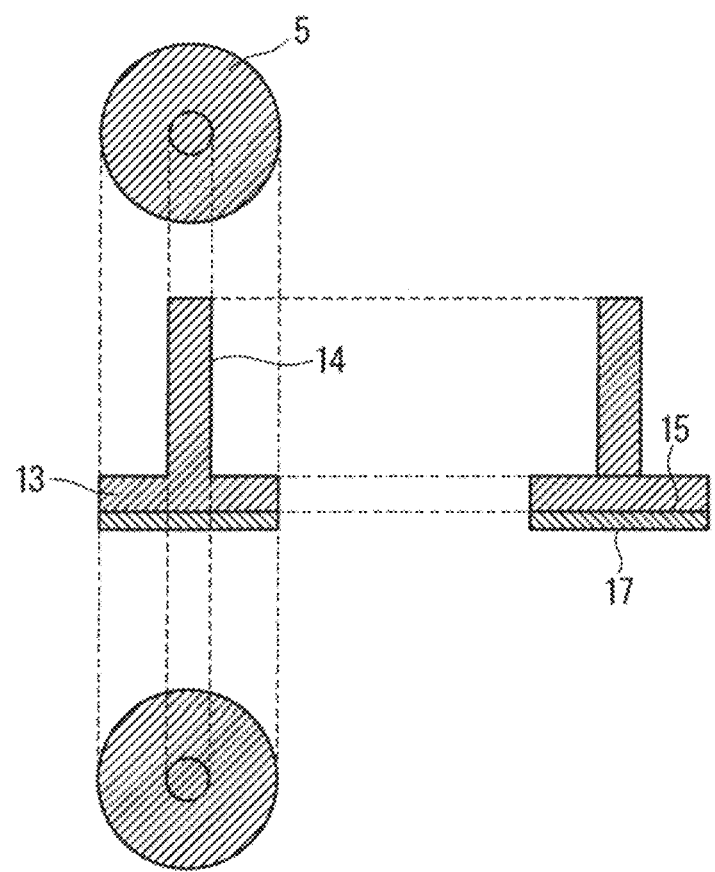
FIG. 23 A schematic view illustrating a configuration of a fixing part in a case where a position where the tactile presentation knob according to the embodiment 1 is fixed at one position.
Figure 24:
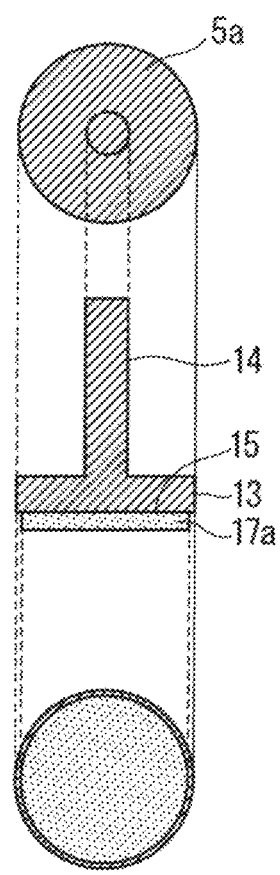
FIG. 24 A schematic view illustrating a configuration of a rotation axis structure in a case where the position where the tactile presentation knob according to the embodiment 1 is disposed is moved.

FIG. 22 is a schematic view illustrating a structure of a rotation part 4 of the tactile presentation knob 3. FIG. 23 is a schematic diagram of a fixing part 5 at a time of locating and rotating the rotation part 4 on the contact surface of the tactile presentation panel 100 in a case where a position where the tactile presentation knob 3 is located is fixed to one position. FIG. 24 is a schematic diagram of a rotation axis part 5a suppressing a horizontal movement of the rotation part 4 of the tactile presentation knob 3 at a time of locating and rotating the rotation part 4 on the contact surface of the tactile presentation panel 100. Both the rotation part 4 and the fixing part 5 (rotation axis part are made of metal such as aluminum, SUS, and copper and resin such as polyvinyl chloride, polystyrene, ABS resin, AS resin, acrylic resin, polyethylene, polypropylene, polyvinyl alcohol, polyvinylidene chloride, polyethylene terephthalate, polycarbonate, modified polyphenylene ether, polyamide, polybutylene telephthalate, polyacetal, ultra-high molecular weight polyethylene, polyarylate, polysulfone, polyethersulfone, polyamideimide, polyetherimide, thermoplastic polyimide, polyphenylene sulfide, liquid crystalline polymer, polyetheretherketone, and fluororesin. An operational feeling and the tactile are changed depending on a weight of the tactile presentation knob 3, thus the material is selected in accordance with a favor of the user, a usage environment of the tactile presentation knob 3, and a purpose of usage, for example. A rotation part side surface 10 needs to be electrically connected to the conductive elastic part 6 and an indicator 2 (refer to FIG. 31), thus a surface part 10s and a boundary part conductive part 16s of the rotation part side surface 10 having contact with the indicator 2 are made of metal or a conductive resin material (preferably having resistance of $10^3 \Omega$ or less). Resistance values of the surface part 10s and the boundary part conductive part 16s are preferably set to a value so that a capacitance C formed between the tactile electrode 102 and the conductive elastic part 6 becomes largest in an RC circuit formed between wiring resistance of the tactile electrode 102, resistance of the conductive elastic part 6, and the dielectric layer 106.

The tactile presentation knob 3 has the same cylindrical shape as a shape of an axis part 14 and a shape of a hole part of a fixing part 9, and the axis part 14 of the fixing part 5 (rotation axis part 5a) is inserted into the fixing hole 9 of the rotation part to be integrated with each other. A gap between the axis part 14 and the fixing hole 9 is preferably as small as possible within a range that the rotation part 4 is smoothly rotated. When the gap between the axis part 14 and the fixing hole 9 is small, a wobble of the rotation axis is small at a time of rotating the tactile presentation knob 3, thus suppressed is supply, to the indicator 2, of tactile such as swing and oscillation of the rotation part 4 caused by the wobble of the rotation axis, which is different from tactile which is originally to be given to the tactile presentation knob 3, thus the tactile given to the user is more clarified. A convex-concave portion is preferably reduced as much as possible in a surface of the axis part 14 and an inner surface part of the fixing hole 9 to smoothly rotate the rotation part 4, and a surface roughness thereof is preferably equal to or smaller than Ra 0.5 μm. An inner diameter tolerance of the fixing hole 9 is preferably 0 to +0.5 mm, and an outer diameter tolerance of the axis part 14 is preferably −0.0005 mm.

The fixing part 5 (rotation axis part 5a) is a part serving as a rotation axis (central axis) at the time of rotating the rotation part 4, and has a role of keeping the operational surface of the tactile presentation panel 100 perpendicular to the rotation axis of the rotation part 4. Thus, a center of the axis part 14 of the fixing part 5 (rotation axis part 5a) is perpendicular to a bottom surface part 15 and an adhesion part 17 (axial structure holding part 17a), a bottom part of the adhesion part 17 (axial structure holding part 17a) is flat, and the contact surface of the conductive elastic part 6 having contact with the tactile presentation panel 100 and the adhesion part 17 (axial structure holding part 17a) are located on the same plane. FIG. 23 illustrates a case where a diameter of the adhesion part 17 is the same as that of a fixing table 13, however, the diameter of the axial structure holding part 17a may be different from that of the fixing table 13 as illustrated in FIG. 24. The fixing part 5 is provided, thus the rotation axis at the time of operating the tactile presentation knob 3 is stabilized, and more clear tactual sense can be generated.

The surface part 10s and the boundary part conductive part 16s of the rotation part 4 with which the indicator 2 has contact at the timing of rotating the rotation part 4 are made up of a conductive material, and are also electrically connected to the conductive elastic part 6 and a position detection part 7. Detected is presence or absence of contact of the user with the surface of the rotation part 4, and suppressed is charge stored in the conductive elastic part 6. The surface part 10s and the boundary part conductive part 16s are made up of a material similar to that of the conductive elastic part 6. Particularly, metal having low resistance is preferable, and it is also applicable that after the rotation part 4 is formed by resin, for example, the rotation part is coated with metallic plating to form the surface part 10s and the boundary part conductive part 16s. Details are described hereinafter.

The conductive elastic part 6 is a conductor forming the electrostatic capacitance with the tactile electrode 102. The conductive elastic part 6 is divided into two or more pieces, and prevents reduction in the tactile strength. Details of this effect are described hereinafter. The conductive elastic part 6 has elasticity, thus has an effect of suppressing reduction in the tactile strength due to reduction in adhesiveness. When the adhesiveness between the conductive elastic part 6 and the surface of the tactile presentation panel is reduced due to reduction of flatness and unevenness caused by processing accuracy of the rotation part 4 and the fixing part 5 (rotation axis part 5a) and assembly accuracy of the tactile presentation screen 150 and minute unevenness of the surface of the tactile presentation panel 100, the tactile electrode 102 and the conductive elastic part 6 form the electrostatic capacitance via not only the dielectric layer but also the air having a small dielectric constant. Accordingly, the electrostatic capacitance formed between the tactile electrode 102 and the conductive elastic part 6 is reduced, and causes reduction in the tactile strength. The conductive elastic part 6 has elasticity, thus the gap between the dielectric layer and the conductive elastic part 6 caused by the convex-concave portion is filled, and reduction in the tactile strength due to reduction in adhesiveness can be prevented.

Applicable to a material used for the conductive elastic part 6 and the position detection part 7 is thermoset elastomer such as natural rubber (NR), isoprene rubber (IR), styrene butadiene rubber (SBR), chloroprene rubber (CR), acrylonitrile rubber (NBR), hydrogenated nitrile rubber (HNBR), butyl rubber (IIR), ethylene propylene rubber (EPDM), chlorosulfonated polyethylene rubber (CSM), silicone rubber (VMQ), fluoro rubber (FKM), fluorosilicone rubber (FVMQ), acrylic rubber (ACM), or urethane rubber (U). An elastic resin material called a conductive rubber, which is based on thermoplastic elastomers such as polyurethane (TPU), polystyrene (TPS), olefin/alkene (TPO), polyvinyl chloride (TPVC), polyester (TPEE), and polyamide (TPAE) mixed with a conductive substance such as conductive carbon black or a metal powder, can be used. Carbon nanotube (CNT) can also be used.

It is sufficient that volume specific resistance is equal to or smaller than $10^6$ Ωcm, and the lower the volume specific resistance, charge is more hardly stored in the conductive elastic part 6. Details of storage of the charge in the conductive elastic part 6 are described hereinafter. Since the conductive elastic part 6 forms the electrostatic capacitance with the tactile electrode 102, thus pressure resistance characteristics are preferably as high as possible by reason that a lifetime and reliability of the conductive elastic part 6 are improved. The position detection part 7 forms the electrostatic capacitance with the detection electrode 203 of the touch screen 250, and is used for detecting the position and a rotation amount of the tactile presentation knob 3.

Applicable as a material forming the position detection part 7 is a conductive material which can form the electrostatic capacitance with the detection electrode 203, has elasticity similar to the conductive elastic part 6, and applies the same material as the conductive elastic part 6 as a base material. A material having large adhesiveness with the tactile presentation panel 100 hardly has a difference between a design value and an actual an electrostatic capacitance value, and a stable position detection accuracy is obtained.

Also in a case where the same material as that in the material of the conductive elastic part 6 described above is used as the base material of the position detection part 7, when a quantity of carbon black or metal powder providing conductivity is small, a resistance value is increased, and the electrostatic capacitance formed between the tactile electrode 102 and the conductive elastic part 6 is reduced. In contrast, when a quantity of carbon black or metal powder providing conductivity is large, a resistance value is decreased, and the electrostatic capacitance formed between the tactile electrode 102 and the conductive elastic part 6 can be increased.

The conductive elastic part 6 and the position detection part 7 have the same thickness, thus when they are firmly attached to the surface of the tactile presentation panel 100 without a gap, high tactile strength and high-accuracy position detection are achieved. Flatness (a difference between a maximum value and a minimum value of a measurement value obtained by measuring a distance from a certain reference surface) of the conductive elastic part 6, the position detection part 7, and the tactile presentation panel 100 is preferably equal to or smaller than 0.5 mm. A diameter of a contact area of a finger of a person having contact with the touch surface when operating the touch panel is considered approximately 3 mm in children and approximately 7 to 10 mm in maximum in adult, thus the area of the position detection part 7 may be considered 7 mm 2 to 400 mm$^2$.

<Detection of Knob Position and Rotation Amount>

Figure 25:
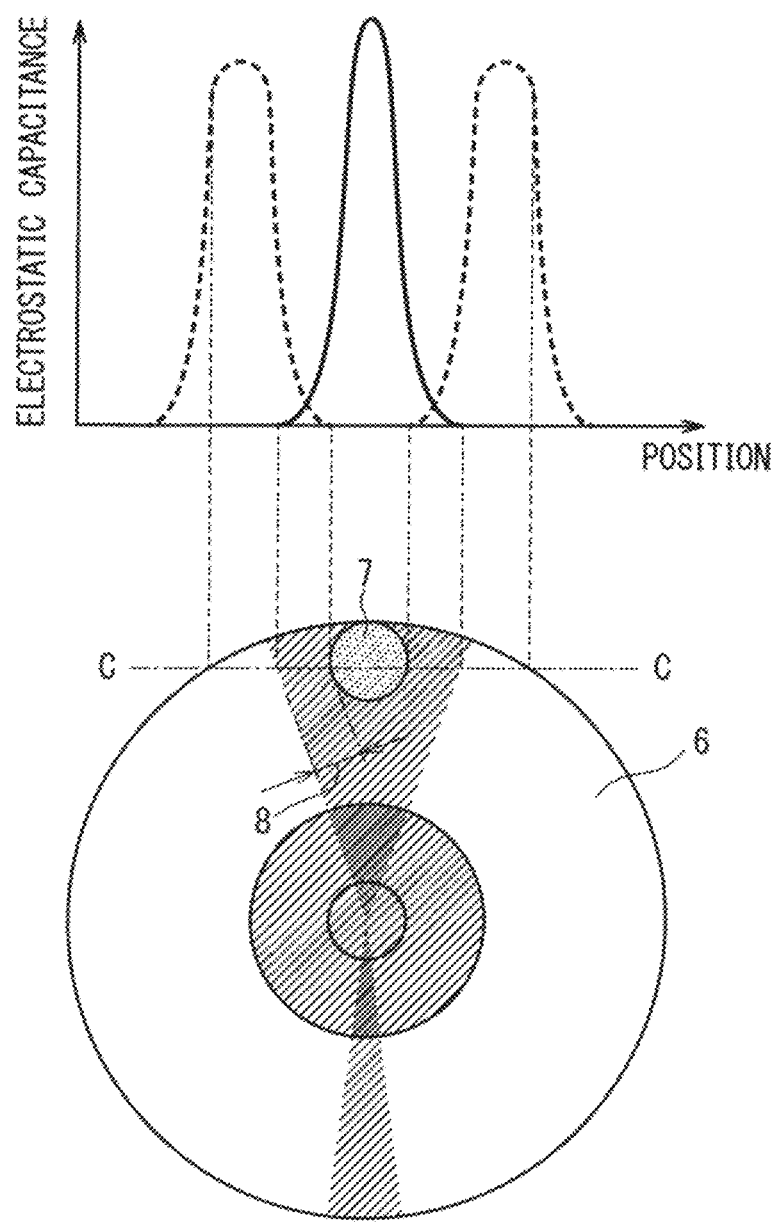
FIG. 25 A schematic view for explaining a capacitance profile in a line C-C when the touch screen according to the embodiment 1 detects the position of the tactile presentation knob.

FIG. 25 is a schematic view explaining a capacitance profile of a line C-C when the touch panel 200 detects the position of the tactile presentation knob 3. Occurrence of tactile on the tactile presentation knob 3 and detection of the position of the tactile presentation knob 3 are performed in temporal decomposition. In a period during which the signal voltage is applied to the tactile electrode 102, the detection electrode 203 and the excitation electrode 202 is 0V or forms the electrostatic capacitance with the tactile electrode 102, and applies optional voltage so as not to cause reduction in voltage on the tactile electrode 102. When the detection electrode 203 detects the position, the tactile electrode 102 enters a floating state, and the conductive elastic part 6 and the detection electrode 203 form the electrostatic capacitance via the tactile electrode 102, thus an amount of change of the electrostatic capacitance of the excitation electrode 202 and the detection electrode 203 is detected to detect the position of the tactile presentation knob 3.

The detection electrode 203 forms the electrostatic capacitance with both the position detection part 7 and the conductive elastic part 6 to detect the electrostatic capacitance. At that time, the gap 8 is located, thus an electrostatic capacitance profile with the position detection part 7 and an electrostatic capacitance profile with the conductive elastic part 6 have a peak in a different position, each position is separately detected.

The rotation amount of the tactile presentation knob 3 is calculated as a movement in a rotation direction from a movement amount of the position detection part 7 from an initial position when one position detection part 7 is located. The number of position detection parts 7 is necessarily one. When the plurality of position detection parts 7 are located as illustrated in FIG. 26, a rotation angle θ can be calculated from a directional vector P1-P2 between the position detection parts 7 in the initial position (P1, P2) and a directional vector P1'-P2' in a position after movement (P1', P2').

Figure 26:
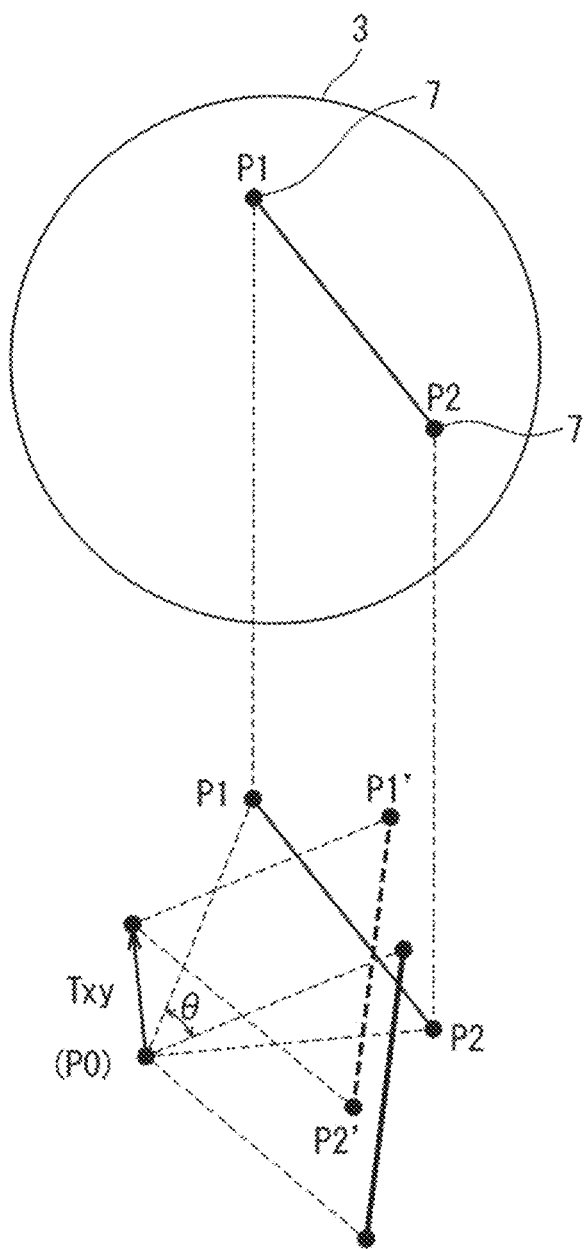
FIG. 26 A diagram explaining a calculation of a rotation amount in a case where the plurality of position detection parts according to the embodiment 1 are provided.

In FIG. 26, when a rotation center is P0, a parallel movement amount is Txy, a coordinate conversion matrix of the rotation angle θ is R, and a unit matrix is I, P1'-P2' is expressed by Expression (4) from the following Expressions (2) and (3).

$$P1'=R \cdot P1-(R-I) \cdot P0+Txy \qquad (2)$$

$$P2'=R \cdot P2-(R-I) \cdot P0+Txy \qquad (3)$$

$$P1'-P2'=R \cdot (P1-P2) \qquad (4)$$

When the coordinate conversion matrix R is equal to the unit matrix I (R=I), the parallel movement operation is performed, and Txy is expressed by the following Expression (5).

$$Txy=P1'-P1 \qquad (5)$$

When an operation range of the tactile presentation knob 3 is set to be larger than 360 degrees, a rotation angle from the initial position of the tactile presentation knob 3 can be calculated by referring to an immediately preceding rotation angle and rotation angle change direction of the position detection part 7 and performing addition and subtraction correction of 360 degrees×n (n is an integral number). As the number of pairs of the position detection parts 7 used for calculation is increased, the measurement accuracy of the rotation angle is improved, however, the area of the conductive elastic part 6 is reduced, thus the number of the position detection parts 7 is determined by tactile strength and the measurement accuracy of the rotation angle. An indication position line 11 (refer to FIG. 22) indicating a position indicated by the tactile presentation knob 3 may be provided on the rotation part 4 to visually show a knob position. When the indication position line 11 is disposed, the position detection part 7 is disposed immediately below the indication position line 11, thus the position of the tactile presentation knob 3 can be calculated as a movement amount from a position (origin point) to be located as an initial state of the indication position line 11, and calculation processing is simplified.

<Inter-Electrode Distance>

Figure 27:
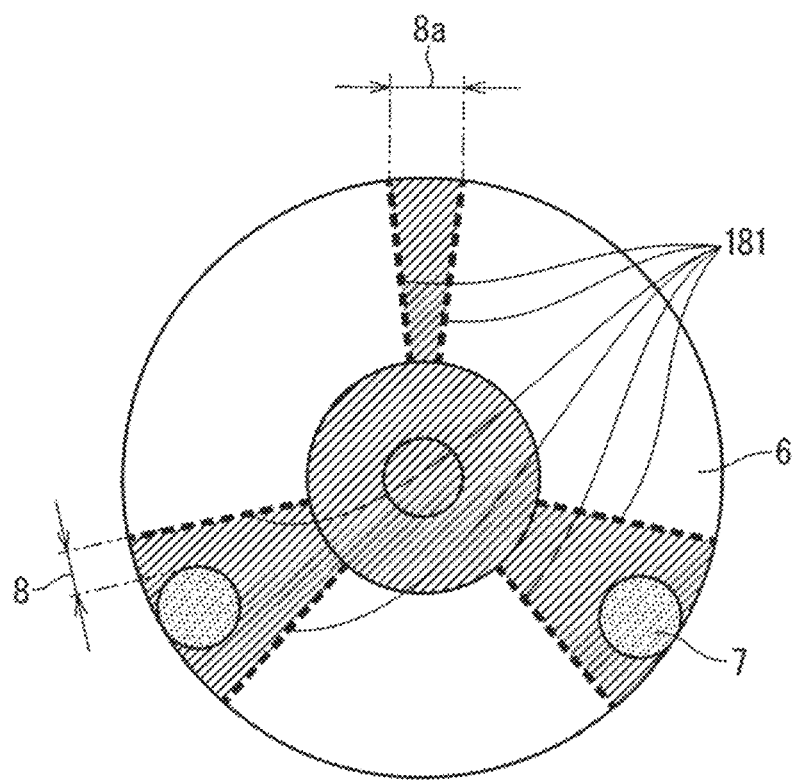
FIG. 27 A schematic view illustrating a position of an edge portion of a conductive elastic part according to an embodiment 1.

FIG. 27 illustrates an example of a position relationship between the conductive elastic part 6 and the position detection part 7 in the tactile presentation knob 3. A distance from the conductive elastic part 6 to the position detection part 7 in a case where the position detection part 7 is disposed between the conductive elastic parts 6 adjacent to each other is indicated as a gap 8, and a distance between the conductive elastic parts 6 in a case where the position detection part 7 is not disposed between the conductive elastic parts 6 adjacent to each other is indicated as a gap 8a. In a case where the surface of the tactile presentation panel 100 includes the convex-concave portion caused by the thickness of the electrode, when the conductive elastic part 6 is slid while having contact with the tactile electrode 102 via the dielectric layer 106, the tactile presentation knob 3 is vibrated by the convex-concave portion of the surface thereof. This vibration is sensed by the indicator 2 regardless of the voltage signal applied to the tactile electrode 102. As a result, the indicator 2 may hardly sense the tactile obtained by the voltage signal. In other words, the tactile strength may be reduced.

Even when the surface of the tactile presentation panel 100 includes the convex-concave portion, it depends on an interval between the electrodes of the tactile electrode 102 whether the indicator 2 easily senses the convex-concave portion as described above. As the larger convex-concave portion is accepted, there is decreasing necessity to increase the thickness of the dielectric layer 106 for reducing the convex-concave portion. That is to say, reduction in the thickness of the dielectric layer 106 is allowed. Accordingly, the capacitance formed between the conductive elastic part 6 and the tactile electrode 102 can be increased. Thus, larger tactile can be generated. When the inter-electrode distance of the tactile electrode 102 is larger than the gap 8 between the conductive elastic part 6 and the position detection part 7, an edge portion 181 of the conductive elastic part 6 (refer to FIG. 27) is caught on the convex-concave portion of the surface of the tactile electrode 102 caused by the inter-electrode distance, and unintended tactile occurs in the tactile presentation knob 3, thus it is desirable that the inter-electrode distance of the tactile electrode 102 is smaller than the gap 8. The tactile electrode 102 with the small inter-electrode distance is desirable by reason that an occupied area of the tactile electrode 102 is increased, the electrostatic capacitance formed with the conductive elastic part 6 is increased, and the obtained tactile strength is also increased.

<Detailed Configuration of Tactile Presentation Touch Panel>

Figure 28:
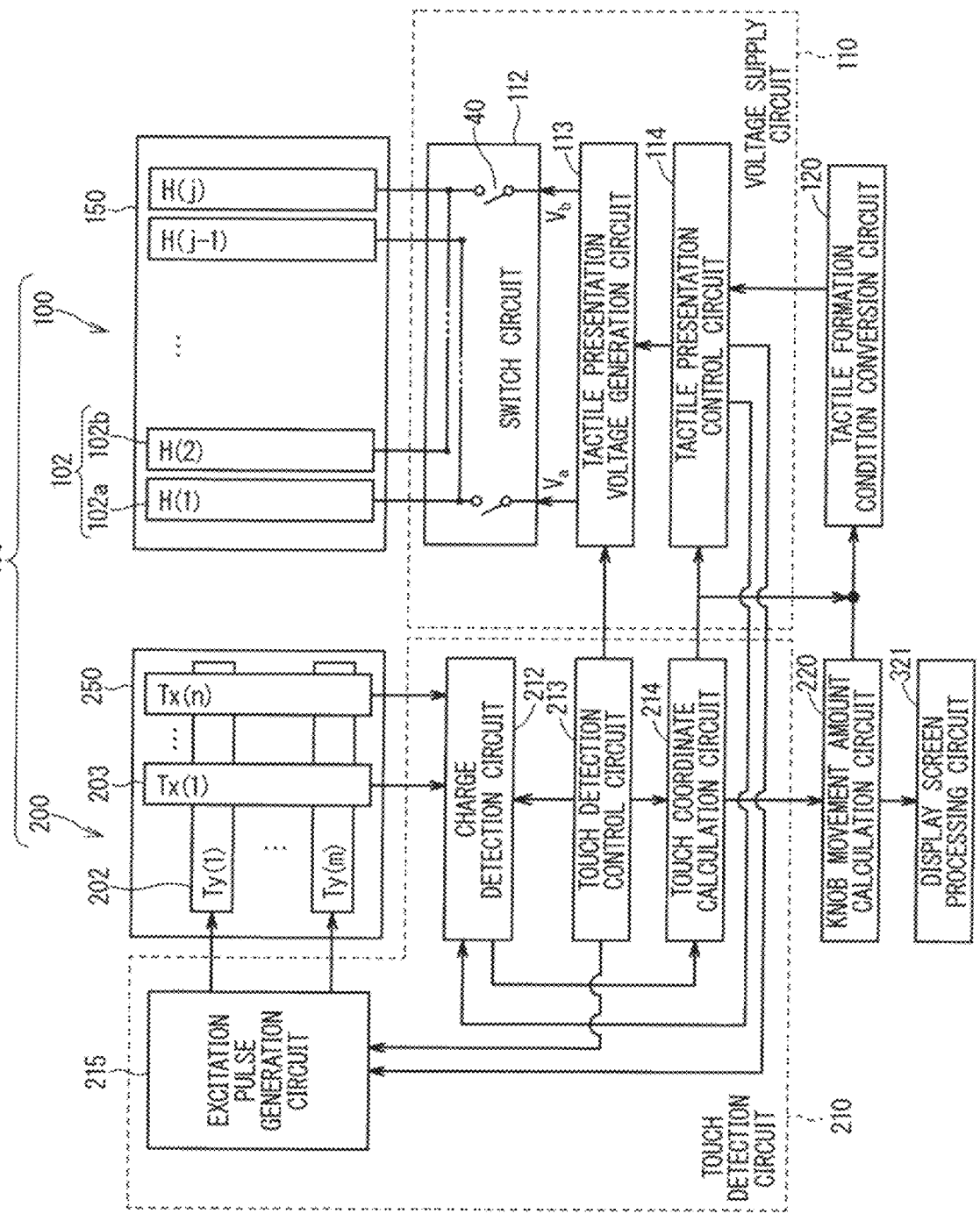
FIG. 28 A block diagram schematically illustrating a configuration of a tactile presentation touch panel in FIG. 1.

FIG. 28 is a block diagram schematically illustrating a configuration of the tactile presentation touch panel 400. Herein, excitation electrodes Ty(1) to Ty(m) are provided as the plurality of excitation electrodes 202, detection electrodes Tx(1) to Tx(n) are provided as the plurality of detection electrodes 203, and tactile electrodes H(1) to H(j) are provided as the plurality of tactile electrodes 102. The tactile electrodes H(1) to H(n) are arranged in an order of the numbers in the parentheses. The odd-numbered tactile electrode 102 corresponds to the first electrode 102a, and the even-numbered tactile electrode 102 corresponds to the second electrode 102b. In order to simplify the description, one row direction wiring layer 206 (refer to FIG. 8 or FIG. 10) is made up of one excitation electrode 202, and one column direction wiring layer 207 (refer to FIG. 8 or FIG. 10) is made up of one detection electrode 203.

As described above, the tactile presentation touch panel 400 includes the touch panel 200 and the tactile presentation panel 100. The touch panel 200 includes the touch screen 250 and the touch detection circuit 210. The tactile presentation panel 100 includes the tactile presentation screen 150 and the voltage supply circuit 110.

The touch detection circuit 210 includes an excitation pulse generation circuit 215, a charge detection circuit 212, a touch coordinate calculation circuit 214, and a touch detection control circuit 213. The touch detection control circuit 213 controls operations of the excitation pulse generation circuit 215, the charge detection circuit 212, and the touch coordinate calculation circuit 214. The excitation pulse generation circuit 215 sequentially applies an excitation pulse signal to the excitation electrodes Ty(1) to Ty(m). The charge detection circuit 212 measures a signal obtained from each of the detection electrodes Tx(1) to Tx(n). Accordingly, the charge detection circuit 212 detects a charge amount of each of the detection electrodes Tx(1) to Tx(n). Information of a charge detection result expresses a value corresponding to mutual capacitance of the excitation electrode Ty(k) at a time of giving the excitation pulse signal to the excitation electrode Ty(k) and each of the detection electrodes Tx(1) to Tx(n), wherein k is an integral number equal to or larger than 1 and equal to or smaller than m. The charge detection circuit 212 can recognize, by the control signal from the touch detection control circuit 213, which of the excitation electrodes Ty(1) to Ty(m) the excitation pulse signal is applied to. The touch coordinate calculation circuit 214 obtains data of the coordinate touched by the indicator 2 (referred to as "touch coordinate data" hereinafter) based on the charge detection result described above.

The touch coordinate data is outputted to a knob movement amount calculation circuit 220, and is also outputted to a tactile formation condition conversion circuit 120 and a tactile presentation control circuit 114 (tactile presentation circuit) as touch operation information. A knob movement amount calculation circuit 220 outputs information of a rotation angle, a rotation speed, and a horizontal movement distance as the movement amount of the knob to the tactile formation condition conversion circuit 120 (tactile strength calculation circuit) and a display screen processing circuit 321. The tactile formation condition conversion circuit 120 outputs an electrical signal condition achieving tactile strength (operational feeling strength) calculated based on the inputted information to the tactile presentation control circuit 114.

The voltage supply circuit 110 includes a switch circuit 112, the tactile presentation voltage generation circuit 113, and the tactile presentation control circuit 114. The tactile presentation voltage generation circuit 113 applies the voltage signal $V_a$ to the first electrode 102a, and applies the voltage signal $V_b$ to the second electrode 102b in the tactile electrodes H(1) to H(j) via the switch circuit 112. In other words, the voltage signal $V_a$ and the voltage signal $V_b$ are alternately applied to the tactile electrodes H(1) to H(j) arranged in one direction (lateral direction in FIG. 28). The switch circuit 112 enters an ON state or an OFF state based on a command from the tactile presentation voltage generation circuit 113. The switch circuit 112 connects the tactile electrode 102 to the tactile presentation voltage generation circuit 113 in the ON state, and makes the tactile electrode 102 be in a floating state in the OFF state. In the present embodiment 1, the switch circuit 112 includes two switches 40, and one of the two switches 40 performs switching of an electrical path to all the first electrodes 102a and the other one thereof performs switching of an electrical path to all the second electrodes 102b. These two switches 40 may be controlled in conjunction with each other. The switch 40 corresponds to a switching part.

The tactile presentation control circuit 114 refers to the information of the tactile strength calculated by the tactile formation condition conversion circuit 120. The tactile presentation control circuit 114 can control the operation of the tactile presentation voltage generation circuit 113 based on this information. That is to say, the touch detection circuit 210 also functions as the contact detection part detecting the user having contact with the tactile presentation knob 3.

<Operation of Tactile Presentation Touch Panel>

Figure 29:
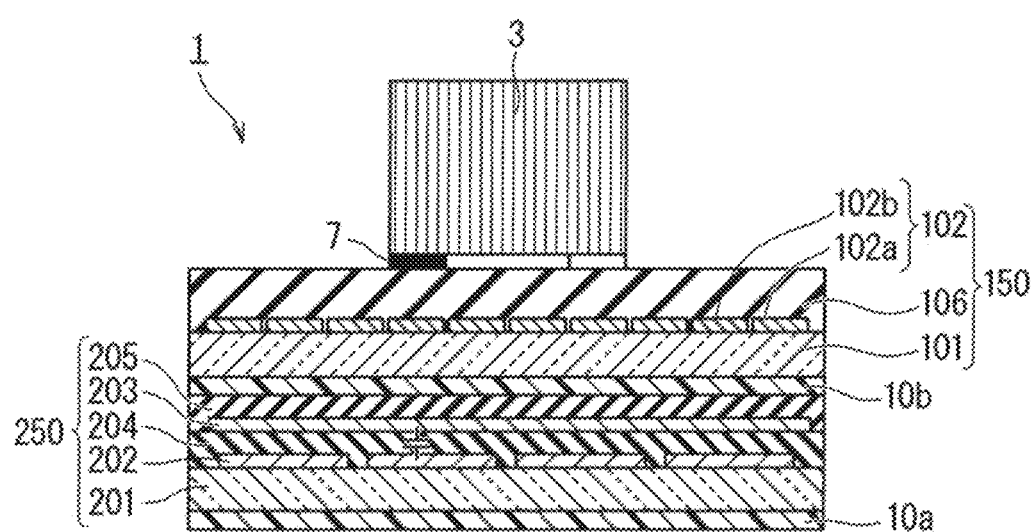
FIG. 29 A schematic view for explaining electrostatic capacitance formed in the tactile presentation touch panel when the indicator does not have contact with the tactile presentation knob in the tactile presentation touch panel in FIG. 1.
Figure 30:
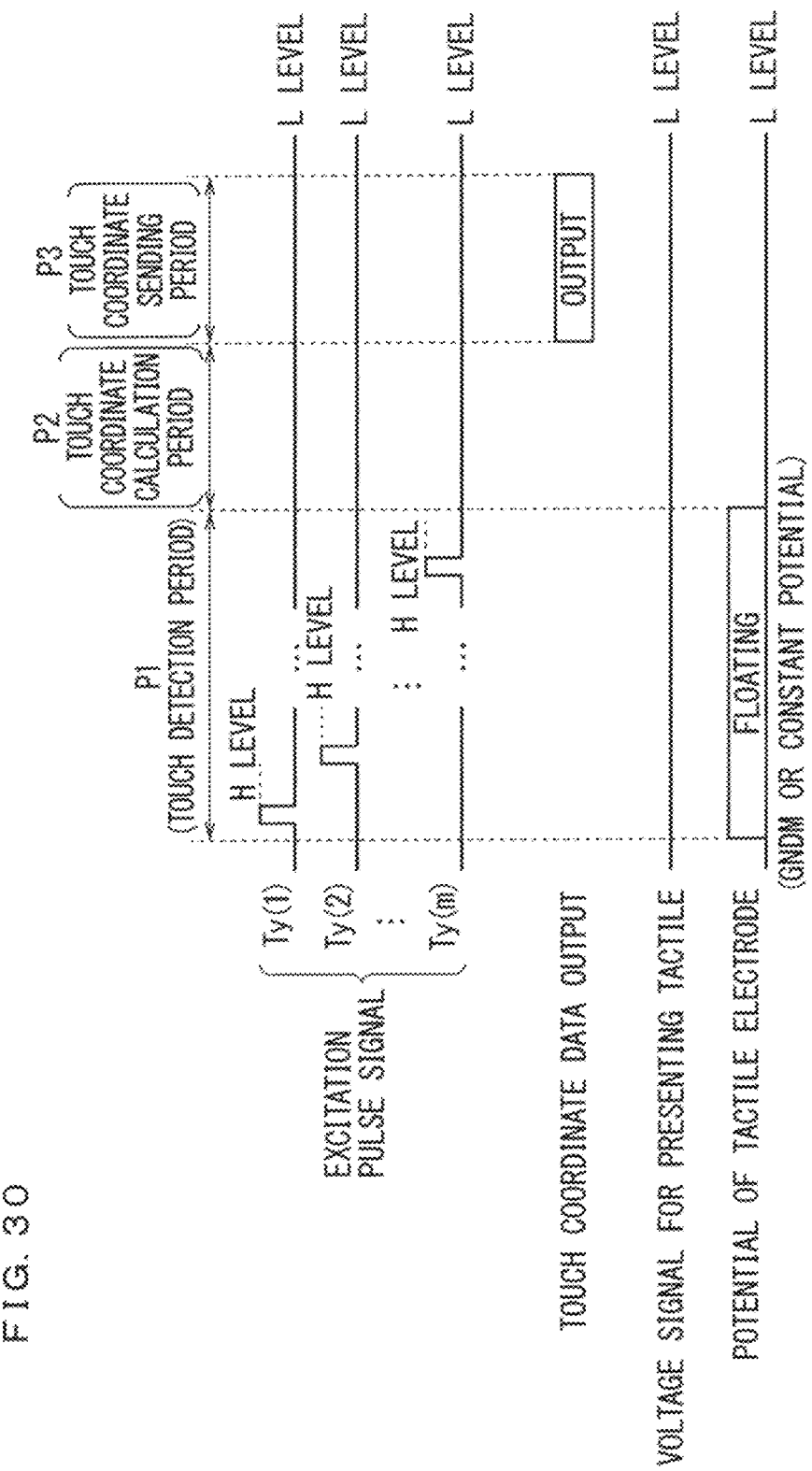
FIG. 30 A timing chart schematically showing an operation timing of the tactile presentation touch panel in FIG. 1 at which the indicator does not have contact with the tactile presentation knob.

FIG. 29 is a schematic view illustrating an image of the electrostatic capacitance of the excitation electrode 202 and the detection electrode 203 when the indicator 2 does not have contact with the tactile presentation knob 3. FIG. 30 is a timing chart schematically illustrating an operation timing of the tactile presentation touch panel 400 (refer to FIG. 28) at which the indicator 2 does not have contact with the tactile presentation knob 3.

When the indicator 2 is not in contact with the tactile presentation knob 3, both the conductive elastic part 6 and the tactile electrode 102 are in the floating state, and have the same potential as the detection electrode 203, and the charge detection circuit 212 detects a charge amount of mainly the electrostatic capacitance of the detection electrode 203 and the excitation electrode 202. The touch detection control circuit 213 also outputs the control signal described above to the tactile presentation voltage generation circuit 113.

The tactile presentation voltage generation circuit 113 can recognize a touch detection period P1 based on this control signal. The tactile presentation voltage generation circuit 113 blocks the switch 40 of the switch circuit 112 in the touch detection period P1. Accordingly, electrical connection between the tactile presentation voltage generation circuit 113 and all the tactile electrodes 102 is blocked. As a result, the potential of all the tactile electrodes 102 enters the floating state.

When the inter-electrode distance of the tactile electrode 102 is large and the detection electrode 203 and the position detection part 7 of the tactile presentation knob 3 form the electrostatic capacitance via the gap between the electrodes of the tactile electrode 102, the tactile electrode 102 needs not be in the floating state, but may be fixed to a detection GND or an optional fixing potential. Selected as the potential of the tactile electrode 102 is the potential in which the charge amount of mainly the electrostatic capacitance of the detection electrode 203 and the excitation electrode 202 is detected most easily.

Next, in a touch cooperate calculation period P2, the touch coordinate calculation circuit 214 determines whether there is a touch by the indicator 2 based on a charge detection result of a mutual capacitance inputted from the charge detection circuit 212 and held to correspond to each of the excitation electrodes Ty(1) to Ty(m), in other words, a charge detection result of the capacitance of all intersection parts formed by the excitation electrodes Ty(1) to Ty(m) and the detection electrodes Tx(1) to Tx(n). As a result of reduction in electrical field coupling between the excitation electrode 202 and the detection electrode 203 by proximity or contact of the indicator 2 such as a finger, the charge which is electrically charged in the mutual capacitance is reduced. The touch coordinate calculation circuit 214 can determine presence or absence of a touch based on a degree of this reduction. When the touch coordinate calculation circuit 214 determines that there is a touch, the touch coordinate calculation circuit 214 starts calculation of the touch coordinate data based on the charge detection result described above. Specifically, the touch coordinate calculation circuit 214 performs arithmetic processing such as a gravity center calculation, for example, on a detection result of an intersection part where a degree of reduction of charge which is electrically charged is largest and a surrounding intersection part, thereby being able to calculate the touch coordinate data. When the touch coordinate calculation circuit 214 determines that there is not a touch, the touch coordinate calculation circuit 214 does not calculate the touch coordinate data, and the processing returns to the touch detection period P1. In order to achieve such processing, the touch coordinate calculation circuit 214 gives the touch detection control circuit 213 the signal expressing a determination result of presence or absence of contact of the indicator 2 with the surface of the touch panel and presence or absence of contact with the tactile presentation knob 3. When the presence of contact of the indicator 2 with the tactile presentation knob 3 is not determined in the determination result, the operations of P1 to P3 is repeated.

Described herein is operations in a case where the presence of contact of the indicator 2 with the tactile presentation knob 3 is determined in the determination result herein.

Figure 31:
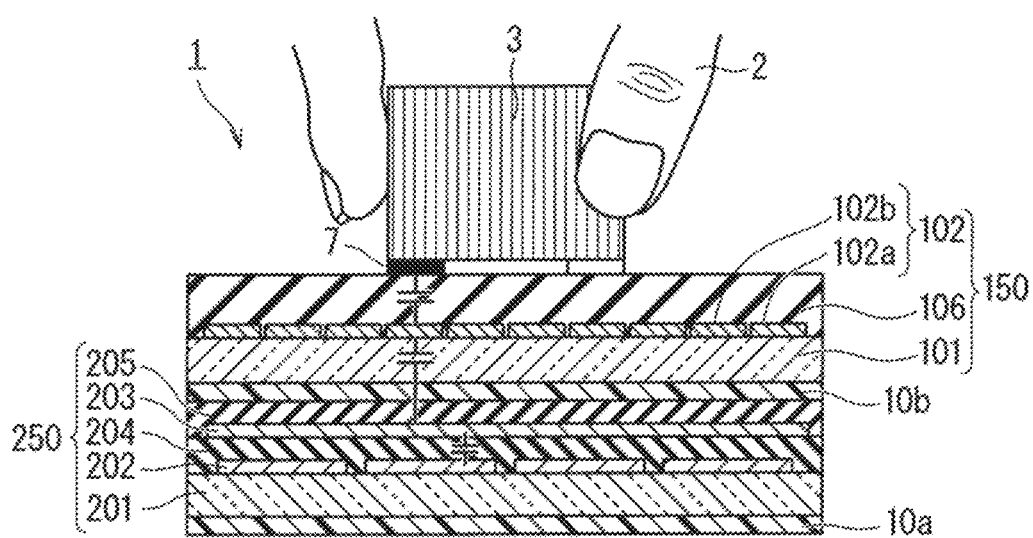
FIG. 31 A schematic view for explaining electrostatic capacitance formed in the tactile presentation touch panel when the indicator has contact with the tactile presentation knob in the tactile presentation touch panel in FIG. 1.
Figure 32:
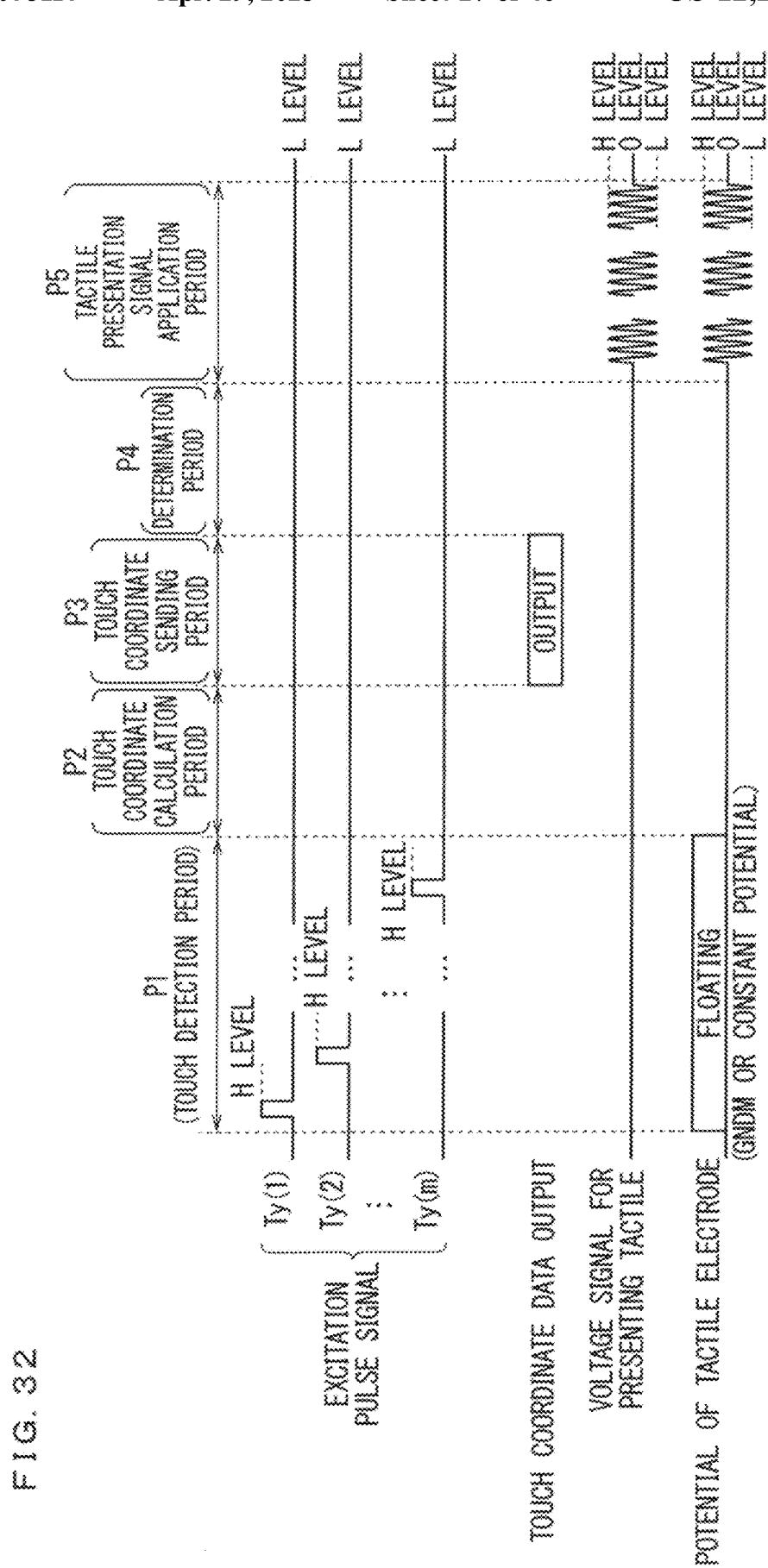
FIG. 32 A timing chart schematically showing an operation timing of the tactile presentation touch panel in FIG. 1 at which the indicator has contact with the tactile presentation knob.

FIG. 31 is a schematic view illustrating an image of the electrostatic capacitance of the excitation electrode 202 and the position detection part 7 when the indicator 2 has contact with the tactile presentation knob 3. FIG. 32 is a timing chart schematically illustrating an operation timing of the tactile presentation touch panel 400 (refer to FIG. 28) at which the indicator 2 has contact with the tactile presentation knob 3.

When the indicator 2 has contact with the tactile presentation knob 3, the conductive elastic part 6 is ground-connected via the tactile presentation knob 3 and the indicator 2, and the detection electrode 203 forms the electrostatic capacitance with the conductive elastic part 6 via the tactile electrode 102, thus the electrostatic capacitance of the detection electrode 203 and the excitation electrode 202 is reduced. As a result, a charge amount detected by the charge detection circuit 212 is reduced, and contact of the indicator 2 with the tactile presentation knob 3 is detected.

In the touch detection period P1, the control signal expressing the first conversion timing is outputted from the touch detection control circuit 213 to the excitation pulse generation circuit 215. Upon receiving this control signal, the excitation pulse generation circuit 215 gives the excitation electrode Ty(1) the excitation pulse signal (electrical charge pulse signal). Accordingly, an inter-electrode capacitance (mutual capacitance) between the excitation electrode Ty(1) and the detection electrodes Tx(1) to Tx(n) each intersecting with the excitation electrode Ty(1) in a plan view is electrically charged. The charge detection circuit 212 detects the charge amount by the electrical charge described above using the detection electrodes Tx(1) to Tx(n). Then, the charge detection circuit 212 performs analog-digital conversion (A/D conversion) on the detection result, and outputs digital information thereby obtained to the touch coordinate calculation circuit 214 as the charge detection result of the mutual capacitance corresponding to the excitation electrode Ty(1). In the similar manner, the control signal expressing second to $m^{th}$ conversion timings is outputted from the touch detection control circuit 213 to the excitation pulse generation circuit 215. The charge detection result of the mutual capacitance corresponding to the excitation electrodes Ty(2) to Ty(m) is outputted to the touch coordinate calculation circuit 214 to correspond to each of the second to $m^{th}$ conversion timings.

The touch detection control circuit 213 also outputs the control signal described above to the tactile presentation voltage generation circuit 113. The tactile presentation voltage generation circuit 113 can recognize the touch detection period P1 based on this control signal. The tactile presentation voltage generation circuit 113 blocks the switch of the switch circuit 112 in the touch detection period P1. Accordingly, electrical connection between the tactile presentation voltage generation circuit 113 and all the tactile electrodes 102 is blocked. As a result, the potential of all the tactile electrodes 102 enters the floating state.

Next, in the touch cooperate calculation period P2, the touch coordinate calculation circuit 214 determines whether there is the touch by the indicator 2 based on the charge detection result of the mutual capacitance inputted from the charge detection circuit 212 and held to correspond to each of the excitation electrodes Ty(1) to Ty(m), in other words, the charge detection result of the capacitance of all the intersection parts formed by the excitation electrodes Ty(1) to Ty(m) and the detection electrodes Tx(1) to Tx(n). As a result of reduction in electrical field coupling between the excitation electrode 202 and the detection electrode 203 by proximity or contact of the indicator 2 such as the finger, the charge which is electrically charged in the mutual capacitance is reduced. The touch coordinate calculation circuit 214 can determine presence or absence of the touch based on the degree of this reduction. When the touch coordinate calculation circuit 214 determines that there is the touch, the touch coordinate calculation circuit 214 starts calculation of the touch coordinate data based on the charge detection result described above. Specifically, the touch coordinate calculation circuit 214 performs arithmetic processing such as the gravity center calculation, for example, on the detection result of the intersection part where the degree of reduction of charge which is electrically charged is largest and the surrounding intersection part, thereby being able to calculate the touch coordinate data. When the touch coordinate calculation circuit 214 determines that there is not the touch, the touch coordinate calculation circuit 214 does not calculate the touch coordinate data, and the processing returns to the touch detection period P1. In order to achieve such processing, the touch coordinate calculation circuit 214 gives the touch detection control circuit 213 the signal expressing the determination result of presence or absence of the touch.

Next, in a touch coordinate sending period P3, the touch coordinate calculation circuit 214 outputs the touch coordinate data to the knob movement amount calculation circuit 220 in accordance with a touch coordinate data sending timing from the touch detection control circuit 213, and also outputs the touch coordinate data to the tactile formation condition conversion circuit 120 and the tactile presentation control circuit 114 as touch operation information.

Next, in a determination period P4, the tactile presentation control circuit 114 determines a position of the tactile presentation knob 3 from the touch coordinate data to determine an area to present tactile.

The tactile presentation control circuit 114 selects a tactile presentation signal waveform (voltage signal waveform) corresponding to the display screen and the coordinate of the tactile presentation knob 3 based on the input from the tactile formation condition conversion circuit 120. This "tactile presentation signal waveform" defines each waveform of the voltage signal $V_a$ and the voltage signal $V_b$. A difference of the waveform between the voltage signal $V_a$ and the voltage signal $V_b$ is typically a difference of a frequency. The tactile presentation signal waveform is set inside or outside the tactile presentation control circuit 114. The number of types of the tactile presentation signal waveform may be one, or two or more types thereof may also be applicable. When there is only one type of the tactile presentation signal waveform, processing of selecting the tactile presentation signal waveform is not necessary. When there are two or more types of the tactile presentation signal waveform, the type of the tactile presentation signal waveform is selected based on the input from the tactile formation condition conversion circuit 120.

Next, in a tactile presentation signal application period P5, the tactile presentation control circuit 114 generates a tactile presentation signal in the tactile presentation signal waveform described above. The switch 40 connected to the tactile electrode 102 in the region where the tactile presentation signal of the switch circuit 112 is inputted is connected to the tactile presentation voltage generation circuit 113, and the switch 40 connected to the tactile electrode 102 in the region where the tactile presentation signal is not inputted is connected to the GND, or does not turn on the switch as it is but makes the tactile electrode 102 be in the floating state. Accordingly, the signal is applied to the tactile electrode 102, thus the tactile is presented. In the example in FIG. 32, an alternating signal with H level (high level) and L level (low level) is applied to the tactile electrode 102. The tactile electrode 102 is charged at high voltage of positive electrode, that is typically plus several tens of volts in a period of H level, is discharged in a period of 0 level, and is charged at high voltage of negative electrode, that is typically minus several tens of volts in a period of L level. A generation cycle and a generation period of the pulse signal can be appropriately set based on the input from the tactile formation condition conversion circuit 120.

After the tactile presentation signal application period P5 described above, the processing returns to the touch detection period P1. The operation described above is thereby repeated. Accordingly, the tactile presentation touch panel 400 can detect the position of the tactile presentation knob 3 and present the tactile in accordance with the position of the tactile presentation knob 3 and display screen.

Figure 33:
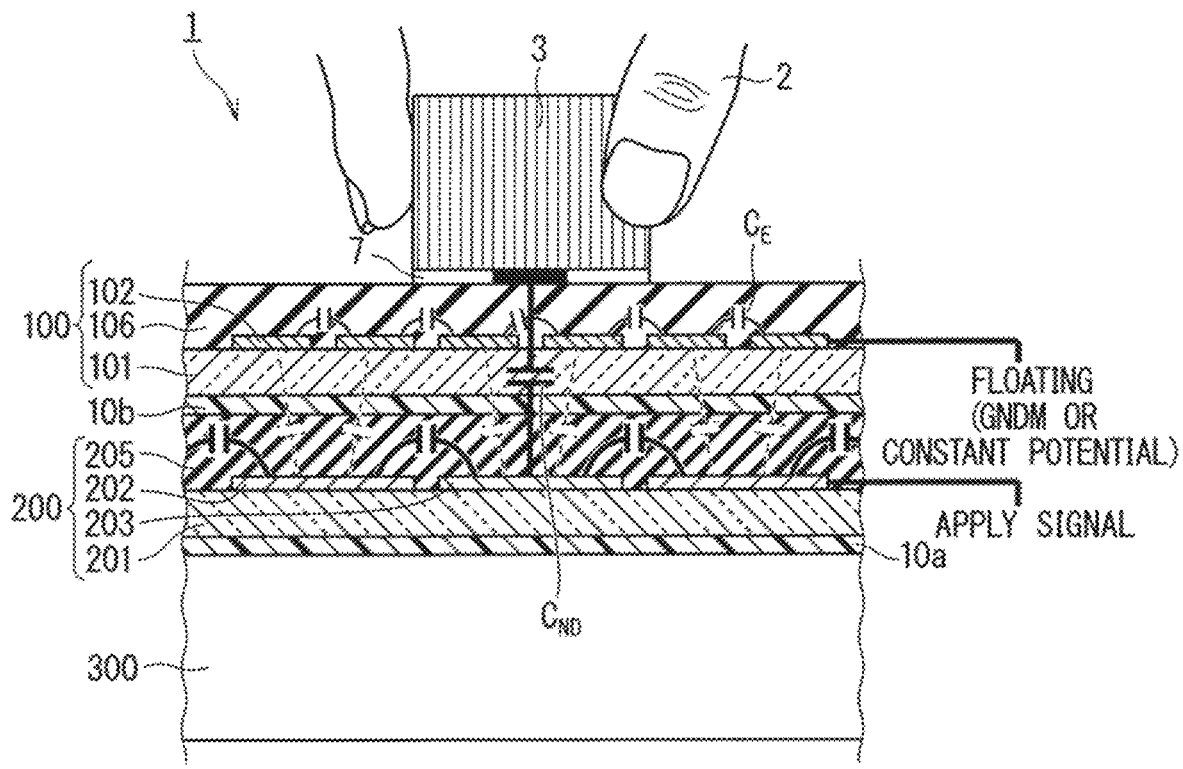
FIG. 33 A schematic view for explaining electrostatic capacitance formed in the tactile presentation touch panel when the tactile presentation touch panel in FIG. 1 detects a touch position.

FIG. 33 is a schematic view illustrating the formation of the electrostatic capacitance in the tactile presentation touch panel 400 in the touch detection period P1 (refer to FIG. 32). In the touch detection period P1, the electrostatic capacitance $C_{ND}$ is formed between the indicator 2 and the detection electrode 203. In this period, the potential of all the tactile electrodes 102 enters the floating state. Accordingly, it is prevented that the tactile electrode 102 functions as a shield. Thus, sensitivity of the touch detection can be increased.

Figure 34:
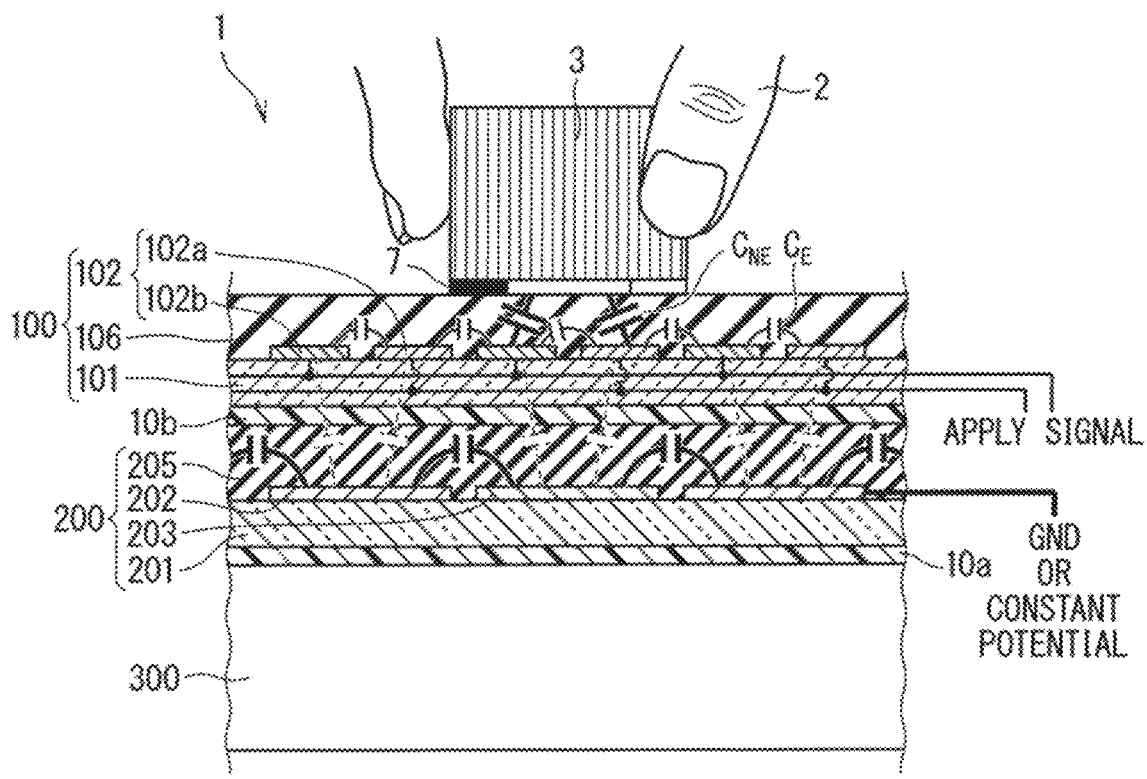
FIG. 34 A schematic view for explaining electrostatic capacitance formed in the tactile presentation touch panel when the tactile presentation touch panel in FIG. 1 generates tactile.

FIG. 34 is a schematic view illustrating the formation of the electrostatic capacitance in the tactile presentation touch display 1 in the tactile presentation signal application period P5 (refer to FIG. 32). In the tactile presentation signal application period P5, the potential of the excitation electrode 202 and the detection electrode 203 of the touch panel 200 may be in the floating state. Accordingly, influence of the capacitance formed by the excitation electrode 202 and the detection electrode 203 on the electrostatic capacitance $C_{NE}$ can be suppressed. Alternatively, it is also applicable that the potential of the excitation electrode 202 and the detection electrode 203 of the touch panel 200 is substantially constant potential, and the excitation electrode 202 and the detection electrode 203 are connected to ground potential at low impedance, for example. Accordingly, the excitation electrode 202 and the detection electrode 203 can function as a shield between the tactile electrode 102 and the display panel 300. Thus, suppressed is occurrence of noise in the display panel 300 caused by the high voltage signal applied to the tactile electrode 102. Thus, display defect caused by the noise can be prevented. In contrast, suppressed is occurrence of noise in the tactile electrode 102 caused by the display panel 300. When the tactile presentation signal is applied to the tactile electrode 102, the conductive elastic part 6 forms the electrostatic capacitance with the tactile electrode 102. Charge having potential opposite to voltage of the tactile electrode 102 is stored in the surface of the conductive elastic part 6 having contact with the dielectric layer 106, and electrostatic force occurs between the conductive elastic part 6 and the dielectric layer 106. As a result, the friction force between the conductive elastic part 6 and the dielectric layer 106 is changed, and a torque of the knob is changed by the change of the friction force when the tactile presentation knob 3 is rotated. This change is felt as the operational feeling when rotating the tactile presentation knob 3.

When the floating state is used, both the excitation electrode 202 and the detection electrode 203 may be in the floating state, or one of them may also be in the floating state. When the constant potential is used, both the excitation electrode 202 and the detection electrode 203 may have the constant potential, or one of them may also have the constant potential. It is also applicable that one of the excitation electrode 202 and the detection electrode 203 is in the floating state, and the other one of them has the constant potential. When a distance from the excitation electrode 202 to the tactile electrode 102 and a distance from the detection electrode 203 to the tactile electrode 102 are different from each other, one of the excitation electrode 202 and the detection electrode 203 closer to the tactile electrode 102 may be in the floating state, and one of them farther away from the tactile electrode 102 may have the constant potential.

In the example illustrated in FIG. 28, the touch coordinate data is transmitted from the touch detection circuit 210 to the voltage supply circuit 110, however, information of a charge detection result may be transmitted from the charge detection circuit 212 to the voltage supply circuit 110. In this case, the tactile presentation control circuit 114 determines presence or absence of the touch and calculates the touch coordinate using information of the charge detection result.

When the position of locating the tactile presentation knob 3 on the tactile presentation panel 100 is changed during the operation or for each operation, the bottom surface part 15 may be firmly attached in a plane and fixed to the tactile presentation panel 100. When the position of locating the tactile presentation knob 3 on the tactile presentation panel 100 is not changed during the operation or for each operation (when the tactile presentation knob 3 is used while fixing the position thereof), the bottom surface part 15 may be bonded to the tactile presentation panel 100 by the adhesion part 17 and fixed thereto.

<Suppression of Storing Charge in Conductive Elastic Part>

Figure 35:
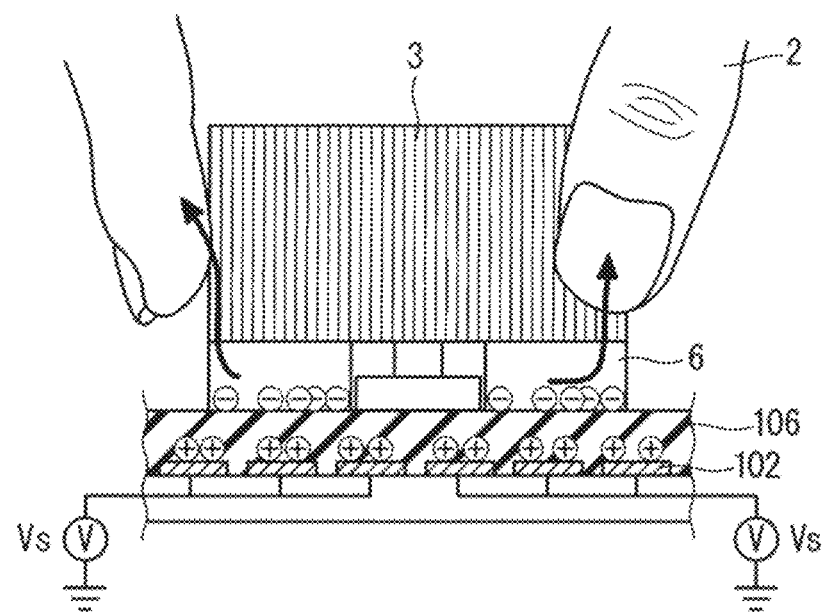
FIG. 35 An image diagram schematically illustrating movement of electrical charge stored in the conductive elastic part when the tactile presentation knob is ground-connected via the indicator in applying the signal voltage according to the embodiment 1.

FIG. 35 is an image diagram schematically illustrating movement of electrical charge when charge stored in the conductive elastic part 6 is grounded via the indicator 2 in applying the signal voltage. The conductive elastic part 6 is made up of insulating resin mixed with carbon black or metal particles, thus has relatively high resistance, and charge is easily stored. When the charge is stored in the conductive elastic part 6, the electrostatic force between the conductive elastic part 6 and the tactile electrode 102 is not changed by the signal voltage, and tactile strength is reduced. When the conductive elastic part 6 and the surface of the rotation part 4 are electrical connected, the conductive elastic part 6 is ground-connected via the indicator 2 when the indicator 2 has contact with the rotation part 4, thus the charge stored in the conductive elastic part 6 is released, and storage of the charge can be suppressed.

When the conductive elastic part 6 has high resistance, the charge is hardly moved in the conductive elastic part 6, and the charge cannot be sufficiently released only by releasing the charge via the indicator 2 as described above. In that case, at least one of the conductive elastic parts 6 divided into two or more pieces in applying the signal voltage forms the electrostatic capacitance with the tactile electrode 102, and the tactile electrode 102 is driven so that at least one of the conductive elastic parts 6 is connected via the tactile electrode 102 connected to the ground-connected charge ejection part 115 (refer to FIG. 36 hereinafter) and the dielectric layer 106, thus release of the charge stored in the conductive elastic part 6 via the indicator 2 is promoted. The charge stored in the dielectric layer 106 is released to the tactile electrode 102, thus the storage of the charge is prevented. The tactile electrode 102 connected to the charge ejection part 115 needs not be fixed, but may be driven while switching application of the signal voltage in the same tactile electrode 102 and connection to the charge ejection part 115, and the tactile electrode 102 applying the signal voltage and the tactile electrode 102 connected to the charge ejection part 115 may be alternately arranged. However, the electrostatic force does not occur in the tactile electrode 102 connected to the charge ejection part 115. Accordingly, in order to prevent reduction in tactile, it is sufficient that the number of the tactile electrodes 102 to which the signal voltage is applied is larger than the number of the tactile electrodes 102 connected to the charge ejection part 115, or the time of connecting to the charge ejection part 115 is shorter than the time of applying the signal voltage so that an effective area of the conductive elastic part 6 generating the electrostatic force with the tactile electrode 102 is larger than an effective area of the conductive elastic part 6 forming the capacitance with the charge ejection part 115.

Figure 36:
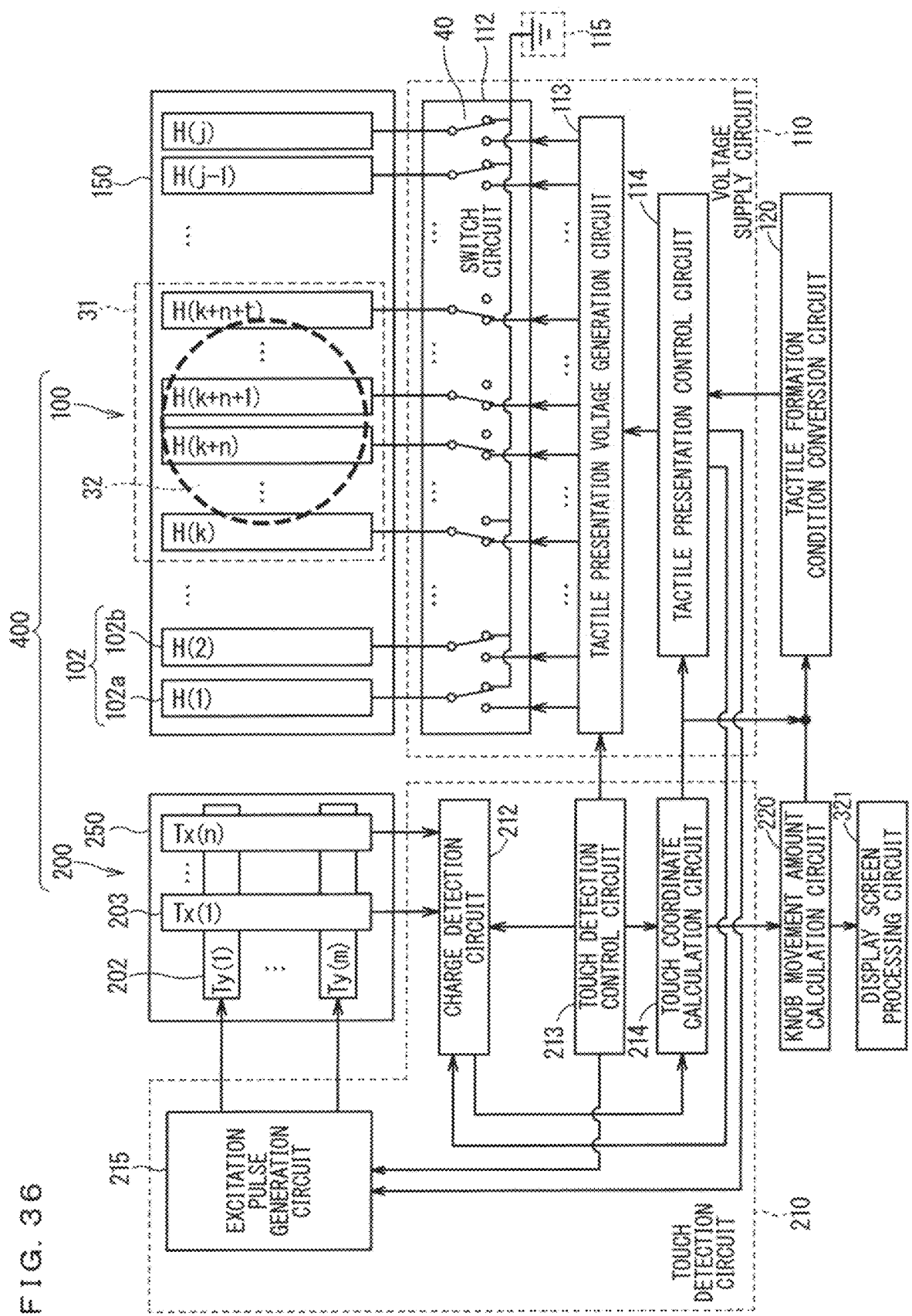
FIG. 36 A block diagram schematically illustrating a configuration of the tactile presentation touch panel when the tactile presentation knob ground-connects some of the tactile presentation electrodes with which the tactile presentation knob has contact via a dielectric layer in applying the signal voltage according to the embodiment 1.

FIG. 36 is a block diagram illustrating a configuration of a case where at least one of the conductive elastic parts 6 divided into two or more pieces forms the electrostatic capacitance with the tactile electrode 102, and the tactile electrode 102 is driven so that at least one of the conductive elastic parts 6 is connected via the ground-connected tactile electrode 102 and the dielectric layer 106. In the determination period P4 (refer to FIG. 32), the tactile presentation control circuit 114 determines the position where the tactile presentation knob 3 is located from the touch coordinate data, the area where the tactile is presented is determined, the area is divided into two or more pieces, and the region where the tactile presentation signal is inputted and the region connected to the GND are determined.

The tactile presentation control circuit 114 selects the tactile presentation signal waveform corresponding to the display screen and the coordinate of the tactile presentation knob 3 based on the input from the tactile formation condition conversion circuit 120. This "tactile presentation signal waveform" defines each waveform of the voltage signal $V_a$ and the voltage signal $V_b$. A difference of the waveform between the voltage signal $V_a$ and the voltage signal $V_b$ is typically a difference of a frequency. The tactile presentation signal waveform is set inside or outside the tactile presentation control circuit 114. The number of types of the tactile presentation signal waveform may be one, or two or more types thereof may also be applicable. When there is only one type of the tactile presentation signal waveform, processing of selecting the tactile presentation signal waveform is not necessary. When there are two or more types of the tactile presentation signal waveform, the type of the tactile presentation signal waveform is selected based on the input from the tactile formation condition conversion circuit 120.

Next, in the tactile presentation signal application period P5 (refer to FIG. 32), the tactile presentation control circuit 114 generates the tactile presentation signal in the tactile presentation signal waveform described above. The switch 40 connected to the tactile electrode 102 in the region where the tactile presentation signal of the switch circuit 112 is inputted is connected to the tactile presentation voltage generation circuit 113, and the switch 40 connected to the tactile electrode 102 in the region connected to the GND is connected to the GND. The switch 40 connected to the tactile electrode 102 in the region where the tactile presentation signal is not inputted is connected to the GND, or the switch 40 is not turned on to keep the tactile electrode 102 in the floating state. Accordingly, the signal is applied to the tactile electrode 102, thus the tactile is presented. In the example in FIG. 32, an alternating signal with H level (high level) and L level (low level) is applied to the tactile electrode 102. The tactile electrode 102 is charged at high voltage of positive electrode, that is typically plus several tens of volts in the period of H level, is discharged in the period of 0 level, and is charged at high voltage of negative electrode, that is typically minus several tens of volts in the period of L level. A generation cycle and a generation period of the pulse signal can be appropriately set based on the input from the tactile formation condition conversion circuit 120.

After the tactile presentation signal application period P5 described above, the processing returns to the touch detection period P1. The operation described above is thereby repeated. Accordingly, the tactile presentation touch panel 400 can detect the position of the tactile presentation knob 3 and present the tactile in accordance with the position of the tactile presentation knob 3 and display screen.

In the description in the present embodiment 1, the GND terminal is used as the charge ejection part 115, however, the other configuration is also applicable as long as the charge stored in the conductive elastic part 6 can be ejected. For example, positive voltage or negative voltage for effectively ejecting charge may be applied instead of using the GND terminal in accordance with conductivity of the charge stored in the conductive elastic part 6.

<Difference Between Electrode Structure of Tactile Presentation Screen and Electrode Structure of Touch Screen>

Desired as an appropriate condition of the tactile electrode 102 is firstly a configuration that the indicator 2 can have contact with the tactile electrode 102 without intervention of a member other than the dielectric layer 106. Thus, the tactile electrode 102 covered by the dielectric layer 106 is preferably disposed on an outermost surface of the tactile presentation touch panel 400.

Secondly, larger tactile can be generated as a distance from the indicator 2 to the tactile electrode 102 decreases. From this viewpoint, the thickness of the dielectric layer 106 is preferably small, and a dielectric constant of the dielectric layer 106 is preferably large.

Thirdly, it is desired that the tactile electrodes 102 are located densely to increase the electrostatic capacitance $C_{NE}$ (refer to FIG. 34) in generating the tactile, however, an electrostatic capacitance $C_E$ between the tactile electrodes 102, that is to say, the inter-electrode capacitance is preferably small so as not to block formation of the electrostatic capacitance $C_{ND}$ in detecting the touch position (refer to FIG. 32).

In a case where the tactile presentation touch panel 400 is larger than the tactile presentation knob 3 in size and is used as a touch panel which does not present the tactile in the area where the tactile presentation knob 3 is not located, when the indicator 2 is not in contact with the tactile presentation knob 3, repeated is the operation timing (refer to FIG. 29) at which the indicator 2 is not in contact with the tactile presentation knob 3 in a whole surface of the tactile presentation touch panel 400. When the touch is detected in the area used as the touch panel which does not present the tactile, the touch position is calculated and outputted. When the indicator 2 has contact with the tactile presentation knob 3, the touch detection in the area where the tactile presentation knob 3 is not located is suspended, and only the area where the tactile presentation knob 3 is located is operated at the operation timing at which the indicator 2 has contact with the tactile presentation knob 3 as described above (refer to FIG. 31).

In a case where the tactile presentation touch panel 400 is used as a touch panel presenting the tactile in the area where the tactile presentation knob 3 is not located, when the indicator 2 does not have contact with the tactile presentation knob 3, repeated is the operation timing (refer to FIG. 29) at which the indicator 2 is not in contact with the tactile presentation knob 3 in a whole surface of the tactile presentation touch panel 400. When the touch is detected in the area used as the touch panel presenting the tactile, the area is operated at the operation timing at which the indicator 2 has contact with the tactile presentation knob 3 as described above (refer to FIG. 31). When the indicator 2 has contact with the tactile presentation knob 3, the touch detection in the area where the tactile presentation knob 3 is not located is suspended, and only the area where the tactile presentation knob 3 is located is operated at the operation timing at which the indicator 2 has contact with the tactile presentation knob 3 as described above (refer to FIG. 31).

Firstly, a matrix structure capable of accurately identifying the touch position is necessary to ensure sensitivity and linearity in detecting the touch position as an appropriate condition of the excitation electrode 202 and the detection electrode 203. Secondly, a predetermined distance (several hundred μm to several hundred mm) needs to be provided between the excitation electrode 202 and the detection electrode 203 so that an electrical field extends in a lateral direction to detect the touch position by the electrostatic capacitance $C_{ND}$ formed by the indicator 2 and the detection electrode 203 via the tactile presentation screen 150.

The appropriate condition of the tactile electrode 102 and the appropriate condition of the excitation electrode 202 and the detection electrode 203 are different from each other as described above. It is not desirable to apply a similar structure to those conditions to optimize them.

<Details of Lead-Out Wiring Layer>

The lead-out wiring layer 105 (FIG. 15) of the tactile presentation screen 150 specifically includes lead-out wiring layers Ld(1) to Ld(j) and lead-out wiring layers Lu(1) to Lu(j). When a certain integral number in a number of 1 to j is k, each of the lead-out wiring layers Ld(k) and Lu(k) is connected to the $k^{th}$ tactile electrode 102. The lead-out wiring layers Ld(k) and Lu(k) are connected to one end and the other end of one tactile electrode 102 in an extension direction.

It is desirable that wiring resistance of each tactile electrode 102 provided in tactile presentation screen 150 is high, and is equal to or larger than $10^4 \Omega$, for example, from a viewpoint of not blocking the touch detection by the touch screen 250. When the wiring resistance is high in this manner, transmission delay in the voltage signal easily occurs in the wiring layer. The lead-out wiring layer 105 is connected to each of one end and the other end of the tactile electrode 102 as described above, transmission delay can be suppressed.

The lead-out wiring layers Ld(1) to Ld(j) are disposed on an outer side of a tactile presentable area, and extend to corresponding electrodes in an order of increasing distance from a center of arrangement of the tactile presentation panel terminal part 107 to obtain substantially a shortest distance. The tactile presentation panel terminal part 107 is disposed near a center of a long side of the transparent insulating substrate 101 along the long side thereof. The lead-out wiring layers Ld(1) to Ld(j) are arranged as densely as possible while ensuring insulation therebetween. The lead-out wiring layers Lu(1) to Lu(j) are disposed on an outer side of a region occupied by the lead-out wiring layers Ld(1) to Ld(j) in the similar manner. According to such an arrangement, an area on the outer side of the tactile presentable area in the transparent insulating substrate 101 can be reduced.

The lead-out wiring layer 105, specifically the lead-out wiring layers Ld(1) to Ld(j) and the lead-out wiring layers Lu(1) to Lu(j) are preferably made up of a metal single layer film or a laminated film of a metal single layer and a non-metal single layer. When the laminated film includes a lower layer and an upper layer covering the lower layer, the upper layer may have a function as a protection layer protecting the lower layer. For example, the upper layer as the protection layer may protect the lower layer from an etchant in an etching process used for manufacturing the tactile presentation screen 150. Alternatively, the upper layer may function as a cap layer preventing corrosion of the lower layer in manufacturing or using the tactile presentation screen 150. When a material having larger adhesiveness with the transparent insulating substrate 101 than a material of the upper layer is applied to a material of the lower layer, occurrence of detachment of the lead-out wiring layer 105 can be suppressed.

<Tactile Presentation Touch Panel Including Display Panel>

Figure 37:
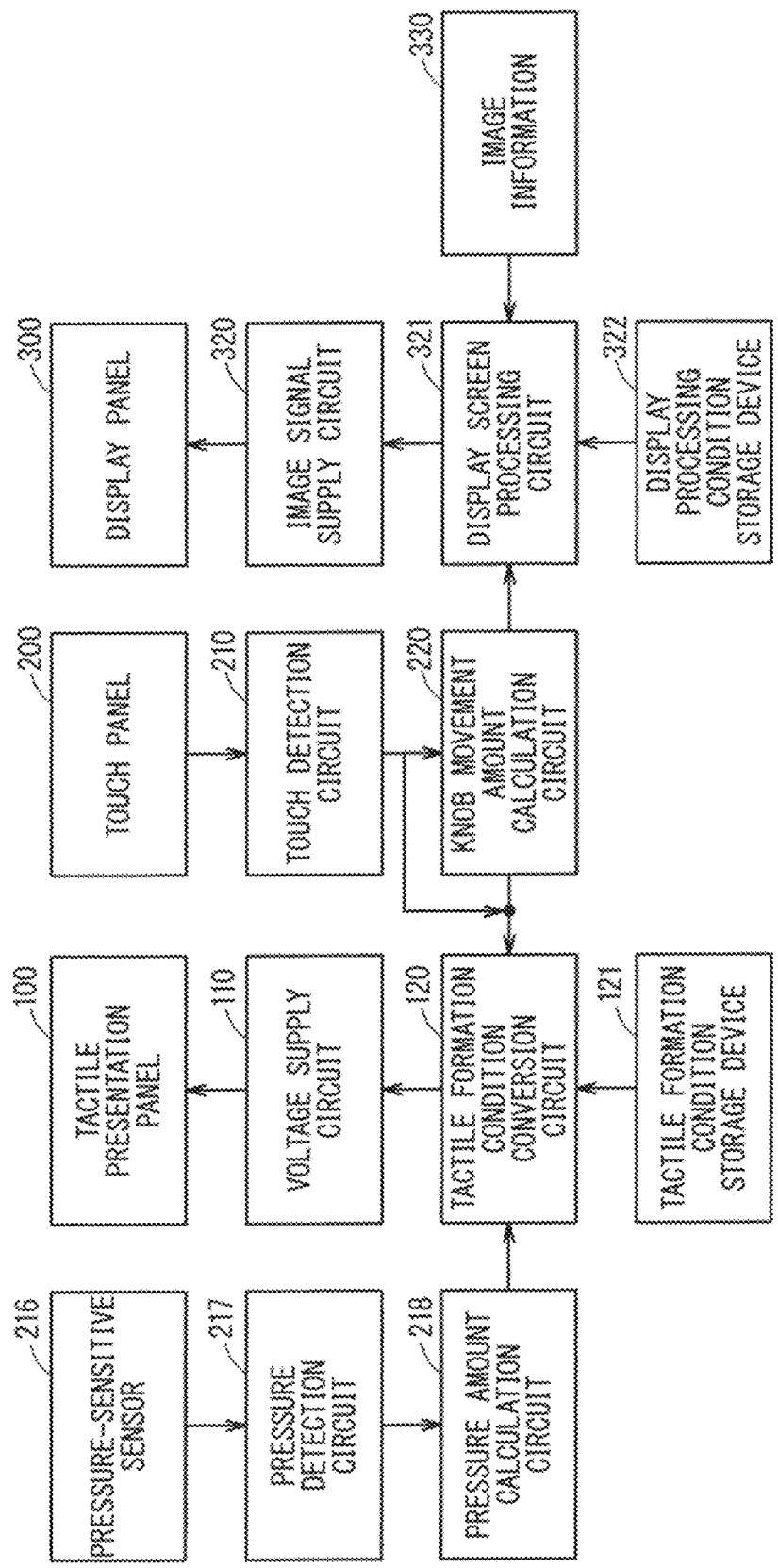
FIG. 37 A block diagram illustrating an outline of a relationship of a display panel, a touch panel, and a tactile presentation panel according to the embodiment 1.

FIG. 37 is a block diagram illustrating an outline of a relationship of the display panel, the touch panel, and the tactile presentation panel. The knob movement amount calculation circuit 220 (refer to FIG. 28 and FIG. 36) outputs information of a movement amount (rotation angle) of the knob to the tactile formation condition conversion circuit 120 and the display screen processing circuit 321 based on the coordinate on the touch panel 200 of the knob obtained in the touch detection circuit 210.

The display screen processing circuit 321 selects a display processing condition corresponding to the movement amount of the knob in a pattern previously stored in the display processing condition storage device 322 (display condition storage device). Then, image information 330 is edited based on the selected display processing condition, and the image data is transferred to the image signal supply circuit 320.

The tactile formation condition conversion circuit 120 selects a tactile formation condition, such as tactile strength, for example, corresponding to the movement amount of the knob in the pattern previously stored in a tactile formation condition storage device 121 (tactile condition storage device). The voltage supply circuit 110 supplies the voltage signal to the tactile presentation panel 100 based on the selected tactile formation condition. Accordingly, change in the display of the display panel corresponding to the rotation amount of the tactile presentation knob 3 and the tactile obtained from the knob are synchronized with each other.

Figure 38:
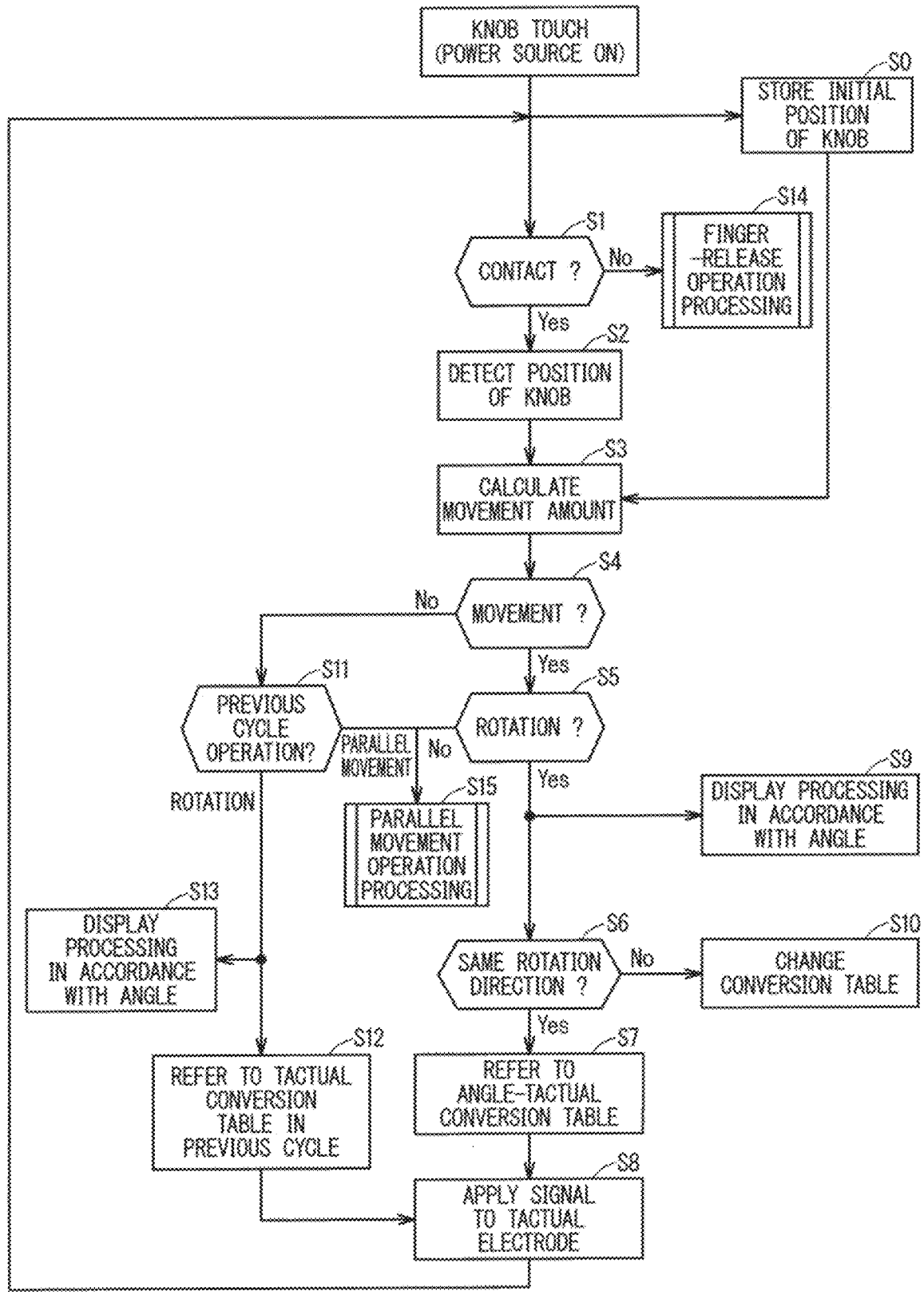
FIG. 38 A flow chart illustrating processing of tactile presentation according to the embodiment 1.

FIG. 38 is a flow chart in which the synchronization processing described above is described. The synchronization processing is started when the indicator 2 (refer to FIG. 31) has contact with (knob touch) the tactile presentation knob 3 (refer to FIG. 31) or the power source of the tactile presentation touch panel 400 is turned on (power source ON), and a positional coordinate of the tactile presentation knob 3 on the touch panel 200 at the time of starting the synchronization processing or the time of giving the tactile presentation touch panel 400 an initial state signal of initializing the state of the tactile presentation knob 3 is stored as an initial position (Step S0).

A contact state of the tactile presentation knob 3 and the indicator 2 is determined in a predetermined cycle (Step S1), and when it is determined that they are not in contact with each other (in a case of No), it is determined that a finger-release operation (contact release) is performed, and the processing proceeds to the finger-release operation processing (Step S14). In the meanwhile, when it is determined that they are in contact with each other (in a case of Yes), the position of the tactile presentation knob 3 on the touch panel 200 is detected to obtain a current coordinate (Step S2). Then, the movement amount (rotation angle) of the tactile presentation knob 3 is calculated from the obtained current coordinate and the initial coordinate (Step S3) to determine presence or absence of the movement from the movement amount (Step S4).

When it is determined that the tactile presentation knob 3 is not moved (in a case of No), it is determined whether the operation in the previous cycle is rotation or parallel movement (Step S11), and in the case of the parallel movement, the processing proceeds to parallel movement operation processing (Step S15). In the meanwhile, in the case of the rotation, an angle-tactual conversion table is referenced at the rotation angle in the previous cycle (Step S12), and the signal is applied to the tactile electrode in a condition of forming the same tactual sense as that in the previous cycle (Step S8).

When the operation in the previous cycle is the rotation, display processing corresponding to the rotation angle in the previous cycle is performed (Step S13).

In the meanwhile, when it is determined that the tactile presentation knob 3 is moved in Step S4 (in a case of Yes), it is determined whether or not the rotation operation is performed (Step S5). This determination is performed by a method described using FIG. 26, for example, and when it is determined that the rotation operation is not performed (in a case of No), it is determined that the parallel movement operation is performed, and the processing proceeds to the parallel movement operation processing (Step S15). In the meanwhile, when it is determined that the rotation operation is performed (in a case of Yes), it is determined whether or not a rotation direction of the rotation movement is the same as that in the previous cycle (Step S6). When it is determined that the rotation operation is performed, display processing corresponding to the rotation angle calculated in Step S3 is performed (Step S9).

When it is determined that the rotation direction is the same (in a case of Yes) in Step S6, the same angle-tactual conversion table as the previous cycle is referenced (Step S7), and the signal is applied to the tactile electrode 102 (Step S8).

In the meanwhile, when it is determined that the rotation direction is not the same as that in the previous cycle (in a case of No) in Step S6, it is determined that the tactile presentation knob 3 is rotated in an opposite direction, the conversion table is changed to a conversion table from the rotation angle to the tactual sense for the opposite direction (Step S10), the changed angle-tactual conversion table is referenced (Step S7), and the signal is applied to the tactile electrode 102 (Step S8).

After the voltage is applied to the tactile electrode 102, the processing proceeds to confirmation of the contact state of the tactile presentation knob 3 and the indicator 2 in a next cycle.

<Relationship Between Pressing and Tactual Strength>

Figure 39:
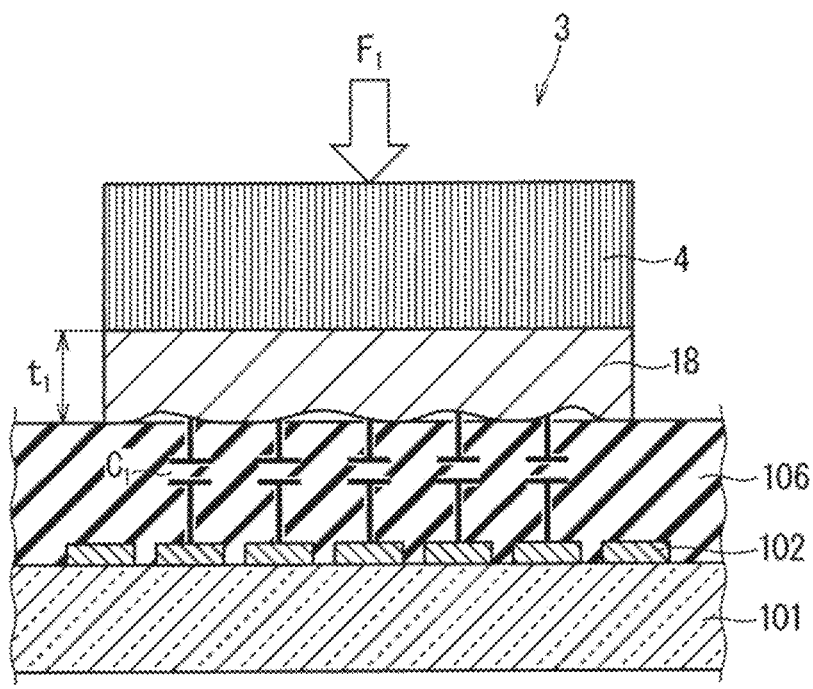
FIG. 39 A schematic diagram illustrating an interface between the conductive elastic part and a display surface when the tactile presentation knob is operated at weak pressing force.
Figure 40:
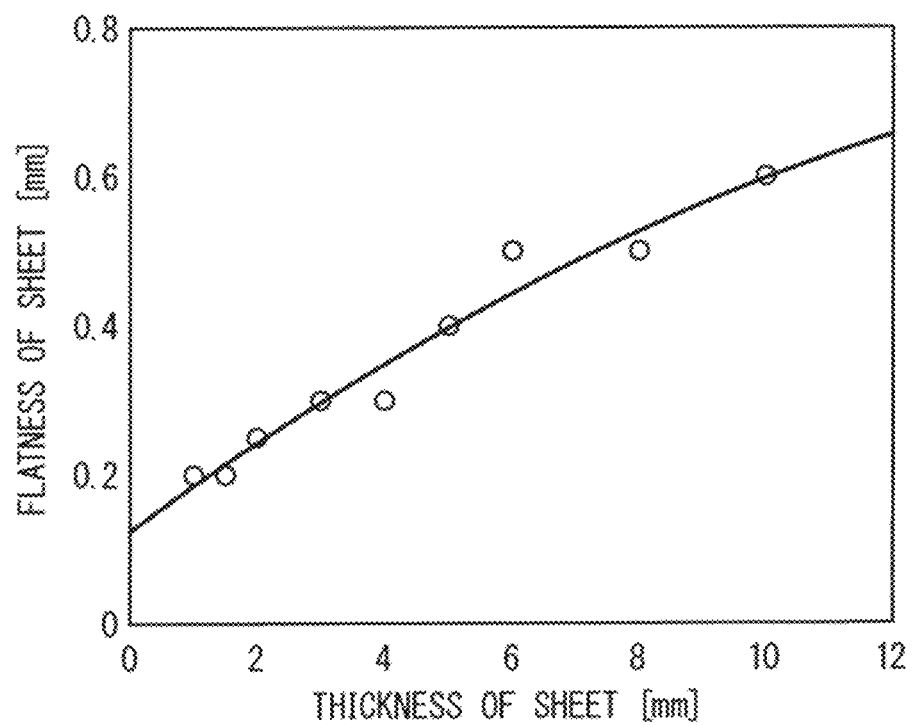
FIG. 40 A diagram illustrating a relationship between a thickness of a general rubber sheet and a flatness of one surface.

The pressing force in the rotation operation of the tactile presentation knob 3 performed by the user changes depending on a change of an angle of an arm and wrist of the user caused by an operation amount, for example. FIG. 39 is a schematic diagram illustrating an interface between the conductive elastic part 6 and the display surface when the tactile presentation knob 3 is operated with weak pressing force F1. FIG. 40 is a graph showing a relationship between a thickness of a general rubber sheet and a flatness of one surface, and FIG. 41 is a schematic diagram illustrating an interface between the conductive elastic part 6 and the display surface when the tactile presentation knob 3 is operated at strong pressing force.

Described hereinafter is an example of a case of using a general conductive rubber for the conductive elastic part 6. The conductive rubber is manufactured by compounding and refining a raw material to make a rubber body, rolling the rubber body to make a rubber sheet having a predetermined thickness by a roller, and then performing vulcanization processing thereon. A general dimensional tolerance of the thickness of the rubber sheet is ±0.2 mm in the thickness of 1.5 mm, ±0.25 mm in the thickness of 2 mm, and ±0.3 mm in the thickness of 3 to 4 mm, thus the dimensional tolerance gets large as the thickness of the sheet increases. Thus, a flatness of one surface of the rubber sheet (maximum unevenness) is 0.2 mm in the thickness of 1.5 mm, 0.25 mm in the thickness of 2 mm, and 0.3 mm in the thickness of 3 to 4 mm as illustrated in FIG. 40.

In the state where the tactile presentation knob 3 is disposed on the operation surface of the tactile presentation touch display 1, when the tactile presentation knob 3 is operated with the weak pressing force F1 as illustrated in FIG. 39, the conductive elastic part 6 is less deformed, thus an air layer 18 caused by the unevenness remains between the conductive elastic part 6 and the operation surface. In the meanwhile, when the conductive elastic part 6 is sufficiently deformed and the tactile presentation knob 3 is operated with pressing force F2 with which the conductive elastic part 6 is firmly attached to the operation surface, the air layer 18 is reduced more than the case in FIG. 39 or disappears.

A dielectric constant of the air layer 18 is 1.0, which is substantially the same as that in vacuum, and is lower than that of the dielectric layer 106. When a distance from the tactile electrode 102 to the conductive elastic part 6 in the case of the pressing force F1 and an average dielectric constant are d1 and ε1, respectively, and a distance from the tactile electrode 102 to the conductive elastic part 6 in the case of the pressing force F2 and an average dielectric constant are d2 and E2, respectively, a relationship of d1>d2 and ε1<ε2 are established, and when the electrostatic capacitance $C_{NE}$ between the tactile electrode 102 and the conductive elastic part 6 is calculated in accordance with the Expression (1) described above, the electrostatic capacitance C1 in the case of the pressing force F1<the electrostatic capacitance C2 in the case of the pressing force F2 is established. Thus, tactual strength in the case of the pressing force F1 is weaker than that in the case of the pressing force F2.

Furthermore, when the pressing force in operating the tactile presentation knob 3 is too large, the contact area between the conductive elastic part 6 and the operation surface increases, and the conductive elastic part 6 and the operation surface are firmly attached and a static friction coefficient increases. Thus, a difference between friction force (static friction force) when the voltage signal is not inputted and friction force generated by electrostatic force when the voltage signal is inputted decreases, clarity of tactual sense decreases, and the user feels that tactual strength is weak.

When the pressing force is changed from a state where the air layer 18 is not included as illustrated in FIG. 41 to a state where the air layer 18 is included as illustrated in FIG. 39 in the sequential operation, the electrostatic capacitance $C_{NE}$ decreases while holding the same charge, thus the voltage V rapidly increases (refer to the Expression (1)), and discharge phenomenon may occur between the tactile electrode 102 and the conductive elastic part 6, and such a case causes reduction in reliability of the tactile presentation panel 100.

As the method of suppressing the change in the tactual strength caused by the pressing force as described above, for example, as illustrated in FIG. 1, the pressure-sensitive sensor 216 is disposed on the back surface of the display panel 300, and the pressure-sensitive sensor 216 detects the deformation of the member constituting the tactile presentation touch display 1 caused by the pressing force in operating the tactile presentation knob 3. Then, as illustrated in FIG. 37, the output of the pressure-sensitive sensor 216 is inputted to a pressure detection circuit 217, and a pressure amount calculation circuit 218 calculates a pressure amount from a detection value in the pressure detection circuit 217. Considered is a method of correcting the waveform of the voltage signal by the tactile formation condition conversion circuit 120 in accordance with the calculated pressure amount. The method thereof is described hereinafter.

Applicable to the pressure-sensitive sensor 216 is a capacitance system of detecting a capacitance change in accordance with a change of a gap of a pressure-sensitive sensor electrode caused by the pressing force or a piezoelectric system of detecting distortion of expanding and contracting in proportion to the pressing force as the electrical signal as an amount of a deformation of a structure bonding the pressure-sensitive sensor 216 such as the back surface of the display panel 300 in the case in FIG. 1, for example. Any system is applicable as long as a pressure-sensitive sensor detecting the pressing force is applied. The plurality of pressure-sensitive sensors 216 are disposed in positions so that the pressing force can be detected with equal sensitivity even when the tactile presentation knob 3 is operated in any position in a display area 301. When four pressure-sensitive sensors 216 are used, they are disposed to be symmetry with respect to a point or a line in portions near four corners in the display area 301 as illustrated in FIG. 1.

As the pressing force, a change in the capacitance of four pressure-sensitive sensors 216 or a change in a distortion amount is detected by the pressure detection circuit 217, and the pressure amount calculation circuit 218 obtains a weighted average from the detection value outputted from the pressure detection circuit 217 to calculate the pressure amount, and the pressure amount is outputted to the tactile formation condition conversion circuit 120. The waveform of the voltage signal outputted from the tactile formation condition storage device 121 is corrected to the waveform of the voltage signal corresponding to the pressure amount based on the tactile formation condition determined by the operation position and the operation amount corresponding to the user interface (UI) displaying the image, and is outputted to the voltage supply circuit 110.

The number of the pressure-sensitive sensors 216 and the arrangement positions thereof are not limited thereto described above, thus more pressure-sensitive sensors 216 can be evenly disposed in the display area, and the pressure amount can be detected with higher sensitivity and high definition to calculate a distribution of the pressure amount in the display area 301. In this case, load of the tactile presentation knob 3 can also be detected to calculate the position of the tactile presentation knob 3.

In the case of the piezoelectric system, the sheet-like pressure-sensitive sensor 216 in which pressure-sensitive elements are disposed in a matrix may be attached to the whole back surface of the display panel 300. In this case, load of the tactile presentation knob 3 can also be detected to calculate the position of the tactile presentation knob 3.

A position where the pressure-sensitive sensor 216 is disposed is not limited to the back surface of the display panel 300. For example, when an outer periphery of the tactile presentation touch display 1 is fixed to a chassis, it may be disposed below a black frame print part 302 as an outer periphery of a back surface of the fixed tactile presentation panel 100 to detect a deformation of the tactile presentation touch display 1. When the pressure-sensitive elements are made up of transparent conductive films, also applicable is an integrated structure in which the pressure-sensitive elements are disposed in a matrix in a structure of any of the tactile presentation panel 100, the touch panel 200, and the display panel 300.

It is sufficient that a system, a structure, and a detection position of the pressure-sensitive sensor 216, for example, is selected based on a condition in which a deformation amount of the structure constituting the tactile presentation touch display 1 is large and pressure can be detected with high sensitivity in accordance with a method of fixing the tactile presentation touch display 1 to the chassis and a type of the display panel 300 (a liquid crystal display, an organic EL panel, or a μ LED, for example).

As described above, the configuration of correcting the voltage signal in accordance with the pressing force of the tactile presentation knob 3 can be adopted, and the load and the pressing force in operating the tactile presentation knob 3 is applied to the conductive elastic part 6. The conductive elastic part 6 has elasticity, thus when the load and the pressing force in operating the tactile presentation knob 3 is applied thereto, the material of the conductive elastic part 6 is compressed in a pressing direction, and reduces some of the pressing force. The pressure-sensitive sensor 216 and the pressure detection circuit 217 can detect only the pressing force after being reduced by the elasticity of the conductive elastic part 6. The elasticity of the conductive elastic part 6 is changed in accordance with a temperature, pressure, and rotation speed, for example. Thus, it is difficult to calculate accurate pressing force including the pressing force reduced by the conductive elastic part 6 in the pressure amount calculation circuit 128. The thickness of the air layer 18 between the conductive elastic part 6 and the operation surface cannot be controlled, thus a static friction coefficient of the conductive elastic part 6 and the operation surface cannot be kept constant, and it is difficult to keep clarity of the tactile constant.

Described hereinafter is a tactile presentation knob in the embodiment 1 solving the above problems. FIG. 42 is a cross-sectional view illustrating a configuration of a tactile presentation knob 30 according to the embodiment 1.

As illustrated in FIG. 42, in the tactile presentation knob 30, the diameter of the conductive elastic part 6 is smaller than that of the rotation part 4, and a support part 19 is provided to have contact with a side surface of the conductive elastic part 6. The support part 19 is provided to extend from the bottom surface of the rotation part 4 to a portion near a bottom surface of the conductive elastic part 6, and is set to have a height not exceeding a height of the conductive elastic part 6 in a state where the tactile presentation knob 30 is not pressed. In FIG. 42, a difference between a height of the support part 19 and a maximum height of the conductive elastic part 6 is $\Delta t$.

FIG. 43 is a diagram illustrating a relationship of a difference $\Delta t$ (mm) between the height of the support part 19 of the tactile presentation knob 30 and the maximum height of the conductive elastic part 6 and tactile strength in a case of pinching the tactile presentation knob 30. FIG. 43 illustrates a result of comparing the difference $\Delta t$ (mm) between the height of the support part 19 in a case of using a conductive rubber having a thickness of 2 mm and hardness 60 as the conductive elastic part 6 and the maximum height of the conductive elastic part and the tactile strength. According to FIG. 43, clear tactile (circle) is obtained when the $\Delta t$ value is increased to 0.26 mm which is the same as a flatness of the conductive rubber having the thickness of 2 mm, the tactile strength is largest and clear tactile (double circle) is obtained when the $\Delta t$ value is 0.34 mm, and when the $\Delta t$ value is 0.43 mm and 0.52 mm, tactile strength is reduced to a degree of circle or triangle.

The conductive rubber has a sponge-like structure in which a rubber material is resin-bridged. It is considered that the tactile strength is largest when the $\Delta t$ value is mm by reason that a large surface unevenness caused by processing the material described above is deformed by the pressing force, a small surface unevenness caused by a microstructure of the material is squished, and the conductive elastic part 6 and the operation surface are firmly attached, thus influences of both the reduction in the electrostatic capacitance by the air layer 18 and the increase in the static friction force caused by the increase in the contact area between the conductive elastic part 6 and the operation surface are minimized in this condition.

The support part 19 is provided, thus when the conductive elastic part 6 is sufficiently deformed and applies the pressing force F2 of being firmly attached to the operation surface to the tactile presentation knob 30 as illustrated in FIG. 41, the support part 19 has contact with the operation surface, and supports the tactile presentation knob 30. Accordingly, the conductive elastic part 6 is not compressed beyond the height of the support part 19, but the pressing force on the conductive elastic part 6 is kept constant, thus the static friction force between the conductive elastic part 6 and the operation surface can be kept constant.

The height of the support part 19 is lower than that of the conductive elastic part 6, the pressing force in the operation is limited so as not to be excessively applied to the conductive elastic part 6, thus a capacitance design including the thickness of the air layer 18 between the conductive elastic part 6 and the operation surface can be achieved, and the electrostatic capacitance $C_{NE}$ between the tactile electrode 102 and the conductive elastic part 6 in the operation can be kept constant.

A friction coefficient between a surface of the support part 19 having contact with the operation surface and the operation surface is lower than that between the conductive elastic part 6 and the operation surface, thus the friction force acting on the tactile presentation knob 3 when the voltage signal is not inputted is mainly made by friction force corresponding to the friction coefficient between the conductive elastic part 6 and the operation surface. Thus, used as a material of the support part 19 is, for example, a plastic material such as polycarbonate (PC), polyacetal (POM), polyamide (PA6, PA66), polyphenylene sulfide (PPS), polyetheretherketone (PEEK), glass fiber reinforced polyamide MXD6 (RENY), polychlorinated vinyl chloride (PVC), polypropylene (PP), ABS resin, AS resin (SAN), polyimide (PI), polytetrafluoroethylene resin (PTFE), perfluoroalkoxyalkane (PFA), polyvinylidene fluoride resin (PVDF), ceramic (CERAMIC), polyslider polyethylene (PE), polystyrene styrol resin (PS), polyethylene terephthalate (PET), methacrylic resin (PMMA), glass, or metal with a lower friction coefficient than the conductive elastic part 6.

Accordingly, when the support part 19 has surface contact with the operation surface so that the friction force between the support part 19 and the operation surface is smaller than that between the conductive elastic part 6 and the operation surface, a flat shape with a small convex-concave portion is applied to the contact surface, and when the support part 19 has point contact with the operation surface, a hemisphere shape is applied to the portion having point contact so that the portion is not caught on the operation surface.

It is preferable that the unevenness of the surface of the support part 19 or the surface roughness Ra is equal to or smaller than 5.0 μm, or an average length RSm of outline curve elements is equal to or larger than an electrode pitch of the tactile electrode 102.

The rotation operation is performed while the support part 19 has contact with the operation surface, thus the pressing force of the tactile presentation knob 3 is directly transferred to the operation surface via the support part 19, and the constituent member of the tactile presentation touch display 1 is easily deformed in proportion to the pressing force. Accordingly, the pressure-sensitive sensor 216 can accurately detect the pressing force, and the voltage signal waveform can be adjusted with high accuracy with respect to the pressing force.

Figure 44:
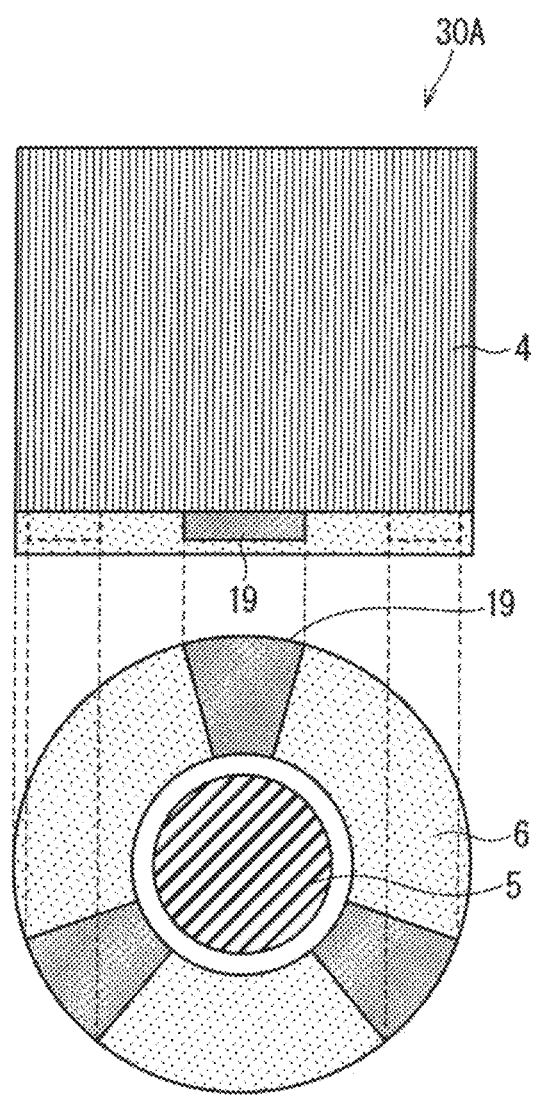
FIG. 44 A diagram illustrating a configuration of the tactile presentation knob according to the embodiment 1.

FIG. 44 is a diagram illustrating a configuration of a tactile presentation knob 30A which is more practical than the tactile presentation knob 30 according to the embodiment 1 in FIG. 42, and a side surface view and a bottom surface view of the tactile presentation knob 30A are illustrated on an upper side and a lower side, respectively.

As illustrated in FIG. 44, the tactile presentation knob 30A has a configuration that a fixing part 5 fixing the tactile presentation knob 3 to the operation surface is disposed in a center, and the support part 19 and the conductive elastic part 6 are concentrically disposed around the fixing part 5.

Each of the conductive elastic parts 6 has a fan-like shape in a plan view centering around the fixing part 5, and is disposed at intervals in three positions, and the support part 19 having a fan-like shape in a plan view is disposed between the conductive elastic parts 6.

The support part 19 is concentrically disposed at regular intervals around the fixing part 5 so as to be able to keep a state of evenly having contact with the operation surface also in the rotation operation. It is preferable that the conductive elastic part 6 is concentrically disposed between the support parts 19 as evenly as possible around the fixing part 5 so that vibration occurring in the conductive elastic part 6 is evenly transferred to the rotation part 4. The conductive elastic part 6 also has the function of the position detection part 7, the touch detection circuit 210 detects the electrostatic capacitance formed between the conductive elastic part 6 and the detection electrode 203, and the knob movement amount calculation circuit 220 calculates the rotation angle and the rotation speed of the tactile presentation knob 30A.

Effect

According to the tactile presentation knob 30 and the tactile presentation knob according to the embodiment 1, provided is the support part 19 keeping the distance from the tactile presentation knob 3 to the operation surface constant in operating the tactile presentation knob, thus the tactile presentation knob directly presses the display surface via the support part, and the pressure can be detected without the influence of reduction in the pressure caused by the pressure deformation of the conductive elastic part 6. Accordingly, the pressing force in the operation is kept constant in the conductive elastic part 6, the friction coefficient caused by the contact area between the conductive elastic part 6 and the operation surface is constant, and the voltage signal waveform in consideration of only the friction coefficient of the support part 19 and the display surface changed by the pressing force can be corrected, and the constant clear tactile can be presented to all the operators.

The friction coefficient caused by the contact area between the conductive elastic part 6 and the operation surface is kept constant and the thickness of the air layer 18 between the tactile electrode 102 and the conductive elastic part 6 is kept constant, thus fluctuation of the electrostatic capacitance between the tactile electrode 102 and the conductive elastic part 6 is suppressed, and the tactile with the stable strength is generated. Furthermore, suppressed is discharge phenomenon of electrical charge stored in the conductive elastic part 6 by fluctuation of the electrostatic capacitance formed between the tactile electrode 102 and the conductive elastic part 6 caused by the change of the thickness of the air layer 18, the effect of improving reliability of the tactile presentation touch panel 200 can also be obtained.

Embodiment 2

Figure 45:
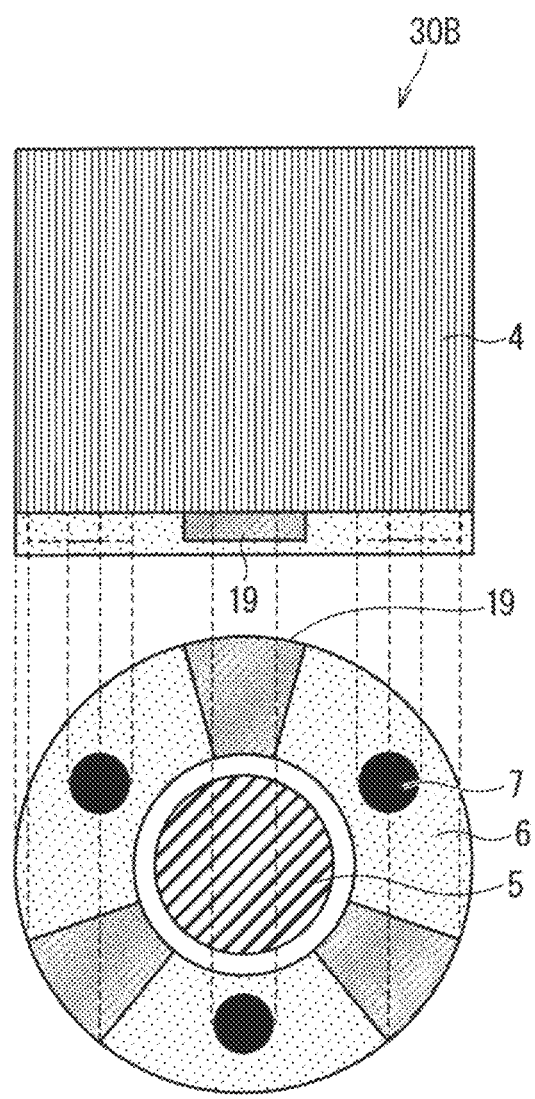
FIG. 45 A diagram illustrating a configuration of a tactile presentation knob according to an embodiment 2.

FIG. 45 is a diagram illustrating a configuration of a tactile presentation knob according to an embodiment 2, and a side surface view and a bottom surface view of the tactile presentation knob 30B are illustrated on an upper side and a lower side, respectively. As illustrated in FIG. 45, the tactile presentation knob 30B has a configuration that the fixing part 5 fixing the tactile presentation knob 30B to the operation surface is disposed in the center, and the support part 19 and the conductive elastic part 6 are concentrically disposed around the fixing part 5.

The tactile presentation knob 30B has the same configuration as the tactile presentation knob 30A according to the embodiment 1 in FIG. 44 in that each of the conductive elastic parts 6 has the fan-like shape in a plan view centering around the fixing part 5, and is disposed at intervals in three positions, and the support part 19 having the fan-like shape in a plan view is disposed between the conductive elastic parts 6, however, each of the position detection parts 7 having a circular shape in a plan view is concentrically disposed at regular intervals around the fixing part 5 in a plane of the fan-like shape of the conductive elastic part 6.

The support part 19 is concentrically disposed at regular intervals around the fixing part 5 so as to be able to keep a state of evenly having contact with the operation surface in the rotation operation. It is preferable that the conductive elastic part 6 is concentrically disposed between the support parts 19 as evenly as possible around the fixing part 5 so that vibration occurring in the conductive elastic part 6 is evenly transferred to the rotation part 4.

Applicable to a material used for the conductive elastic part 6 and the position detection part 7 is thermoset elastomer such as natural rubber (NR), isoprene rubber (IR), styrene butadiene rubber (SBR), chloroprene rubber (CR), acrylonitrile rubber (NBR), hydrogenated nitrile rubber (HNBR), butyl rubber (IIR), ethylene propylene rubber (EPDM), chlorosulfonated polyethylene rubber (CSM), silicone rubber (VMQ), fluoro rubber (FKM), fluorosilicone rubber (FVMQ), acrylic rubber (ACM), or urethane rubber (U). An elastic resin material called a conductive rubber, which is based on thermoplastic elastomers such as polyurethane (TPU), polystyrene (TPS), olefin/alkene (TPO), polyvinyl chloride (TPVC), polyester (TPEE), and polyamide (TPAE) and mixed with a conductive substance such as conductive carbon black or a metal powder, can be used. Carbon nanotube (CNT) can also be used.

Also in a case where the same material as that in the materials described above is used as the base material of the conductive elastic part 6 and the position detection part 7, when a quantity of carbon black or metal powder providing conductivity is small, a resistance value is increased, and the electrostatic capacitance formed between the tactile electrode 102 and the conductive elastic part 6 is reduced. In contrast, when a quantity of carbon black or metal powder providing conductivity is large, a resistance value is decreased, and the electrostatic capacitance formed between the tactile electrode 102 and the conductive elastic part 6 can be increased. The conductivity, the area, or the shape is different between the conductive elastic part 6 and the position detection part 7, thus the profile of the electrostatic capacitance and the capacitance value formed between the conductive elastic part 6 and the detection electrode 203 and between the position detection part 7 and the detection electrode 203 is different from each other, and the position detection can be easily performed by the position detection part 7. In FIG. 45, all of the conductive elastic parts 6, the position detection parts 7, and the support parts 19 are disposed in the three positions, however, they may be disposed in more than three positions. As the number of the arrangement positions of the support part 19 increases, the knob is more hardly inclined in the rotation operation, thus the tactual sense can be presented with more stable strength. It is sufficient that the position detection part 7 is disposed in one or more positions, and when it is disposed in three or more positions, the rotation angle of the knob can be calculated more accurately.

Effect

According to the tactile presentation knob 30B of the embodiment 2, the conductive elastic part 6 has the high resistance value, and when the electrostatic capacitance formed between the tactile electrode 102 and the conductive elastic part 6 is not large enough to detect the movement amount of the tactile presentation knob 30B, the electrostatic capacitance can be compensated by providing the position detection part 7 having the low resistance value, thus the movement amount of the tactile presentation knob 30B can be detected. The area of the position detection part 7 can be minimized.

Embodiment 3

Figure 46:
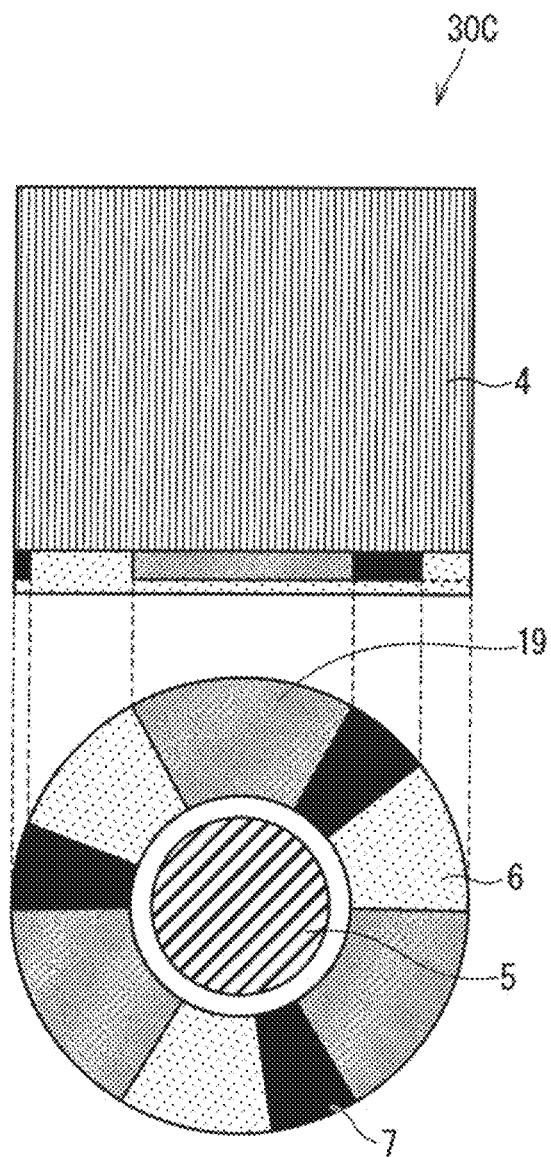
FIG. 46 A diagram illustrating a configuration of a tactile presentation knob according to an embodiment 3.

FIG. 46 is a diagram illustrating a configuration of a tactile presentation knob according to an embodiment 3, and a side surface view and a bottom surface view of the tactile presentation knob 30C are illustrated on an upper side and a lower side, respectively. As illustrated in FIG. 46, the tactile presentation knob 30C has a configuration that the fixing part 5 fixing the tactile presentation knob 30C to the operation surface is disposed in the center, and the support part 19, the conductive elastic part 6, and the position detection part 7 are concentrically disposed around the fixing part 5.

Each of the conductive elastic parts 6 has the fan-like shape in a plan view centering around the fixing part 5, and is disposed at intervals in three positions, the position detection part 7 and the support part 19 each having the fan-like shape in a plan view are disposed adjacent to each other, and the position detection part 7 is sandwiched between the conductive elastic part 6 and the support part 19.

Effect

According to the tactile presentation knob 30C of the embodiment 3, when the conductive elastic part 6 cannot also have the function of the position detection part 7 by reason that the conductive elastic part 6 has the high resistance value and the electrostatic capacitance formed between the tactile electrode 102 and the conductive elastic part 6 is not large enough to detect the movement amount of the tactile presentation knob 30C, the electrostatic capacitance can be compensated by providing the position detection part 7 having the low resistance value, and the movement amount of the tactile presentation knob 30C can be detected by obtaining the capacitance profile.

In the example in FIG. 46, a vertical and lateral width of the conductive elastic part 6 is smaller than the pitch of the detection electrode 203, and when the capacitance profile enabling position calculation cannot be obtained, the movement amount of the tactile presentation knob 30C can be detected by providing the position detection part 7 having the higher resistance value than the conductive elastic part 6 adjacent to the conductive elastic part 6. In FIG. 46, all of the conductive elastic parts 6, the position detection parts 7, and the support parts 19 are disposed in the three positions, however, they may be disposed in more than three positions, and the number of the conductive elastic parts 6, the position detection parts 7, and the support parts 19 may not be the same as each other. As the number of the arrangement positions of the support part 19 increases, the knob is more hardly inclined in the rotation operation, thus the tactual sense can be presented with more stable strength.

In the example in FIG. 46, the position detection part 7 is sandwiched between the conductive elastic part 6 and the support part 19, however, also applicable is a configuration that the support parts 19 are disposed on both sides of the position detection part 7 to sandwich the position detection part 7 by the support parts 19 made up of a material having a low dielectric constant. The capacitance profile of the position detection part 7 and the conductive elastic part 6 can be separated, and detection accuracy of the movement amount calculation circuit can be improved.

Embodiment 4

Figure 47:
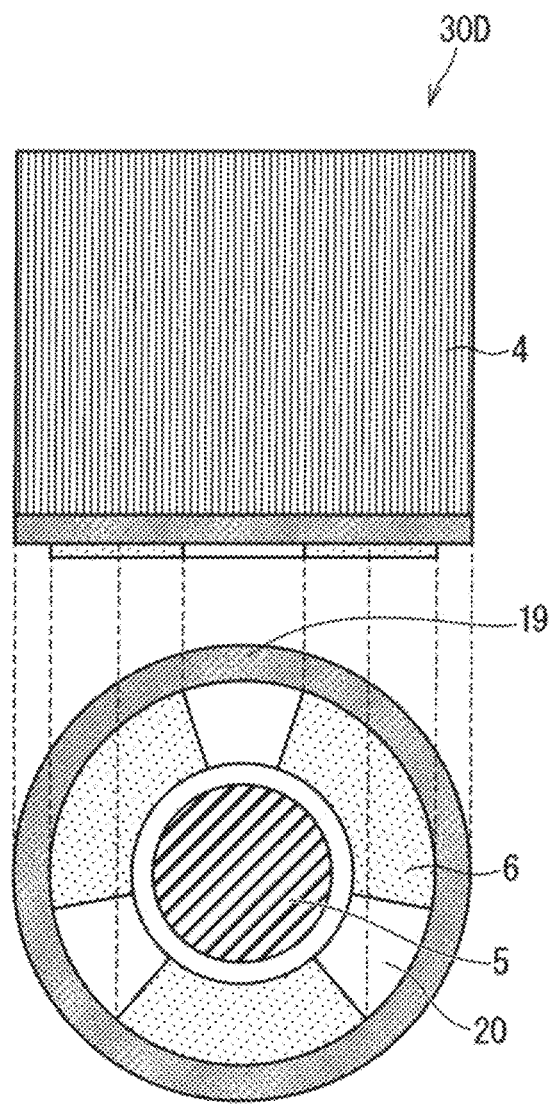
FIG. 47 A diagram illustrating a configuration of a tactile presentation knob according to an embodiment 4.

FIG. 47 is a diagram illustrating a configuration of a tactile presentation knob 30D according to an embodiment 4, and a side surface view and a bottom surface view of the tactile presentation knob 30D are illustrated on an upper side and a lower side, respectively. As illustrated in FIG. 47, the tactile presentation knob 30D has a configuration that the fixing part 5 fixing the tactile presentation knob 30D to the operation surface is disposed in the center, and the conductive elastic part 6 are concentrically disposed around the fixing part 5.

Each of the conductive elastic parts 6 has the fan-like shape in a plan view centering around the fixing part 5, and is disposed at intervals in three positions, and a void part 20 is located between the conductive elastic parts 6. Then, the support part 19 is disposed in an outer peripheral part of a surface of the tactile presentation knob 30D having contact with the operation surface, that is to say, an outer periphery of the bottom surface of the rotation part 4.

It is preferable that the area of the portion of the support part 19 having contact with the operation surface is as small as possible within a range of being able to stably hold the tactile presentation knob 30D in the rotation operation and ensure durability from a viewpoint that the friction coefficient between the support part 19 and the operation surface is minimized and the area of the conductive elastic part 6 is secured as large as possible to obtain stronger tactile strength.

The conductive elastic part 6 needs not be necessarily divided into a plurality of pieces, however, the area thereof may be adjusted in accordance with a design value of the electrostatic capacitance formed between the tactile electrode 102 and the conductive elastic part 6. When the conductive elastic part 6 is divided, it is preferable that the conductive elastic parts 6 are disposed as evenly as possible to transfer the vibration occurring by the electrostatic force between the conductive elastic part 6 and the operation surface to the rotation part 4 as evenly as possible.

The conductive elastic part 6 also has the function of the position detection part 7, the touch detection circuit 210 detects the electrostatic capacitance formed between the conductive elastic part 6 and the detection electrode 203, and the knob movement amount calculation circuit 220 calculates the rotation angle and the rotation speed of the tactile presentation knob 30D.

Figure 48:
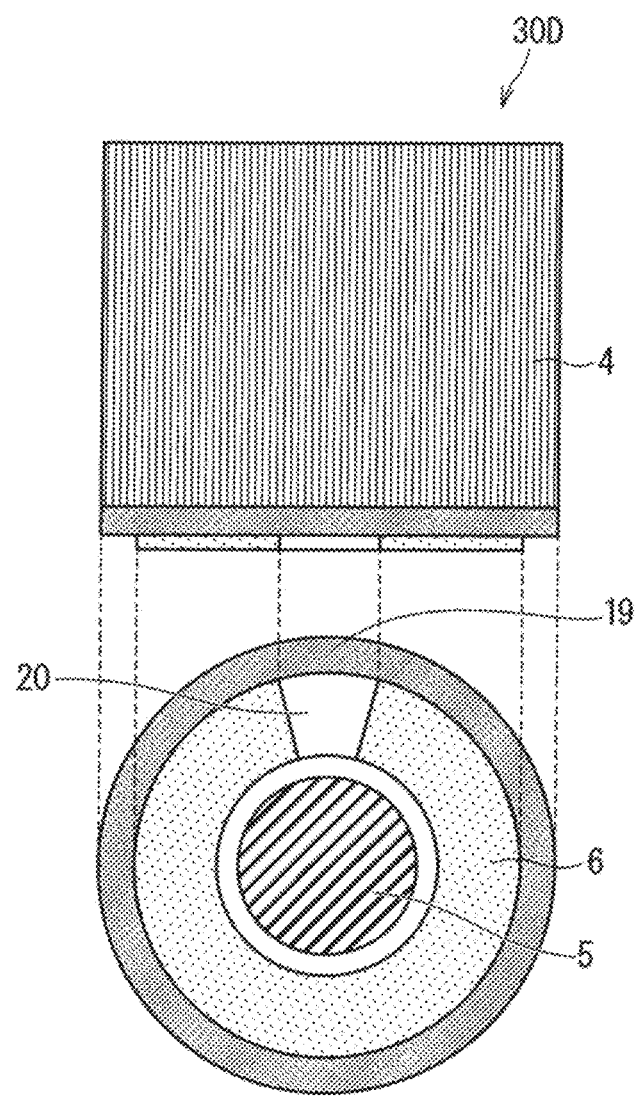
FIG. 48 A diagram illustrating a configuration in a case where a conductive elastic part of the tactile presentation knob according to the embodiment 4 is not divided.

FIG. 48 is a diagram illustrating a configuration in a case where the tactile presentation knob 30D includes the void part 20 only in one position, and the conductive elastic part 6 is not divided, and a side surface view and a bottom surface view of the tactile presentation knob 30D are illustrated on an upper side and a lower side, respectively. As illustrated in FIG. 48, in the tactile presentation knob 30D, the conductive elastic part 6 is not disposed, and a position of the void part 20 which does not form the electrostatic capacitance can be a reference position of the knob movement amount calculation.

Figure 49:
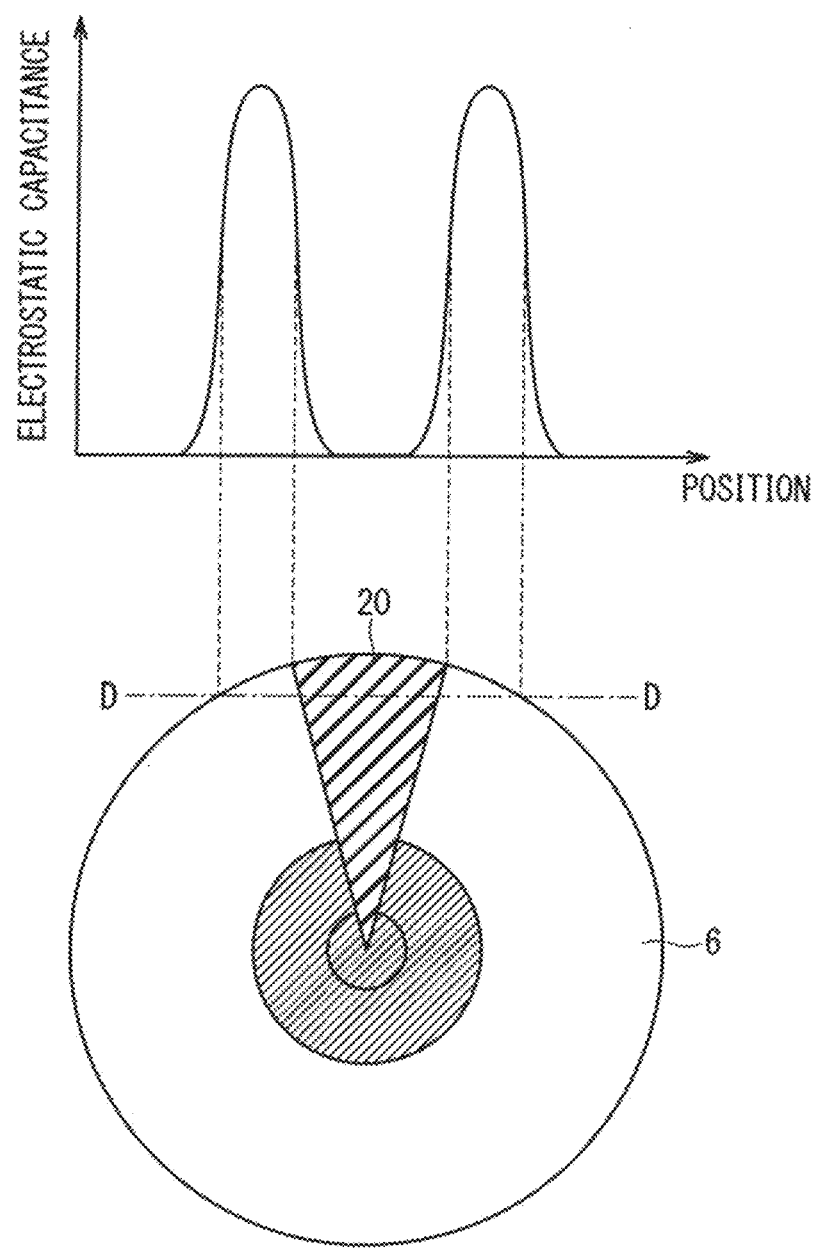
FIG. 49 A schematic view for explaining a capacitance profile in a line D-D when the touch screen detects the position of the tactile presentation knob according to the embodiment 4.

FIG. 49 is a schematic view explaining an electrostatic capacitance profile in a line D-D when the touch screen detects a position of the tactile presentation knob in a case of adopting the configuration of the tactile presentation knob 30D in FIG. 48, and a lateral axis indicates the position on the line D-D and a vertical axis indicates an electrostatic capacitance.

As illustrated in FIG. 49, the void part 20 is located, thus the electrostatic capacitance profile of the conductive elastic part 6 is a profile having peaks in two different positions, and an area between two profiles can be a reference position of the knob movement amount calculation.

Effect

According to the tactile presentation knob 30D of the embodiment 4, the position detection part 7 is unnecessary, and the support part 19 is provided in the outer peripheral part of the contact surface between the tactile presentation knob 30D and the operation surface, thus a degree of freedom of the arrangement of the conductive elastic part 6 is increased, the area of the conductive elastic part 6 can be increased, and the tactual strength can be increased. The support part 19 holes the tactile presentation knob 30D in the outer peripheral part of the contact surface between the tactile presentation knob 30D and the operation surface, thus the rotation operation of the tactile presentation knob 30D can be stably performed.

Embodiment 5

Figure 50:
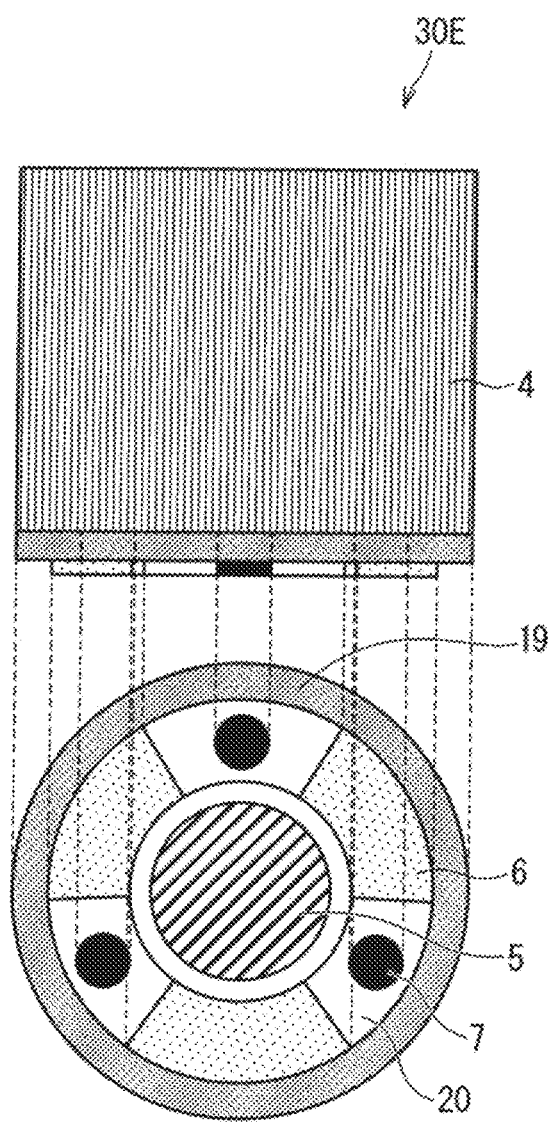
FIG. 50 A diagram illustrating a configuration of a tactile presentation knob according to an embodiment 5.

FIG. 50 is a diagram illustrating a configuration of a tactile presentation knob according to an embodiment 5, and a side surface view and a bottom surface view of the tactile presentation knob 30E are illustrated on an upper side and a lower side, respectively. As illustrated in FIG. 50, the tactile presentation knob 30E has a configuration that the fixing part 5 fixing the tactile presentation knob 30E to the operation surface is disposed in the center, and the conductive elastic part 6 are concentrically disposed around the fixing part 5.

Each of the conductive elastic parts 6 has the fan-like shape in a plan view centering around the fixing part 5, and is disposed at intervals in three positions, the void part 20 is located between the conductive elastic parts 6, and each of the position detection parts 7 having a circular shape in a plan view is concentrically disposed at regular intervals around the fixing part 5 in a plane of the fan-like shape of the void part 20. Then, the support part 19 is disposed in the outer peripheral part of the surface of the tactile presentation knob 30E having contact with the operation surface, that is to say, the outer peripheral part of the bottom surface of the rotation part 4. In FIG. 50, all of the conductive elastic parts 6 and the position detection parts 7 are disposed in the three positions, however, they may be disposed in more than three positions. It is sufficient that the position detection part 7 is disposed in one or more positions, and when it is disposed in three or more positions, the rotation angle of the knob can be calculated more accurately.

Effect

According to the tactile presentation knob 30E of the embodiment 5, the support part 19 is provided in the outer peripheral part of the contact surface between the tactile presentation knob 30E and the operation surface, thus a degree of freedom of the arrangement of the conductive elastic part 6 and the position detection part 7 is increased. When the conductive elastic part 6 has low resistance, there is a possibility that separation of the electrostatic capacitance profile of the conductive elastic part 6 from the position detection part 7 is difficult. However, as illustrated in FIG. 50, the void part 20 is provided around the position detection part 7, thus overlap of the capacitance profile of the position detection part 7 and the capacitance profile of the conductive elastic part 6 can be reduced, and reduction in accuracy of position detection can be suppressed.

Embodiment 6

Figure 51:
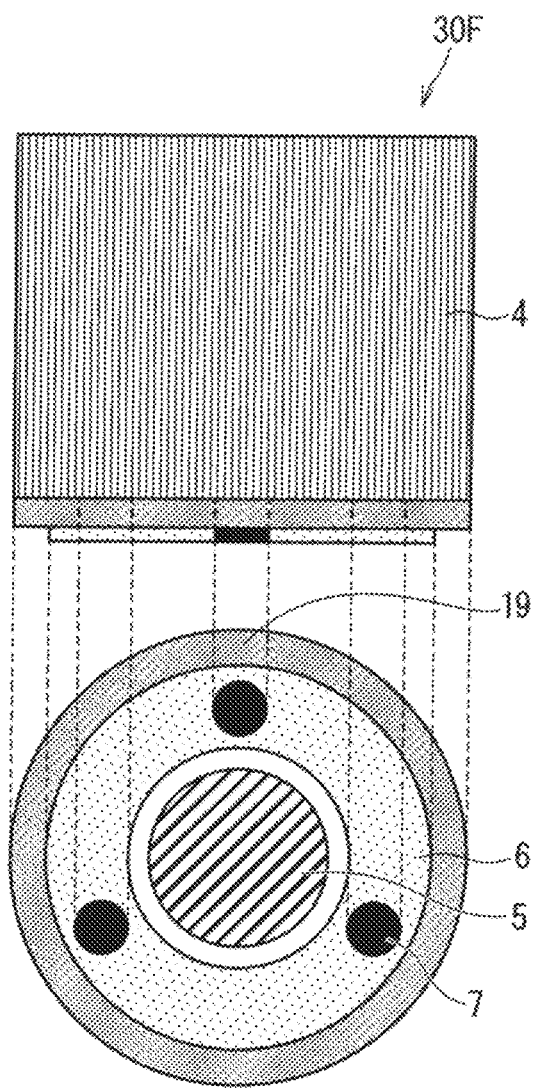
FIG. 51 A diagram illustrating a configuration of a tactile presentation knob according to an embodiment 6.

FIG. 51 is a diagram illustrating a configuration of a tactile presentation knob 30F according to an embodiment 6, and a side surface view and a bottom surface view of the tactile presentation knob 30F are illustrated on an upper side and a lower side, respectively. As illustrated in FIG. 51, the tactile presentation knob 30F has a configuration that the fixing part 5 fixing the tactile presentation knob 30F to the operation surface is disposed in the center, and the conductive elastic part 6 are concentrically disposed around the fixing part 5. Then, the support part 19 is disposed in the outer peripheral part of the surface of the tactile presentation knob 30F having contact with the operation surface, that is to say, the outer peripheral part of the bottom surface of the rotation part 4.

The conductive elastic part 6 has a ring-like shape in a plan view to surround the fixing part 5, and three position detection parts 7 each having a circular shape in a plan view are concentrically disposed at regular intervals around the fixing part 5 in a plane of the ring-like conductive elastic part 6.

Effect

According to the tactile presentation knob 30F of the embodiment 6, the position detection part 7 having the lower resistance value than the conductive elastic part 6 is provided, thus the capacitance profile having the peak can be obtained, and the movement amount of the tactile presentation knob 30F can be detected. In FIG. 51, the position detection parts 7 are disposed in the three positions, however, they may be disposed in more than three positions. It is sufficient that the position detection part 7 is disposed in one or more positions, and when it is disposed in three or more positions, the rotation angle of the knob can be calculated more accurately.

The conductive elastic part 6 is not divided, thus in a case where the electrode pitch of the tactile electrode 102 is large and an overlapping part made up of the conductive elastic part 6 and the tactile electrode 102 tends to be unevenly located, evenness can be improved.

Embodiment 7

Figure 52:
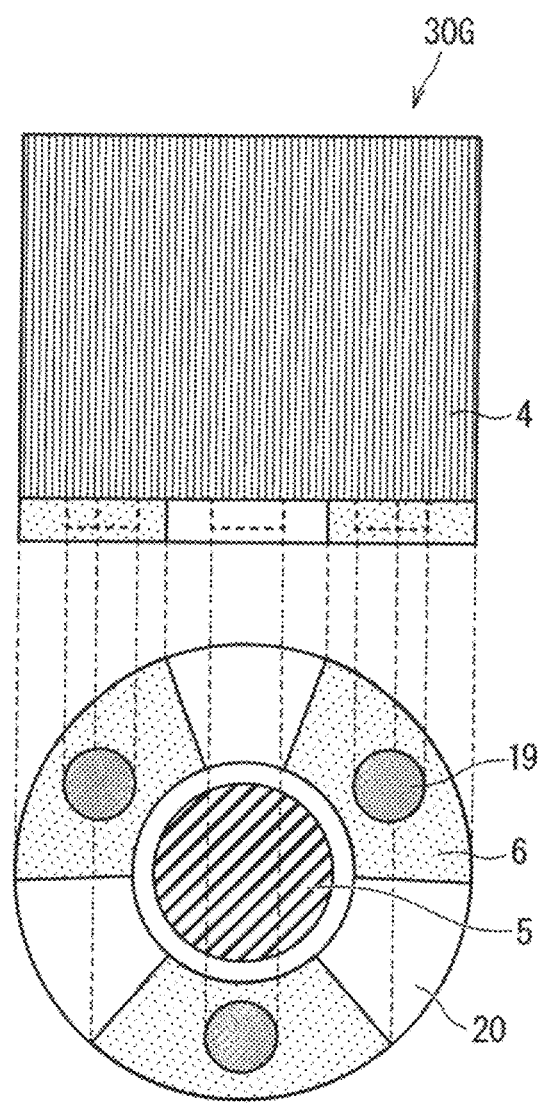
FIG. 52 A diagram illustrating a configuration of a tactile presentation knob according to an embodiment 7.

FIG. 52 is a diagram illustrating a configuration of a tactile presentation knob according to an embodiment 7, and a side surface view and a bottom surface view of the tactile presentation knob 30G are illustrated on an upper side and a lower side, respectively. As illustrated in FIG. 52, the tactile presentation knob 30G has a configuration that the fixing part 5 fixing the tactile presentation knob 30G to the operation surface is disposed in the center, and the conductive elastic part 6 are concentrically disposed around the fixing part 5.

Each of the conductive elastic parts 6 has the fan-like shape in a plan view centering around the fixing part 5, and is disposed at intervals in three positions, the void part 20 is located between the conductive elastic parts 6, each of the support parts 19 having a circular shape in a plan view is concentrically disposed at regular intervals around the fixing part 5 in a plane of the fan-like shape of the conductive elastic part 6, and the support part 19 is surrounded by the conductive elastic part 6.

The conductive elastic parts 6 are disposed in three positions at intervals, and each support part 19 is disposed in each plane. However, the number of the arrangement positions of the conductive elastic parts 6 may not be the same as that of the support parts 19. When the conductive elastic parts 6 are provided in two positions, for example, each support part 19 can be disposed in each plane, and the position detection part 7 can also be disposed in the plane of the void part 20. In FIG. 52, all of the conductive elastic parts 6 and the support parts 19 are disposed in the three positions, however, they may be disposed in more than three positions. As the number of the arrangement positions of the support part 19 increases, the knob is more hardly inclined in the rotation operation, thus the tactual sense can be presented with more stable strength.

Only the conductive elastic part 6 also has the function of the position detection part 7, and both the support part 19 and the conductive elastic part 6 can have the function of the position detection part 7. When the support part 19 also has the function of the position detection part 7, it is preferable that the support part 19 is also made up of a conductive material.

Applicable as the conductive material is the material of the support part 19 described in the embodiment 1 as a base material to which carbon black or a metal powder providing conductivity is added.

Effect

According to the tactile presentation knob 30G of the embodiment 7, the conductive elastic part 6 can reinforce mechanical and physical strength in the rotation operation for the support part 19, thus an arrangement area of the support part 19 can be reduced.

Embodiment 8

Figure 53:
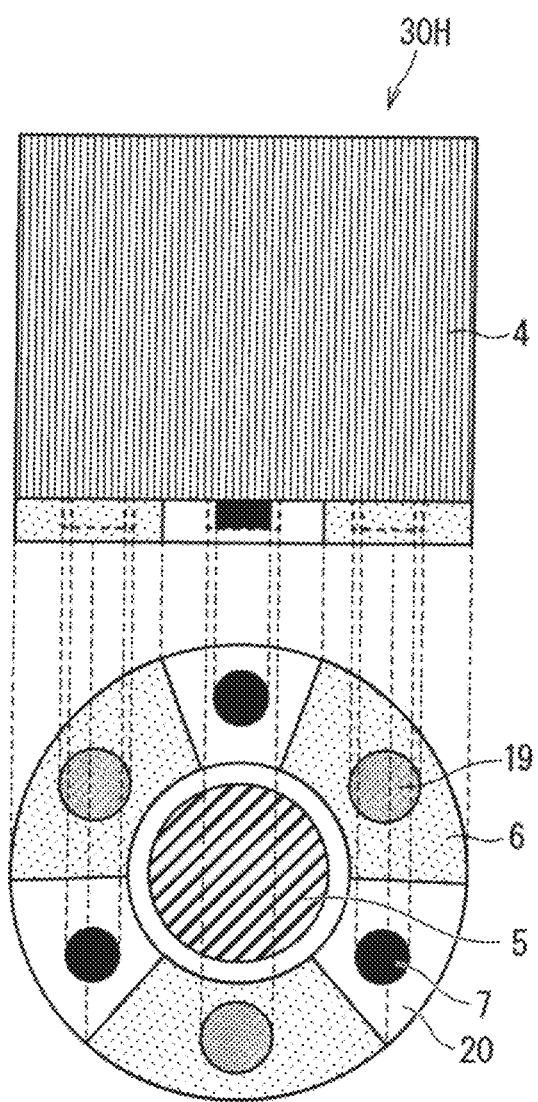
FIG. 53 A diagram illustrating a configuration of a tactile presentation knob according to an embodiment 8.

FIG. 53 is a diagram illustrating a configuration of a tactile presentation knob 30H according to an embodiment 8, and a side surface view and a bottom surface view of the tactile presentation knob 30H are illustrated on an upper side and a lower side, respectively. As illustrated in FIG. 53, the tactile presentation knob 30H has a configuration that the fixing part 5 fixing the tactile presentation knob 30H to the operation surface is disposed in the center, and the conductive elastic part 6 are concentrically disposed around the fixing part 5.

Each of the conductive elastic parts 6 has the fan-like shape in a plan view centering around the fixing part 5, and is disposed at intervals in three positions, the void part 20 is located between the conductive elastic parts 6, each of the support parts 19 having a circular shape in a plan view is concentrically disposed at regular intervals around the fixing part 5 in a plane of the fan-like shape of the conductive elastic part 6, and the support part 19 is surrounded by the conductive elastic part 6. Each of the position detection parts 7 having a circular shape in a plan view is concentrically disposed at regular intervals around the fixing part 5 in a plane of the fan-like shape of the void part 20. In FIG. 53, the conductive elastic part 6 are disposed in the three positions, however, they may be disposed in more than three positions.

Effect

According to the tactile presentation knob 30H of the embodiment 8, overlap of the capacitance profile of the conductive elastic part 6 and the position detection part 7 can be suppressed, and position detection accuracy can be increased.

Embodiment 9

Figure 54:
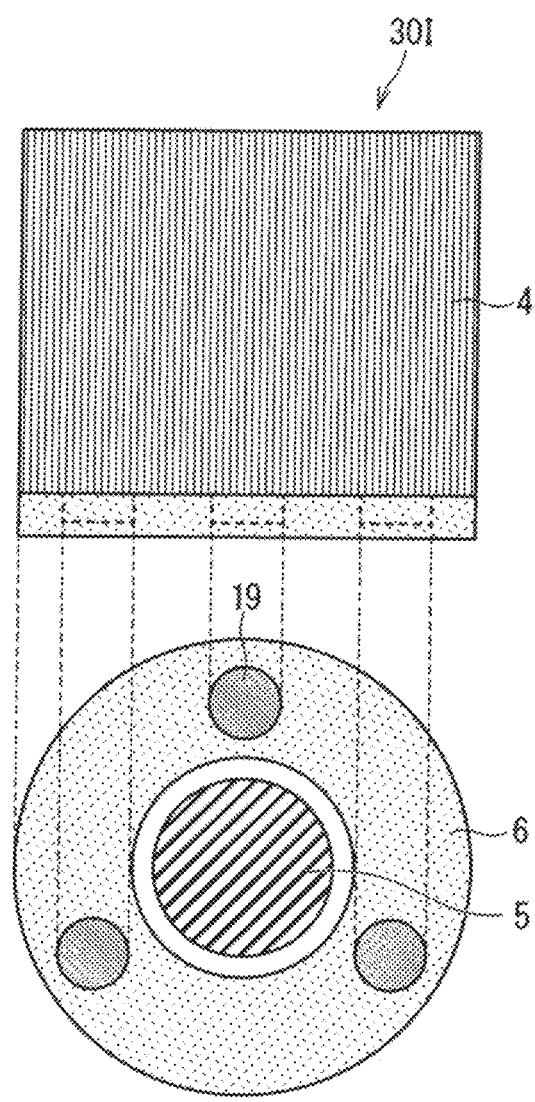
FIG. 54 A diagram illustrating a configuration of a tactile presentation knob according to an embodiment 9.

FIG. 54 is a diagram illustrating a configuration of a tactile presentation knob 30I according to an embodiment 9, and a side surface view and a bottom surface view of the tactile presentation knob 30I are illustrated on an upper side and a lower side, respectively. As illustrated in FIG. 54, the tactile presentation knob 30I has a configuration that the fixing part 5 fixing the tactile presentation knob 30I to the operation surface is disposed in the center, and the conductive elastic part 6 are concentrically disposed around the fixing part 5.

The conductive elastic part 6 has the ring-like shape in a plan view to surround the fixing part 5, three support parts 19 each having a circular shape in a plan view are concentrically disposed at regular intervals around the fixing part 5 in a plane of the ring-like conductive elastic part 6, and the support part 19 is surrounded by the conductive elastic part 6.

Effect

According to the tactile presentation knob 30I of the embodiment 9, the conductive elastic part 6 easily secures the large area, thus even when a diameter of the tactile presentation knob 30I is small, large tactile strength can be obtained.

The conductive material is used for the support part 19, thus the support part 19 can also have the function of the position detection part 7. In FIG. 54, the support parts 19 are disposed in the three positions, however, they may be disposed in more than three positions. As the number of the arrangement positions of the support part 19 increases, the knob is more hardly inclined in the rotation operation, thus the tactual sense can be presented with more stable strength.

Embodiment 10

Figure 55:
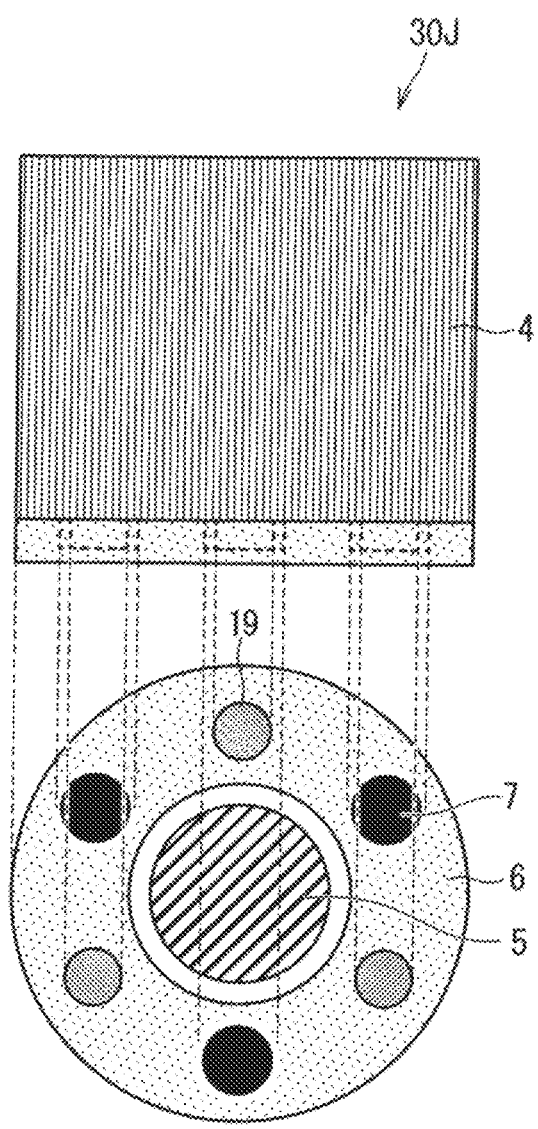
FIG. 55 A diagram illustrating a configuration of a tactile presentation knob according to an embodiment 10.

FIG. 55 is a diagram illustrating a configuration of a tactile presentation knob 30J according to an embodiment 10, and a side surface view and a bottom surface view of the tactile presentation knob 30J are illustrated on an upper side and a lower side, respectively. As illustrated in FIG. 55, the tactile presentation knob 30J has a configuration that the fixing part 5 fixing the tactile presentation knob 30J and the tactile presentation knob 30J to the operation surface is disposed in the center, and the conductive elastic part 6 are concentrically disposed around the fixing part 5.

The conductive elastic part 6 has a ring-like shape in a plan view to surround the fixing part 5, three support parts 19 each having a circular shape in a plan view are concentrically disposed at regular intervals around the fixing part in the plane of the ring-like conductive elastic part 6, and three position detection parts 7 each having a circular shape in a plan view are concentrically disposed in a position not overlapping with the support part 19 at regular intervals around the fixing part 5 in a plane of the ring-like conductive elastic part 6.

The conductive elastic part 6 is not divided, but has contact with the operation surface instead of the positions where the position detection part 7 and the support part 19 are disposed.

Effect

According to the tactile presentation knob 30J of the embodiment 10, the conductive elastic part 6 easily secures the large area, thus even when a diameter of the tactile presentation knob 30J is small, large tactile strength can be obtained. In FIG. 55, both the position detection part 7 and the support parts 19 are disposed in the three positions, however, they may be disposed in more than three positions. As the number of the arrangement positions of the support part 19 increases, the knob is more hardly inclined in the rotation operation, thus the tactual sense can be presented with more stable strength. It is sufficient that the position detection part 7 is disposed in at least one position, and when it is disposed in three or more positions, the rotation angle calculation accuracy is improved.

When the conductive elastic part 6 has the high resistance value, and the electrostatic capacitance formed between the tactile electrode 102 and the conductive elastic part 6 is not large enough to detect the movement amount of the tactile presentation knob 30J, the electrostatic capacitance can be compensated by providing the position detection part 7 having the low resistance value, and the capacitance profile is obtained, thus the movement amount of the tactile presentation knob 30J can be detected.

In the present disclosure, each embodiment can be arbitrarily combined, or each embodiment can be appropriately varied or omitted within the scope of the disclosure.

Although the present disclosure is described in detail, the foregoing description is in all aspects illustrative and does not restrict the disclosure. It is therefore understood that numerous modification examples can be devised without departing from the scope of the invention.

The invention claimed is:
1. A tactile presentation device in which a tactile presentation knob is disposed on an operation surface to present tactile to a user via the tactile presentation knob, the tactile presentation device comprising:
    a touch detection circuit detecting the user having contact with the tactile presentation knob and detecting a position of the tactile presentation knob on the tactile presentation device to output the position as positional information;

a pressure detection circuit detecting an amount of pressing of the operation surface performed by the user via the tactile presentation knob and outputting the amount of pressing as pressing information;

a tactile control circuit determining a voltage signal generating friction force between the tactile presentation knob and the operation surface based on the positional information outputted from the touch detection circuit and pressing information outputted from the pressure detection circuit; and a pressure amount calculation circuit calculating a pressure amount based on the amount of pressing detected in the pressure detection circuit and adding the pressure amount to the pressing information, wherein generated is tactile caused by a change of the friction force between the tactile presentation knob and the operation surface by the voltage signal determined by the tactile control circuit, and the pressure detection circuit detects the amount of pressing of the operation surface via the tactile presentation knob so that the friction force between the tactile presentation knob and the operation surface generated by the voltage signal becomes constant.

2. The tactile presentation device according to claim 1, wherein the tactile presentation knob includes:

a conductive elastic part provided in a position facing the operation surface to have contact with the operation surface; and a support part limiting pressing force on the conductive elastic part, and the pressure detection circuit detects the amount of pressing of the operation surface also via the support part.

3. The tactile presentation device according to claim 2, wherein the tactile presentation knob includes a rotation part provided on the conductive elastic part, the support part is provided on a bottom surface of the rotation part to keep a distance from the operation surface to the rotation part constant, a height of the support part is set lower than a height of the conductive elastic part in a state where the tactile presentation knob is disposed on the operation surface and the user does not have contact with the tactile presentation knob, and the support part has contact with the operation surface when the user presses the tactile presentation knob, and keeps a friction coefficient between the conductive elastic part and the operation surface constant in a state where the voltage signal is not applied.

4. The tactile presentation device according to claim 3, further comprising:

a tactile electrode including a plurality of first electrode and a plurality of second electrodes provided on a side of the operation surface of the tactile presentation device;

a dielectric layer covering the tactile electrode and having one surface being the operation surface; and a voltage generation circuit generating a first voltage signal applied to at least one of the first electrodes located in at least part of a region in the operation surface of the tactile presentation device and generating a second voltage signal having a waveform different from the first voltage signal to be applied to at least one of the second electrodes located in at least part of a region in the operation surface of the tactile presentation device, wherein the friction force is generated between the operation surface and the tactile presentation knob by supplying the first and second voltage signals.

5. The tactile presentation device according to claim 4, wherein the first voltage signal and the second voltage signal are voltage signals each having a waveform in which at least one of a frequency, a phase, and an amplitude voltage is different from each other.

6. The tactile presentation device according to claim 4, wherein the friction coefficient between the support part and the operation surface is smaller than a static friction coefficient between the conductive elastic part and the operation surface in a state where electrostatic force does not occur between the tactile electrode and the conductive elastic part.

7. The tactile presentation device according to claim 4, wherein the conductive elastic part is provided at intervals in a plurality of positions in the bottom surface of the rotation part, and a plurality of conductive elastic parts are overlapped with at least the first electrode and the second electrode adjacent to each other in a plan view, thereby generating tactile.

8. The tactile presentation device according to claim 3, wherein a difference of a height between the support part and the conductive elastic part is set to be larger than a dimensional tolerance of a thickness of the conductive elastic part.

9. The tactile presentation device according to claim 3, wherein the conductive elastic part is provided at intervals in a plurality of positions in the bottom surface of the rotation part, the support part is provided at intervals in a plurality of positions in the bottom surface of the rotation part, and the plurality of conductive elastic parts and the plurality of support parts are alternately provided.

10. The tactile presentation device according to claim 9, wherein the tactile presentation knob further includes a fixing part as a central axis having contact with the operation surface to rotate the tactile presentation knob.

11. The tactile presentation device according to claim 3, wherein the support part is provided in an outer peripheral part of the bottom surface of the rotation part, and the conductive elastic part is provided in the bottom surface of the rotation part on an inner side of the support part.

12. The tactile presentation device according to claim 11, wherein the tactile presentation knob further includes a fixing part as a central axis having contact with the operation surface to rotate the tactile presentation knob.

13. The tactile presentation device according to claim 3, wherein the support part is provided at intervals in a plurality of positions in the bottom surface of the rotation part, and a plurality of support parts are provided to be surrounded by the conductive elastic part.

14. The tactile presentation device according to claim 13, wherein
the tactile presentation knob further includes a fixing part as a central axis having contact with the operation surface to rotate the tactile presentation knob.

15. The tactile presentation device according to claim 3, wherein
the tactile presentation knob further includes at least one position detection part provided in the bottom surface of the rotation part,
the support part is provided at intervals in a plurality of positions in the bottom surface of the rotation part,
the position detection part is provided at intervals in a plurality of positions in the bottom surface of the rotation part, and
a plurality of support parts and a plurality of position detection parts are alternately provided.

16. The tactile presentation device according to claim 15, wherein
the tactile presentation knob further includes a fixing part as a central axis having contact with the operation surface to rotate the tactile presentation knob.

17. The tactile presentation device according to claim 1, wherein
the tactile control circuit changes the friction force by changing a time and a cycle of applying a signal waveform and a signal voltage of a tactile presentation signal.

18. A tactile presentation touch panel, comprising:
the tactile presentation device according to claim 1; and
a touch panel disposed on a side opposite to the operation surface of the tactile presentation device, wherein
the touch detection circuit is included in the touch panel.

19. The tactile presentation touch panel according to claim 18, wherein
a detection electrode and an excitation electrode of the touch panel are disposed in a pair in a matrix.

20. A tactile presentation touch display, comprising:
the tactile presentation touch panel according to claim 19; and
a display panel attached to the tactile presentation touch panel.

* * * * *